(12) United States Patent
Zhou et al.

(10) Patent No.: US 11,076,360 B2
(45) Date of Patent: *Jul. 27, 2021

(54) UPLINK BEAM MANAGEMENT IN A WIRELESS NETWORK

(71) Applicant: Ofinno, LLC, Reston, VA (US)

(72) Inventors: Hua Zhou, Herndon, VA (US); Esmael Dinan, McLean, VA (US); Alireza Babaei, Fairfax, VA (US); Hyoungsuk Jeon, Centreville, VA (US); Kyungmin Park, Vienna, VA (US)

(73) Assignee: OFINNO, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,693

(22) Filed: Dec. 18, 2019

(65) Prior Publication Data
US 2020/0128488 A1  Apr. 23, 2020

Related U.S. Application Data

(63) Continuation of application No. 16/125,115, filed on Sep. 7, 2018, now Pat. No. 10,524,212.
(Continued)

(51) Int. Cl.
*H04L 5/12* (2006.01)
*H04B 7/02* (2018.01)
(Continued)

(52) U.S. Cl.
CPC .......... *H04W 52/146* (2013.01); *H04B 7/0617* (2013.01); *H04L 5/001* (2013.01);
(Continued)

(58) Field of Classification Search
CPC .......... H04W 52/146; H04W 72/0413; H04W 16/32; H04W 52/325; H04W 52/228;
(Continued)

(56) References Cited

U.S. PATENT DOCUMENTS 9,072,056 B2   6/2015   Suzuki et al.
9,282,521 B2   3/2016   Lim et al.
(Continued)

FOREIGN PATENT DOCUMENTS

CN   103327597 A   9/2013
CN   103379603 A   10/2013
(Continued)

OTHER PUBLICATIONS

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA);Multiplexing and channel coding (Release 14).
(Continued)

*Primary Examiner* — Don N Vo
(74) *Attorney, Agent, or Firm* — Arch & Lake LLP

(57) ABSTRACT

A wireless device receives a first DCI indicating transmission of at least one SRS for an uplink beam management procedure. The at least one SRS is transmitted via at least one first SRS resource. During a time window starting based on the transmitting the at least on SRS, a downlink control channel is monitored for a second DCI indicating one of the at least one SRS. Based on not detecting the second DCI during the time window, a second uplink signal is transmitted via at least one second uplink resource.

20 Claims, 30 Drawing Sheets

Related U.S. Application Data

(60) Provisional application No. 62/564,626, filed on Sep. 28, 2017, provisional application No. 62/555,366, filed on Sep. 7, 2017, provisional application No. 62/555,359, filed on Sep. 7, 2017.

(51) Int. Cl.
| | |
|---|---|
| *H04W 52/14* | (2009.01) |
| *H04W 72/04* | (2009.01) |
| *H04L 5/00* | (2006.01) |
| *H04W 52/32* | (2009.01) |
| *H04W 52/22* | (2009.01) |
| *H04W 16/32* | (2009.01) |
| *H04B 7/06* | (2006.01) |
| *H04W 74/08* | (2009.01) |
| *H04W 88/08* | (2009.01) |

(52) U.S. Cl.
CPC .......... *H04L 5/005* (2013.01); *H04L 5/0048* (2013.01); *H04L 5/0053* (2013.01); *H04L 5/0098* (2013.01); *H04W 16/32* (2013.01); *H04W 52/228* (2013.01); *H04W 52/325* (2013.01); *H04W 72/042* (2013.01); *H04W 72/046* (2013.01); *H04W 72/0406* (2013.01); *H04W 72/0413* (2013.01); *H04W 74/0833* (2013.01); *H04W 88/08* (2013.01)

(58) Field of Classification Search
CPC ......... H04W 74/0833; H04W 72/0406; H04W 72/046; H04W 72/042; H04W 88/08; H04L 5/0053; H04L 5/0098; H04L 5/005; H04L 5/001; H04L 5/0048; H04B 7/0617
USPC .................................................. 375/262, 267
See application file for complete search history.

(56) References Cited

U.S. PATENT DOCUMENTS

| | | | |
|---|---|---|---|
| 9,374,724 | B2 | 6/2016 | Ahlander et al. |
| 9,497,047 | B2 | 11/2016 | Josiam et al. |
| 9,668,248 | B2 | 5/2017 | Seo et al. |
| 9,681,482 | B2 | 6/2017 | Yang et al. |
| 9,853,707 | B2 | 12/2017 | Yu et al. |
| 9,980,234 | B2 | 5/2018 | Yang et al. |
| 2010/0111026 | A1 | 5/2010 | Hsu |
| 2010/0246561 | A1 | 9/2010 | Shin et al. |
| 2011/0159914 | A1 | 6/2011 | Chen et al. |
| 2011/0268028 | A1 | 11/2011 | Stern-Berkowitz et al. |
| 2012/0087334 | A1 | 4/2012 | Suzuki et al. |
| 2012/0282970 | A1 | 11/2012 | Kela et al. |
| 2013/0010706 | A1 | 1/2013 | Kela et al. |
| 2013/0215811 | A1 | 8/2013 | Takaoka et al. |
| 2013/0279486 | A1 | 10/2013 | Kato et al. |
| 2014/0036737 | A1 | 2/2014 | Ekpenyong et al. |
| 2014/0036809 | A1 | 2/2014 | Xu et al. |
| 2014/0105141 | A1 | 4/2014 | Noh et al. |
| 2014/0219152 | A1 | 8/2014 | Antó et al. |
| 2014/0369242 | A1 | 12/2014 | Ng et al. |
| 2015/0050938 | A1 | 2/2015 | Uemura et al. |
| 2015/0223213 | A1 | 8/2015 | Moon et al. |
| 2015/0245300 | A1 | 8/2015 | Suzuki et al. |
| 2015/0296490 | A1 | 10/2015 | Yi et al. |
| 2016/0029323 | A1 | 1/2016 | Hwang et al. |
| 2016/0066281 | A1 | 3/2016 | Ouchi et al. |
| 2016/0135143 | A1 | 5/2016 | Won et al. |
| 2016/0135147 | A1 | 5/2016 | Ouchi et al. |
| 2016/0150522 | A1* | 5/2016 | Kanamarlapudi .... H04L 1/1874 370/329 |
| 2016/0219475 | A1 | 7/2016 | Kim |
| 2016/0338039 | A1 | 11/2016 | Van Der Velde et al. |
| 2016/0353440 | A1 | 12/2016 | Lee et al. |
| 2016/0365959 | A1 | 12/2016 | Dinan |
| 2016/0374072 | A1 | 12/2016 | Dinan |
| 2017/0064649 | A1 | 3/2017 | Feuersaenger et al. |
| 2017/0223640 | A1 | 8/2017 | Dinan |
| 2017/0230915 | A1 | 8/2017 | Kim et al. |
| 2017/0230995 | A1 | 8/2017 | Kim et al. |
| 2017/0272199 | A1 | 9/2017 | Dinan |
| 2017/0272200 | A1 | 9/2017 | Dinan |
| 2017/0273071 | A1 | 9/2017 | Nogami et al. |
| 2017/0302419 | A1 | 10/2017 | Liu et al. |
| 2018/0007642 | A1 | 1/2018 | Feuersaenger et al. |
| 2018/0014255 | A1 | 1/2018 | Pelletier et al. |
| 2018/0027437 | A1 | 1/2018 | Vitthaladevuni et al. |
| 2018/0049228 | A1 | 2/2018 | Lee et al. |
| 2018/0092073 | A1 | 3/2018 | Nogami et al. |
| 2018/0206132 | A1 | 7/2018 | Guo et al. |
| 2018/0270792 | A1 | 9/2018 | Park et al. |
| 2018/0279185 | A1 | 9/2018 | Wu |
| 2018/0279232 | A1 | 9/2018 | Dinan |
| 2018/0324715 | A1 | 11/2018 | Ryoo et al. |
| 2019/0021058 | A1* | 1/2019 | Cheng ............... H04W 74/0833 |
| 2019/0053166 | A1 | 2/2019 | Nagaraja et al. |
| 2019/0053182 | A1 | 2/2019 | Choi et al. |
| 2019/0058562 | A1 | 2/2019 | Yoo et al. |
| 2019/0190669 | A1 | 6/2019 | Park et al. |
| 2019/0207731 | A1 | 7/2019 | Park et al. |
| 2019/0246360 | A1 | 8/2019 | Dinan |
| 2019/0274155 | A1 | 9/2019 | Bhattad et al. |
| 2019/0349864 | A1 | 11/2019 | Zhang et al. |

FOREIGN PATENT DOCUMENTS

| | | |
|---|---|---|
| CN | 103796291 A | 5/2014 |
| CN | 104509181 A | 4/2015 |
| EP | 2742746 B1 | 7/2015 |
| EP | 3089526 A1 | 11/2016 |
| EP | 3182767 A2 | 6/2017 |
| EP | 3316536 A1 | 5/2018 |
| WO | 2013049769 A1 | 4/2013 |
| WO | 2014021394 A1 | 2/2014 |
| WO | 2014109707 A1 | 7/2014 |
| WO | 2014165510 A1 | 10/2014 |
| WO | 2015116732 A1 | 8/2015 |
| WO | 2016123402 A1 | 8/2016 |
| WO | 2017173177 A1 | 3/2017 |
| WO | 2018009462 A1 | 1/2018 |
| WO | 2018027231 A1 | 2/2018 |
| WO | 2018063943 A1 | 4/2018 |
| WO | 2018064073 A1 | 4/2018 |

OTHER PUBLICATIONS

3GPP TS 36.321 V14.3.0 (Jun. 2017); Technical Specification; 3rd Generation Partnership Project; Technical Specification Group Radio Access Network; Evolved Universal Terrestrial Radio Access (E-UTRA);Medium Access Control (MAC) protocol specification (Release 14).

3GPP TS 36.331 V14.3.0 (Jun. 2017); Technical Specification; 3rd Generation Partnership Project;; Technical Specification Group Radio Access Network; Evolved Universal Terrestrial Radio Access (E-UTRA);Radio Resource Control (RRC); Protocol specification (Release 14).

3GPP TSG RAN WG1 Meeting #90; Prague, Czech Republic, Aug. 21-25, 2017; Title: RAN1 Chairman's Notes.

3GPP TSG RAN WG1 Meeting #90; R1-171xxxx; Prague, Czech Rep, Aug. 21-25, 2017; Title: Draft Report of 3GPP TSG RAN WG1 #89 v0.2.0; (Hangzhou, China, May 15-19, 2017).

3GPP TSG RAN WG1 Meeting NR#3; Nagoya, Japan, Sep. 18-21, 2017; Title: RAN1 Chairman's Notes.

R1- 1712563; 3GPP TSG RAN WG1 Meeting #90; Prague, P.R. Czech Aug. 21-25, 2017; Source: Intel Corporation; Title: Discussion on SRS for NR; Agenda item: 6.1.2.3.5; Document for: Discussion and Decision.

R1- 1713150; 3GPP TSG RAN WG1 Meeting #90; Prague, Czech Republic, Aug. 21-25, 2017; Agenda Item: 6.1.2.2.6; Source: LG Electronics; Title: Discussion on UL beam management Document for: Discussion/Decision.

(56) References Cited

OTHER PUBLICATIONS

R1-1716061; 3GPP TSG RAN WG1 Meeting NR#3; Nagoya, Japan, Sep. 18-1, 2017; Source: CMCC; Title: Discussion on power control framework; Agenda Item: 6.7.1; Document for: Discussion and Decision.
R1-1712223; 3GPP TSG RAN WG1 Meeting #90; Prague, Czech Republic, Aug. 21-25, 2017; Agenda Item: 6.1.2.2.6; Source:Huawei, HiSilicon; Title: UL beam management; Document for: Discussion and decision.
R1-1712238; 3GPP TSG RAN WG1 Meeting #90; Prague, Czech Republic, Aug. 21-25, 2017; Agenda Item: 6.1.2.3.5; Source:Huawei, HiSilicon; Title: UL SRS design for beam management and CSI acquisition; Document for: Discussion and decision.
R1-1712299; 3GPP TSG RAN WG1 Meeting #90; Prague, Czechia, Aug. 21-25, 2017; Source: ZTE; Title: UL beam management for NR MIMO; Agenda Item: 6.1.2.2.6; Document for: Discussion and Decision.
R1-1712378; 3GPP TSG RAN WG1 Meeting #90; Prague, Czechia, Aug. 21-25, 2017; Source: CATT; Title: Considerations on UL beam management; Agenda Item: 6.1.2.2.6; Document for: Discussion and Decision.
R1-1712386; 3GPP TSG RAN WG1 Meeting #90; Prague, Czechia, Aug. 21-25, 2017; Source: CATT; Title: Discussion on remaining issues on SRS design; Agenda Item: 6.1.2.3.5; Document for: Discussion and Decision.
R1-1712551; 3GPP TSG-RAN WG1 Meeting #90; Prague, P.R. Czech; Aug. 21-25, 2017; Source: Intel Corporation; Title:Details for UL Beam Management; Agenda item: 6.1.2.2.6; Document for: Discussion and Decision.
R1-1712750; 3GPP TSG RAN WG1 Meeting; Prague, Czech Republic Aug. 21-25, 2017; Source: Mitsubishi Electric; Title: Views on SRS designs; Agenda item: 6.1.2.3.5 SRS; Document for: Discussion/Decision.
R1-1712838; 3GPP TSG RAN WG1 Meeting #90; Prague, P.R. Czech, Aug. 21-25, 2017; Source: vivo; Title: Discussion on uplink beam management; Agenda item: 6.1.2.2.6; Document for: Discussion and Decision.
R1-1712966; 3GPP TSG RAN WG1 Meeting #90; Prague, Czechia, Aug. 21-25, 2017; Agenda item: 6.1.2.2.6; Source: Sony; Title: Considerations on UL beam managementDocument for: Discussion and decision.
R1-1712968; 3GPP TSG RAN WG1 Meeting #90; Prague,Czechia Republic Aug. 21-25, 2017; Agenda Item: 6.1.2.3.5; Source: Sony; Title: Considerations on SRS design; Document for: Discussion.
R1-1712993; 3GPP TSG RAN WG1 Meeting #90; Prague, Czech Republic, Aug. 21-25, 2017; Agenda Item: 6.1.2.3.5; Source: NEC; Title: NR SRS Sequence Design; Document for: Discussion/Decision.
R1-1713245; 3GPP TSG RAN WG1 Meeting #90; Prague, Czech, Aug. 21-25, 2017; Source: Guangdong OPPO Mobile Telecom; Title: Further discussion on SRS design for NR; Agenda item: 6.1.2.3.5Document for: Discussion and Decision.
R1-1713287; 3GPP TSG RAN WG1 Meeting #90; Prague, Czech Republic, Aug. 21-25, 2017; Source: Guangdong OPPO Mobile Telecom; Title: Discussion on the UL Beam ManagementAgenda Item: 6.1.2.2.6; Document for: Discussion and Decision.
R1-1713343; 3GPP TSG RAN WG1 Meeting #90; Prague, Czechia, Aug. 21-25, 2017; Source: Panasonic; Title: Discussion on SRS sequence generation for NR; Agenda Item: 6.1.2.3.5Document for: Discussion.
R1-1713412; 3GPP TSG RAN WG1 Meeting #90; Aug. 21-25, 2017; Prague, Czech Republic; Agenda item: 6.1.2.3.5; Source: Qualcomm Incorporated; Title: Discussion on SRS DesignDocument for: Discussion/Decision.
R1-1713596; 3GPP TSG RAN WG1 Meeting #90; Prague, Czech, Aug. 21-25, 2017; Agenda item: 6.1.2.2.6; Source: Samsung; Title: Discussion on UL beam managementDocument for: Discussion and Decision.
R1-1713696; 3GPP TSG RAN WG1 Meeting #90; Prague, Czech, Aug. 21-25, 2017; Agenda Item: 6.1.2.2.6; Source: MediaTek Inc.; Title: Details on UL beam management; Document for: Discussion.
R1-1713698; 3GPP TSG RAN WG1 Meeting #90; Prague, Czech Republic, Aug. 21-25, 2017; Source: MediaTek Inc.; Title: SRS design in NR; Agenda Item: 6.1.2.3.5; Document for: Discussion.
R1-1713925; 3GPP TSG RAN WG1 Meeting #90; Prague, Czechia, Aug. 21-25, 2017; Source: NTT Docomo, Inc.; Title: Discussions on NR SRS Design; Agenda Item: 6.1.2.3.5Document for: Discussion and Decision.
R1-1714143; 3GPP TSG RAN WG1 Meeting #90; Prague, Czech Republic, Aug. 21-25, 2017; Agenda item: 6.1.2.2.6; Source: InterDigital, Inc.; Title: On Efficient UL Beam ManagementDocument for: Discussion and Decision.
R1-1714146; 3GPP TSG RAN WG1 Meeting #90; Prague, Czech Republic, Aug. 21-25, 2017; Agenda Item: 6.1.2.3.5; Source: InterDigital, Inc.; Title: On SRS for NR; Document for: Discussion.
R1-1714250; 3GPP TSG RAN WG1 Meeting #90; Prague, Czech Republic, Aug. 21-25, 2017; Agenda item: 6.1.2.2.6; Source: Nokia, Nokia Shanghai Bell; Title: SRS transmission for beam managementDocument for: Discussion and Decision.
R1-1714292; 3GPP TSG-RAN WG1 #90; Prague, Czech Republic, Aug. 21-25, 2017; Source: Ericsson; Title: On UL beam management; Agenda Item: 6.1.2.2.6; Document for: Discussion and Decision.
R1-1714316; 3GPP TSG-RAN WG1 #90; Prague, Czechia, Aug. 21-25, 2017; Source: Ericsson; Title: On SRS Design; Agenda Item: 6.1.2.3.5; Document for: Discussion and Decision.
R1-1714383; 3GPP TSG RAN WG1 Meeting #90; Prague, Czech Republic, Aug. 21-25, 2017; Agenda Item: 6.1.2.2.6; Source:ASUSTeK; Title: Considerations on UE Beamforming Management Document for: Discussion and Decision.
R1-1714941; 3GPP TSG RAN WG1 Meeting #90; Prague,Czechia Republic Aug. 21-25, 2017; Agenda Item: 6.1.2.3.5; Source: Sony; Title: Summary of SRS; Document for: Discussion.
R1-1715058; 3GPP TSG RAN1 #90; Prague, Czech Republic, Aug. 21-25, 2017; Agenda Item: 6.1.2.3.5.
R1-1715454; 3GPP TSG RAN WG1 Meeting NR#3; Nagoya, Japan, Sep. 18-21, 2017; Source: ZTE, Sanechips; Title: On NR Power Control; Agenda Item: 6.7.1; Document for: Discussion and Decision.
R1-1715478; 3GPP TSG RAN WG1 Meeting NR#3; Nagoya, Japan, Sep. 18-21, 2017; Agenda Item: 6.7.1; Source: Huawei, HiSilicon; Title: General considerations on UL power control design Document for: Discussion and decision.
R1-1715505; 3GPP TSG-RAN WG1 NR adhoc #3; Nagoya, Japan, Sep. 18-21, 2017; Source: Mitsubishi Electric; Title: UL transmission power control; Agenda Item:6.7.1 NR power control frameworkDocument for: Discussion and Decision.
R1-1715651; 3GPP TSG RAN WG1 NR Ad Hoc #3; Nagoya, Japan, Sep. 18-21, 2017; Source: vivo; Title: NR UL power control framework; Agenda Item: 6.7.1; Document for: Discussion and Decision.
R1-1715675; 3GPP TSG RAN WG1 Meeting NR#3; Nagoya, Japan, Sep. 18-21, 2017; Source: Guangdong OPPO Mobile Telecom; Title: Uplink power control mechanism for NRAgenda Item: 6.7.1; Document for: Discussion and Decision.
R1-1715838; 3GPP TSG RAN WG1 RAN1 NR AH#3; Nagoya, Japan Sep. 18-21, 2017; Source: CATT; Title: NR Power Control Framework; Agenda Item: 6.1.7.2; Document for: Discussion and Decision.
R1-1716040; 3GPP TSG RAN WG1 Meeting NR#3; Nagoya, Japan Sep. 18-21, 2017; Agenda item: 6.7; Source: Samsung; Title: On UL Power Control; Document for Discussion and Decision.
R1-1716114; 3GPP TSG RAN WG1 NR Ad-Hoc Meeting; Nagoya, Japan, Sep. 18-21, 2017; Agenda item: 6.7.1; Source: NTT Docomo, Inc.; Title: Power control framework for PUSCHDocument for: Discussion and Decision.
R1-1716127; 3GPP TSG RAN WG1 Meeting NR#3; Nagoya, Japan, Sep. 18-21, 2017; Agenda Item: 6.7.1; Source: Nokia, Nokia Shanghai Bell; Title: Discussion on NR power control frameworkDocument for: Discussion and Decision.

(56) References Cited

OTHER PUBLICATIONS

R1-1716547; 3GPP TSG RAN WG1 Meeting NR#3; Nagoya, Japan, Sep. 18-21, 2017; Agenda Item: 6.7.1; Source: ASUSTeK; Title: Power control on different SRS groupsDocument for: Discussion and Decision.
R2-1708694; (resubmission of R2-1706719); 3GPP TSG-RAN WG2#99; Berlin, Germany, Aug. 21-25, 2017 (resubmission of R2-1706719); Source: Huawei, HiSilicon; Title: RAN2 aspects of UL beam management; Agenda Item: 10.2.10; Document for: Discussion and decision.
R2-1709587; (Updated resubmission of R2-1705731); 3GPP TSG-RAN WG2 2017 RAN#99 Meeting; Berlin, Germany, Aug. 21-25, 2017; Agenda Item: 10.2.10; Source: Samsung; Title: NR beam recovery procedure; Document for: Discussion & Decision.
R2-1709589; (Resubmission of R2-1707315); 3GPP TSG-RAN WG2 2017 RAN#99 Meeting; Berlin, Germany, Aug. 21-25, 2017; Agenda Item: 10.2.10; Source: Samsung; Title: NR downlink beam management signals: Document for: Discussion for: Discussion & Decision.
Tdoc R2-1709291; 3GPP TSG-RAN WG2 #99; Berlin, Germany, Aug. 21-25, 2017; Agenda Item: Source: Ericsson; Title: Beam link monitoring in NR; Document for: Discussion, Decision.
3GPP TR 38.802 V14.1.0 (Jun. 2017); Technical Report; 3rd Generation Partnership Project; Technical Specification Group Radio Access Network; Study on New Radio Access Technology Physical Layer Aspects (Release 14).
3GPP TR 38.912 V14.0.0 (Mar. 2017); Technical Specification; 3rd Generation Partnership Project; Technical Specification Group Radio Access Network; Study on New Radio (NR) access technology (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
R1-1714259; 3GPP TSG RAN WG1 Meeting #90; Prague, Czech Republic, Aug. 21-25, 2017; Agenda item: 6.1.2.3.5; Source: Nokia, Nokia Shanghai Bell; Title: SRS design considerations in NR.
International Search Report and Written Opinion in the International Application No. PCT/US2018/049958, dated Feb. 4, 2019, (20p).
Non-Final Office Action of the U.S. Appl. No. 16/125,099, dated Apr. 21, 2020, (55p).
Notice of Allowance of the U.S. Appl. No. 16/125,099, dated Aug. 3, 2020. (18p).
Notice of Allowance of the U.S. Appl. No. 16/125,099, dated Nov. 19, 2020, (6p).
European Search Report in the European Application No. 20174061.0, dated Jun. 2, 2020, (10p).
First Office Action of the Canadian Application No. 3074301, dated May 20, 2020, (5p).
First Office Action of the Japanese Application No. 2020-511514, dated Jul. 21, 2020, (9p).
ZTE, On NR power control [online], 3GPP TSG RAN WG1 #90, R1-1712312, Aug. 12, 2017, (9p).
Catt, NR Power Control Framework [online], 3GPP TSG RAN WG1 #90, R1-1712440, Aug. 12, 2017, (16p).
Second Office Action of the Japanese Application No. 2020-511514, dated Mar. 17, 2021, (10p).
First Office Action of the Korean Application No. 10-2020-7009894, dated Sep. 17, 2020, (10p).
Non-Final Office Action of the U.S. Appl. No. 16/125,230, dated Nov. 27, 2019, (86p).
Notice of Allowance of the U.S. Appl. No. 16/125,230, dated Apr. 14, 2020, (89p).
Non-Final Office Action of the U.S. Appl. No. 16/125,115, dated May 10, 2019, (23p).
First Office Action of the Chinese Application No. 201880058096.3, dated Aug. 25, 2020, (10p).
Intel Corporation, "Discussion on UL Power Control Framework", 3GPP TSG RAN WG1 Meeting #90, R1-1712613, dated Aug. 12, 2017, (6p).
LG Electronics, "Consideration on UL power control process for NR", 3GPP TSG RAN WG1 Meeting #90, R1-1713223, dated Aug. 12, 2017, (6p).

\* cited by examiner

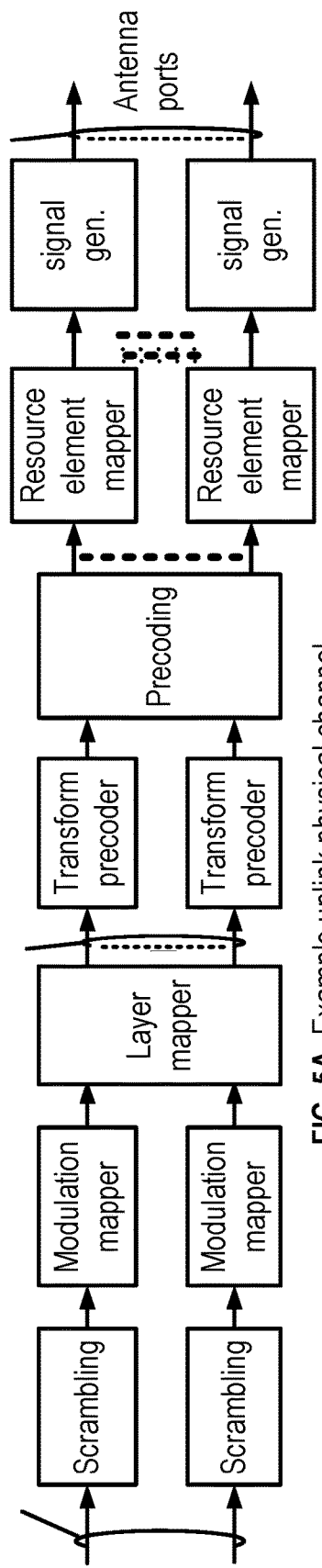
FIG. 5A Example uplink physical channel
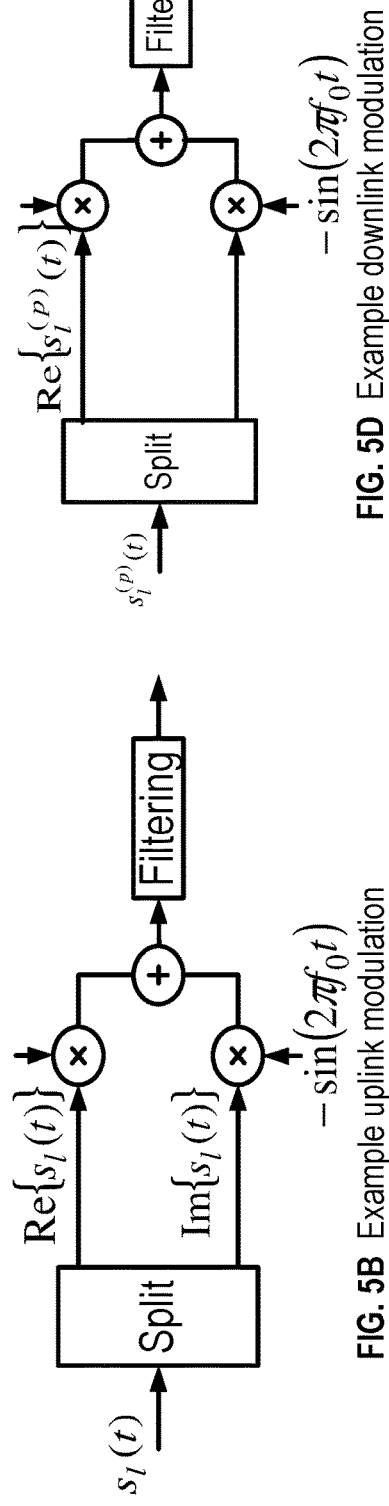
FIG. 5B Example uplink modulation
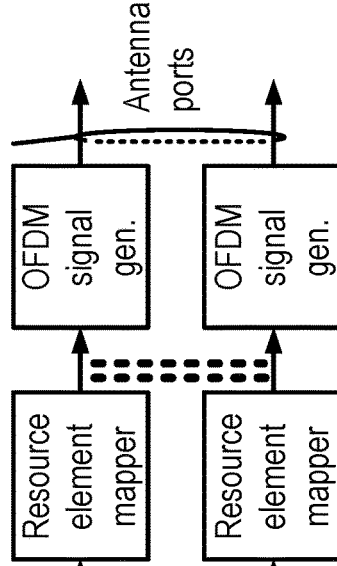
FIG. 5D Example downlink modulation
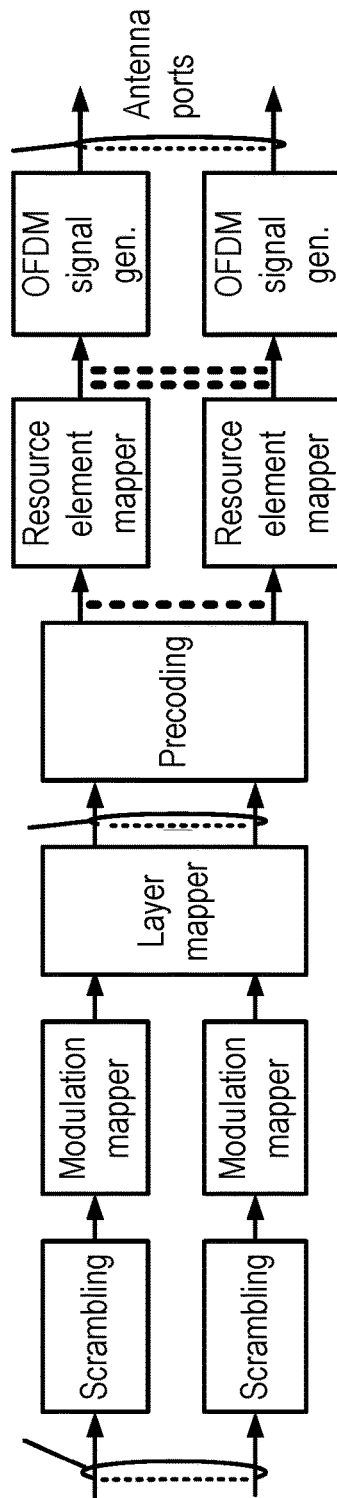
FIG. 5C Example downlink physical channel FIG. 7  Dual-Connectivity- two MAC entities at UE side

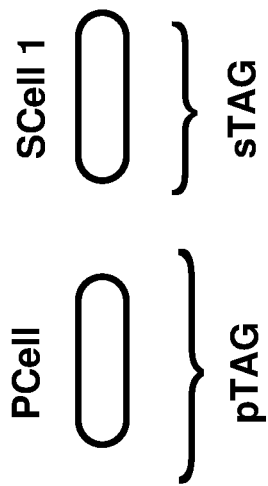
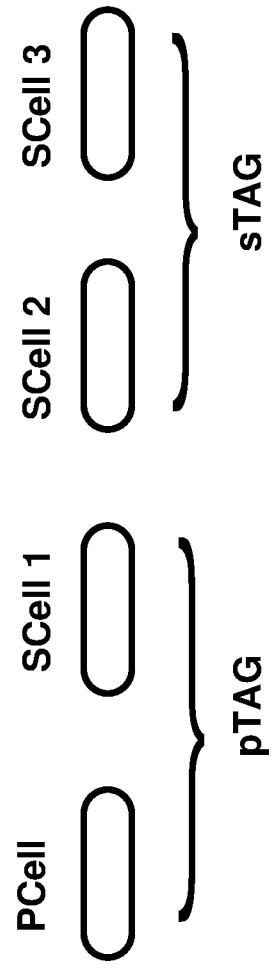
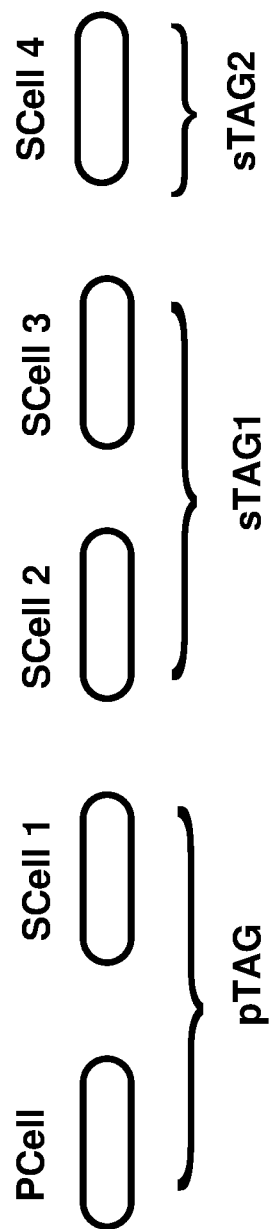
FIG. 8 gNB connected to NGC eLTE eNB connected to NGC

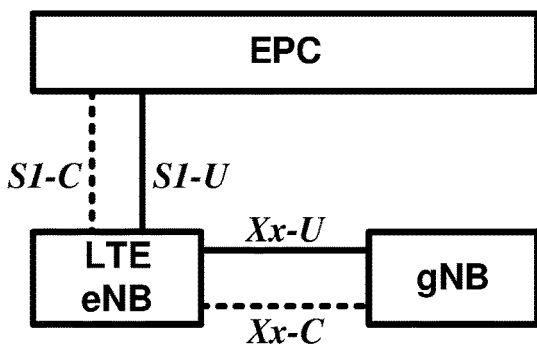

LTE eNB connected to EPC with non-standalone gNB.
gNB user plane connected to EPC via LTE eNB.

FIG. 11A

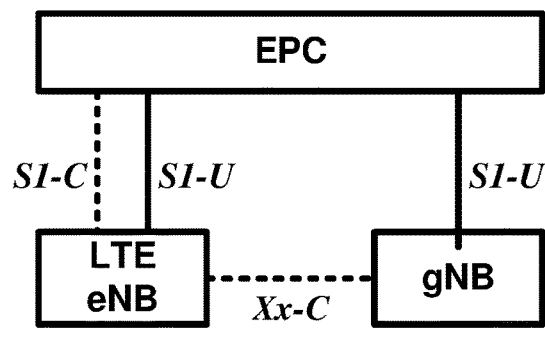

LTE eNB connected to EPC with non-standalone gNB.
gNB user plane connected to EPC directly.

FIG. 11B

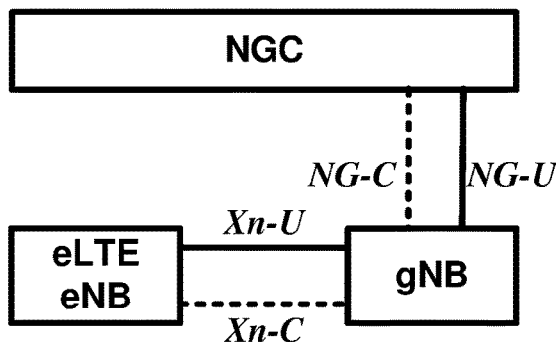

gNB connected to NGC with non-standalone eLTE eNB.
eLTE eNB user plane connected to NGC via gNB.

FIG. 11C

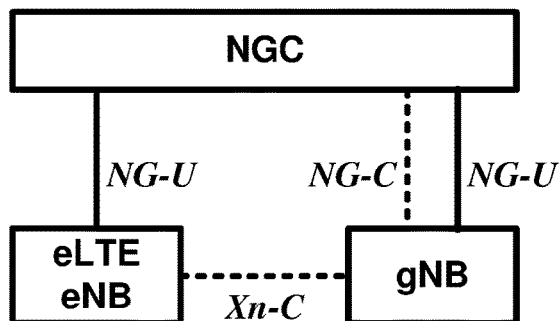

gNB connected to NGC with non-standalone eLTE eNB.
eLTE eNB user plane connected to NGC directly.

FIG. 11D

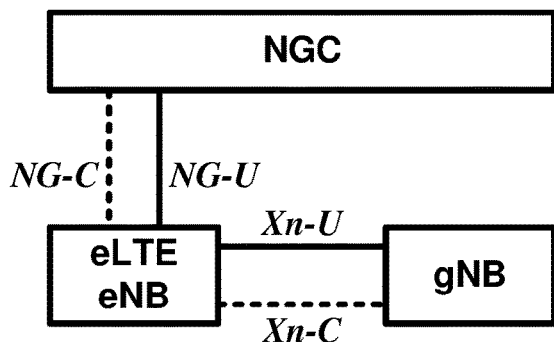

eLTE eNB connected to NGC with non-standalone gNB.
gNB user plane connected to NGC via eLTE eNB.

FIG. 11E

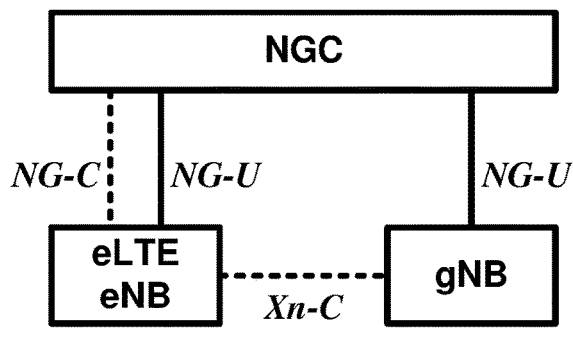

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

Beam failure in one TRP

Beam failure in multiple TRPs

Receive, by a wireless device from a base station, radio resource control message(s) comprising: 1st configuration parameters of cells comprising a 1st cell and a 2nd cell; and 2nd configuration parameters of 1st SRSs of a beam management for the 1st cell
2710

Transmit at least a 1st SRS of the 1st SRSs via the 1st cell
2720

Dropping a configured/scheduled transmission of a 2nd signal, in response to: the configured/scheduled transmission of the 2nd signal via the 2nd cell overlapping in time with the transmission of the at least 1st SRS; and a total transmission power exceeding a 2st total allowable power value
2730

FIG. 27

Receive, by a wireless device from a base station, radio resource control message(s) comprising: 1st configuration parameters of cells comprising a 1st cell and a 2nd cell; and 2nd configuration parameters of 1st SRSs of a beam management for the 1st cell
2810

Transmit at least a 1st SRS of the 1st SRSs via the 1st cell
2820

Adjust a transmission power of a configured/scheduled transmission of a 2nd signal, in response to: the configured/scheduled transmission of the 2nd signal via the 2nd cell overlapping in time with the transmission of the at least one SRS; and a total transmission power exceeding a 1st total allowable power value
2830

Transmit the 2nd signal via the 2nd cell with the adjusted transmission power
2840

FIG. 28

Receive, by a wireless device from a base station, radio resource control message(s) comprising configuration parameters of an uplink beam management procedure, the configuration parameters indicating: reference signal (RS) resources; and a 1st timer value for a 1st timer
3010

Receive a 1st DCI, the 1st DCI comprising: a RS index identifying a 1st RS of the RS resources; and an indicator indicating whether a 2nd DCI is present or not
3020

Transmit, the 1st RS in response to receiving the 1st DCI
3030

In in response to the indicator of the 1st DCI indicating that the 2nd DCI is present: starting the 1st timer based on the 1st timer value; and monitoring the PDCCH for the 2nd DCI
3040

Completing the uplink beam management procedure in response to the 2nd DCI
3050

FIG. 30

UPLINK BEAM MANAGEMENT IN A WIRELESS NETWORK

CROSS-REFERENCE TO RELATED APPLICATIONS

This application is a continuation of U.S. patent Ser. No. 16/125,115, filed Sep. 7, 2018, which claims the benefit of U.S. Provisional Application No. 62/555,359, filed Sep. 7, 2017, and U.S. Provisional Application No. 62/555,366, filed Sep. 7, 2017, and U.S. Provisional Application No. 62/564,626, filed Sep. 28, 2017, which are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 27 is a flow diagram of an aspect of an embodiment of the present disclosure.

FIG. 28 is a flow diagram of an aspect of an embodiment of the present disclosure.

FIG. 30 is a flow diagram of an aspect of an embodiment of the present disclosure.

DETAILED DESCRIPTION OF EMBODIMENTS

Figure 1:
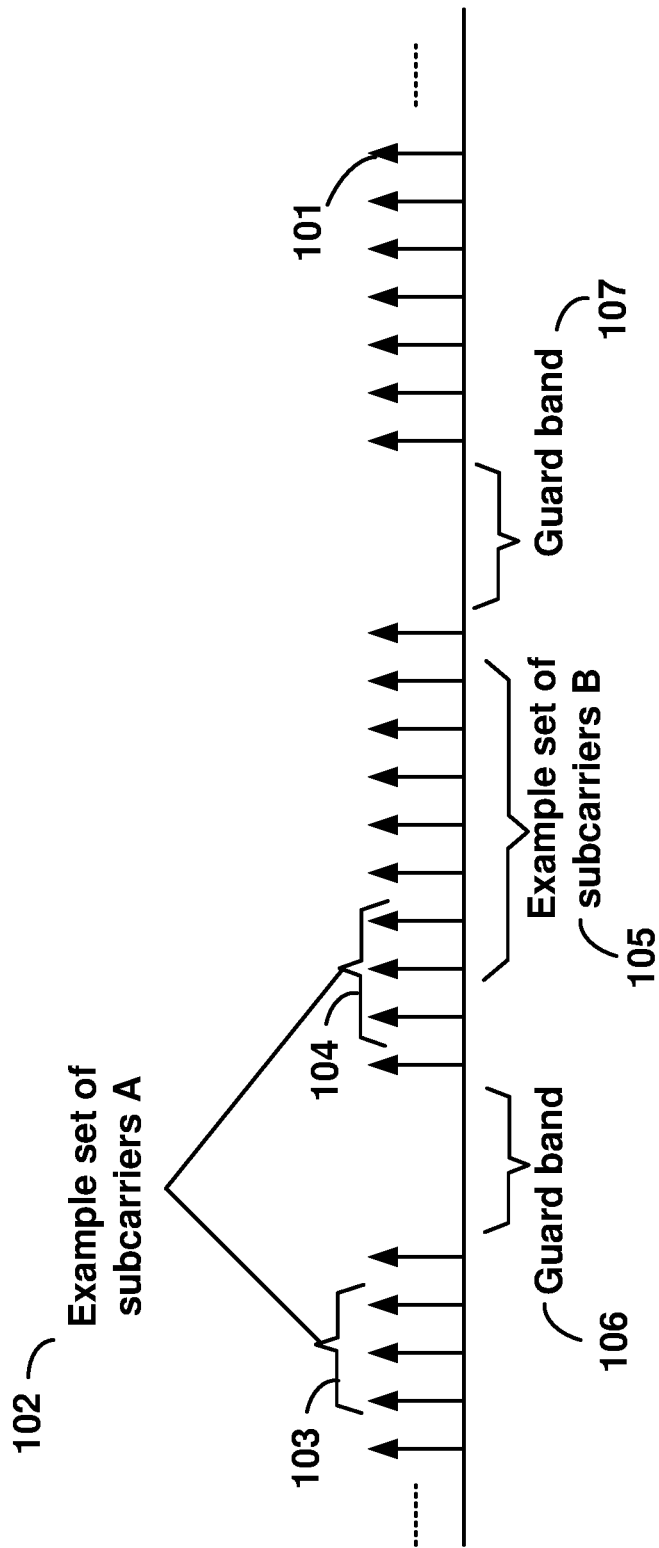
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication system.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval
TB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, 1024-QAM and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
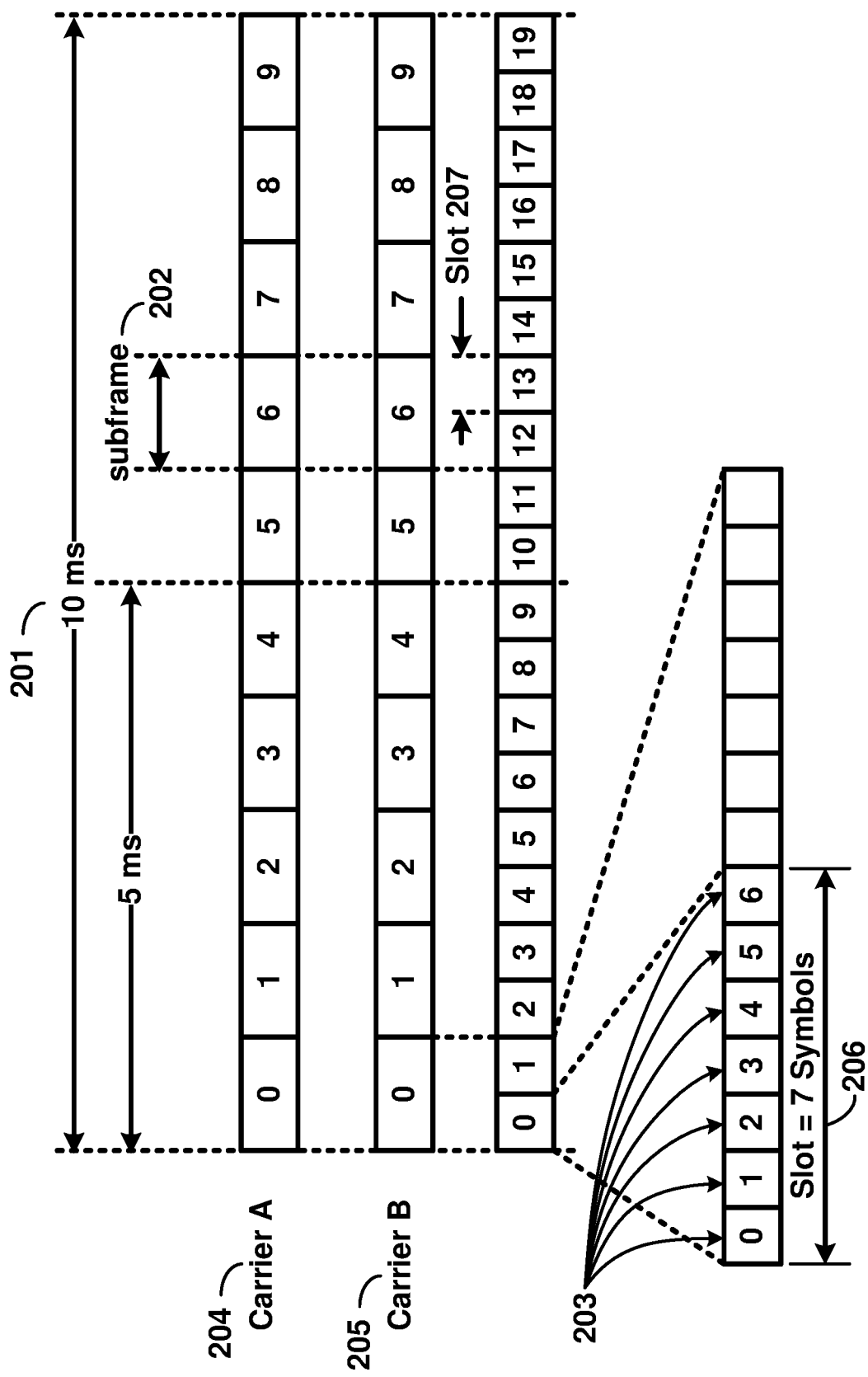
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
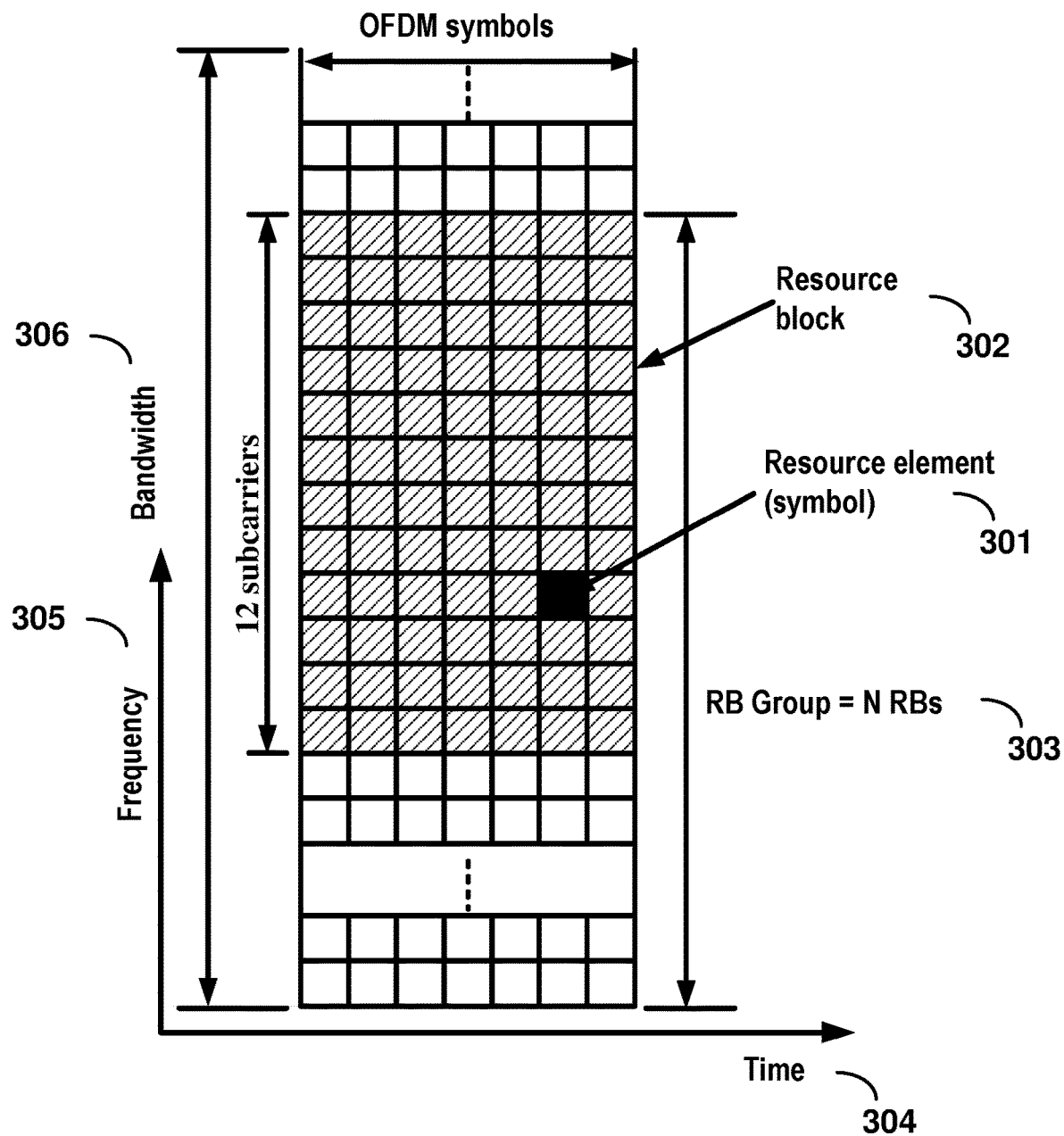
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
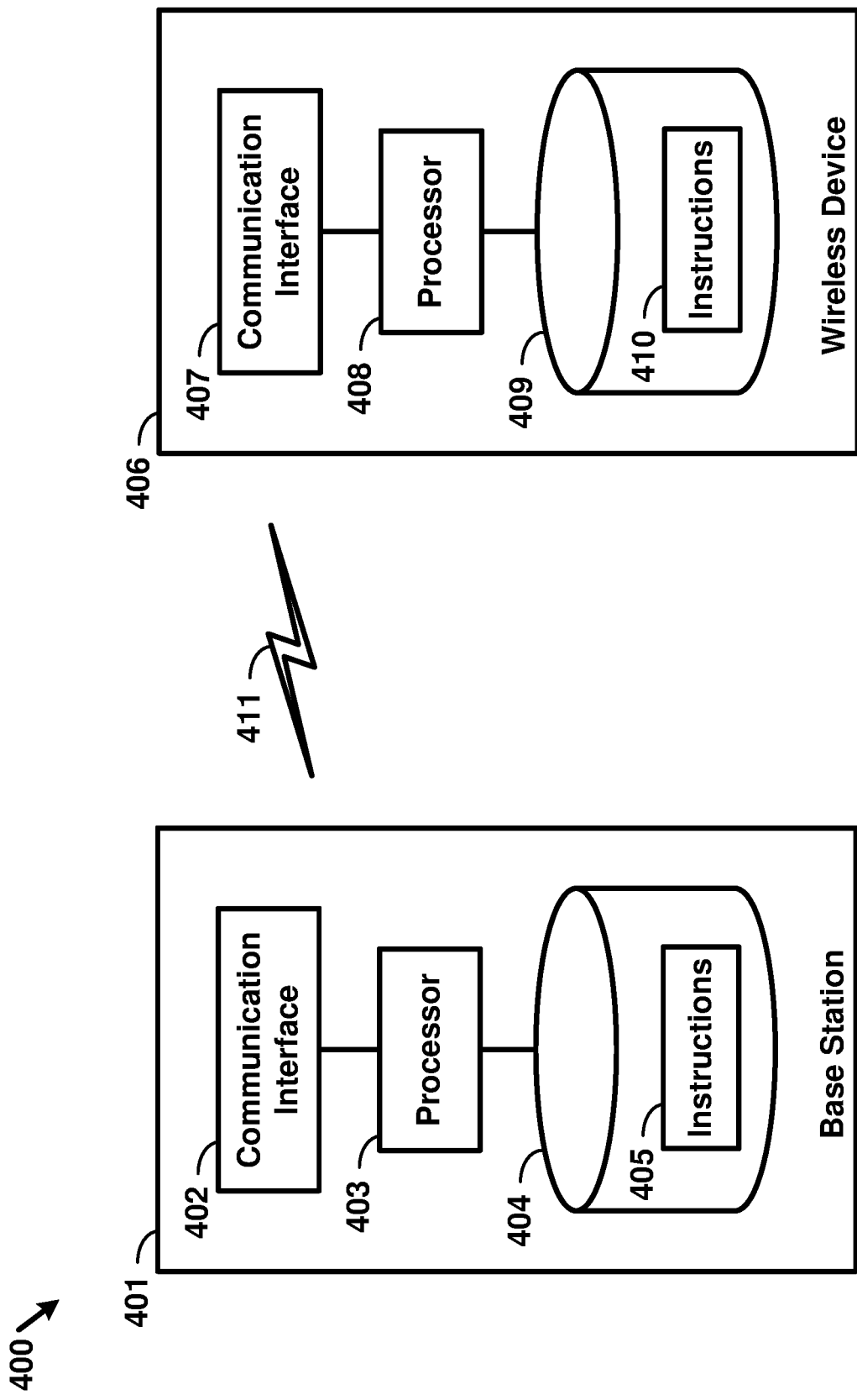
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
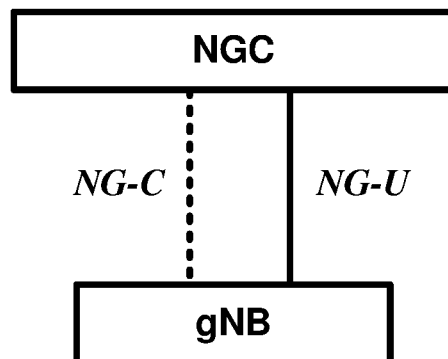
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
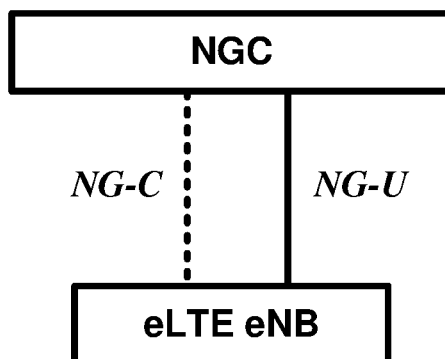

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
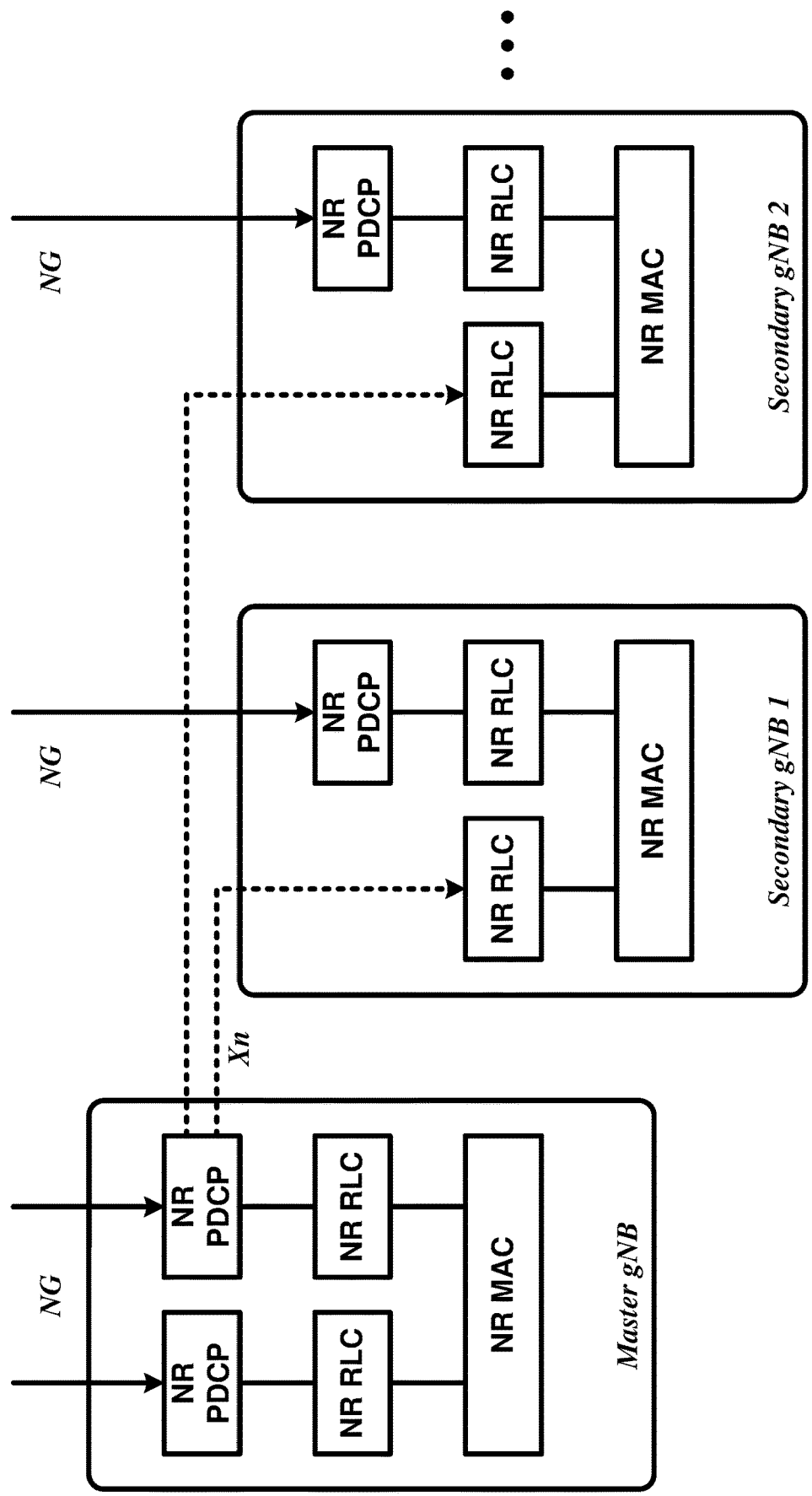
FIG. 6 is an example diagram for a protocol structure with multi-connectivity as per an aspect of an embodiment of the present disclosure.
Figure 7:
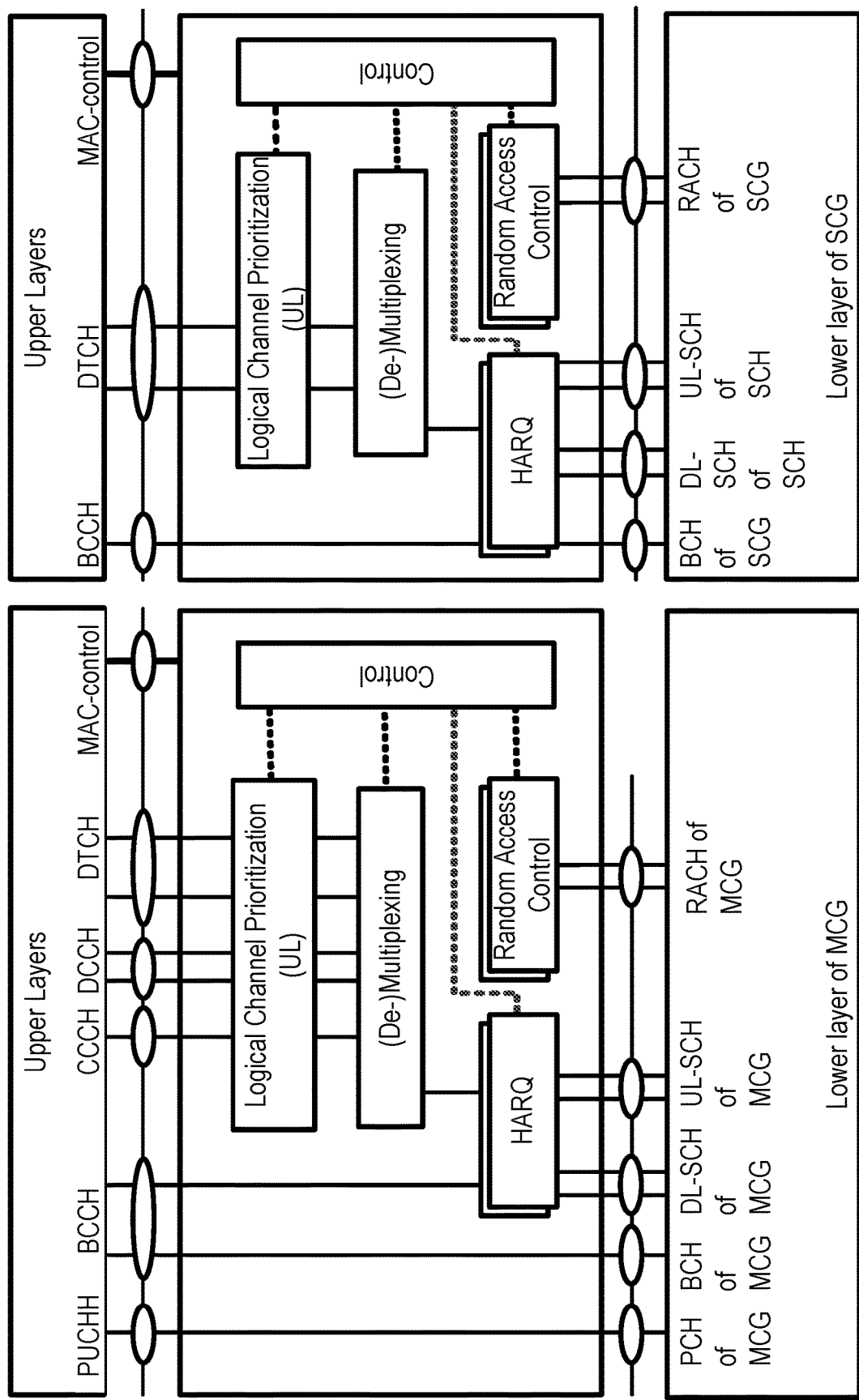
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
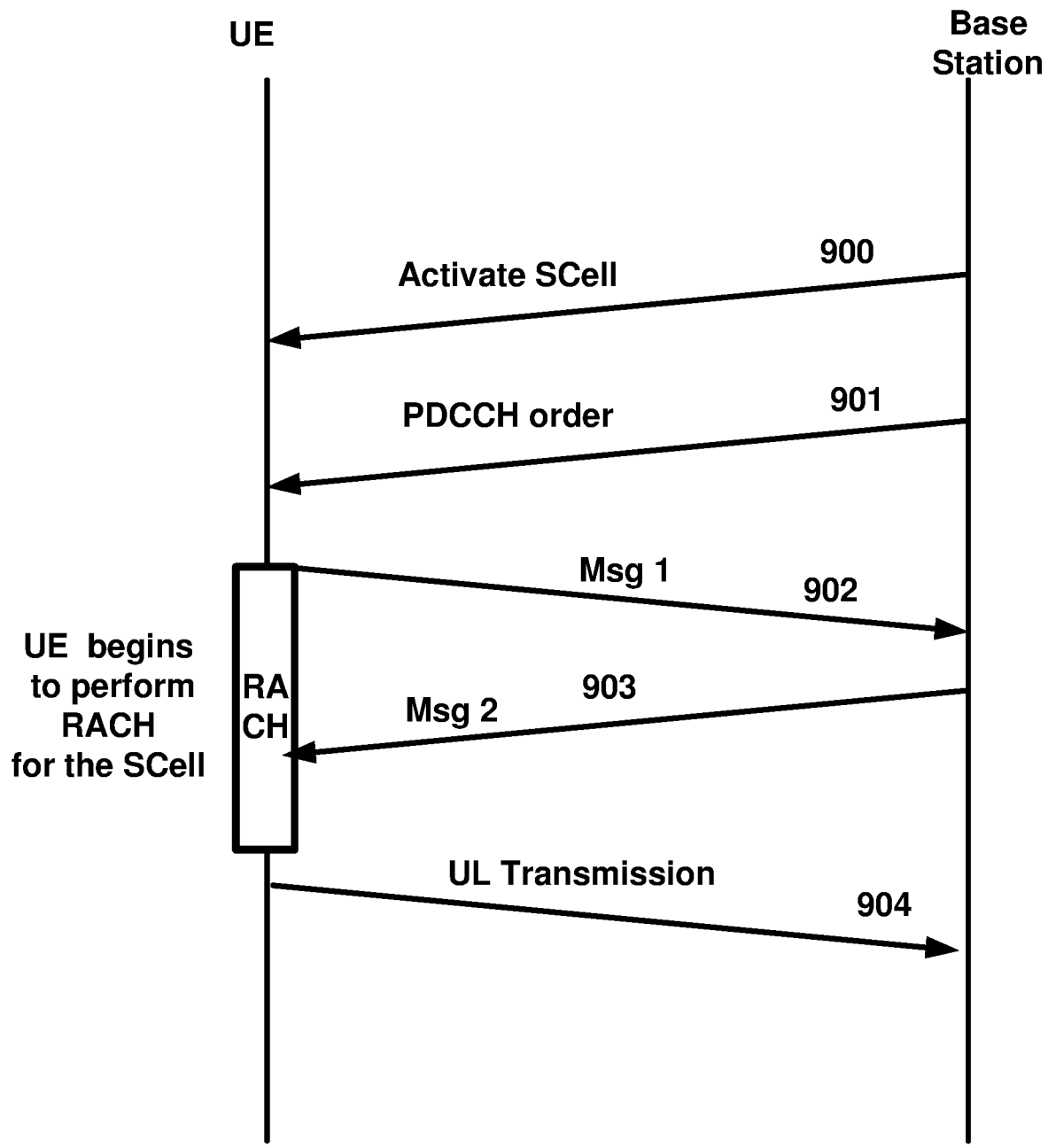
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 900 to activate an SCell. A preamble 902 (Msg1) may be sent by a UE in response to a PDCCH order 901 on an SCell belonging to an sTAG. In an example embodiment, preamble transmission for SCells may be controlled by the network using PDCCH format 1A. Msg2 message 903 (RAR: random access response) in response to the preamble transmission on the SCell may be addressed to RA-RNTI in a PCell common search space (CSS). Uplink packets 904 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
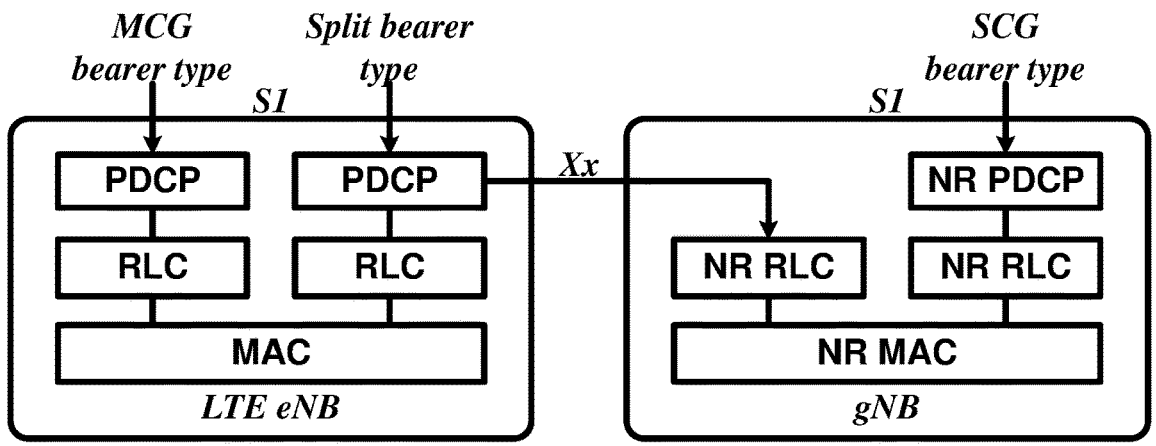
FIG. 12A, FIG. 12B, and FIG. 12C are example diagrams for radio protocol structures of tight interworking bearers as per an aspect of an embodiment of the present disclosure.
Figure 12B:
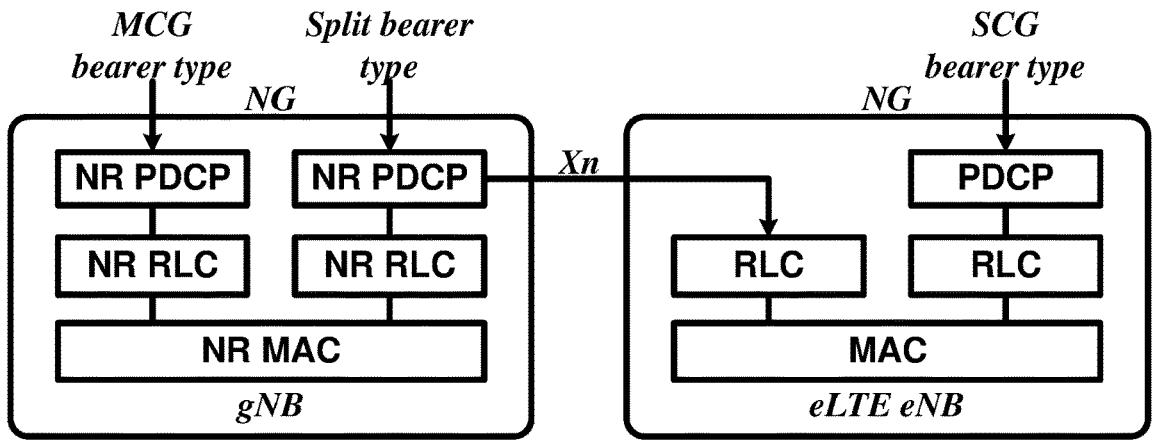
Figure 12C:
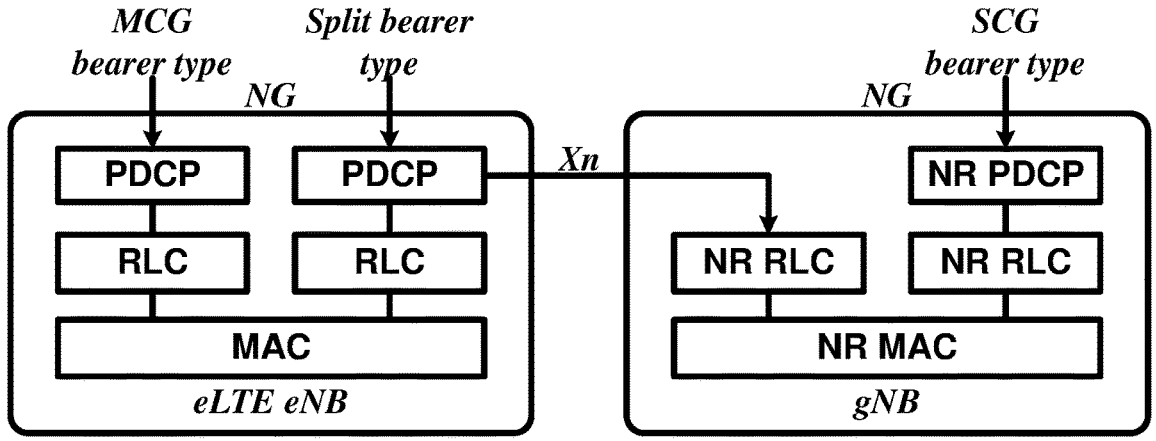

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
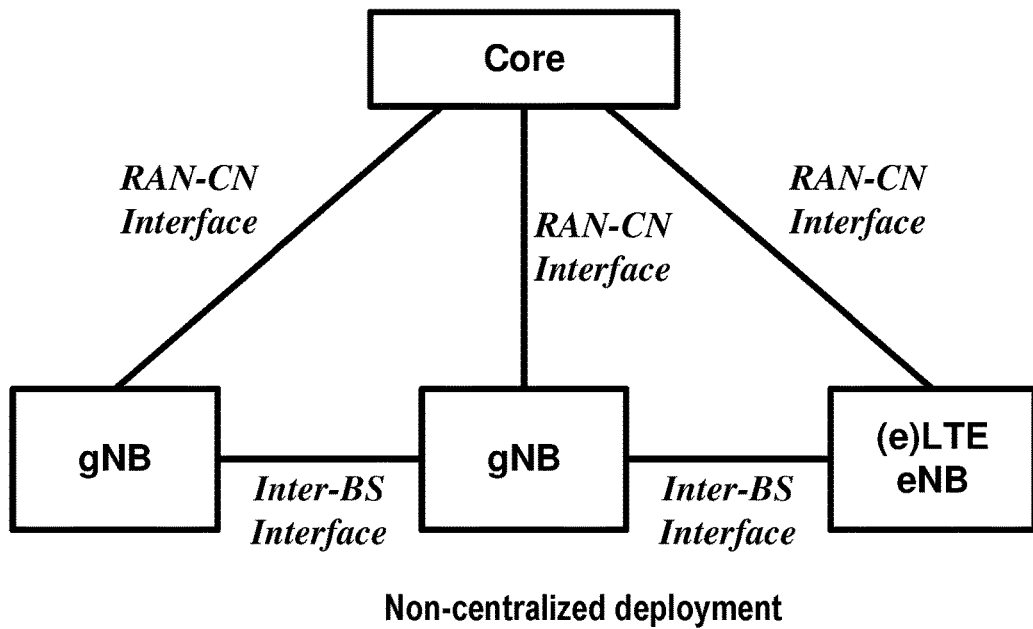
FIG. 13A and FIG. 13B are example diagrams for gNB deployment scenarios as per an aspect of an embodiment of the present disclosure.
Figure 13B:
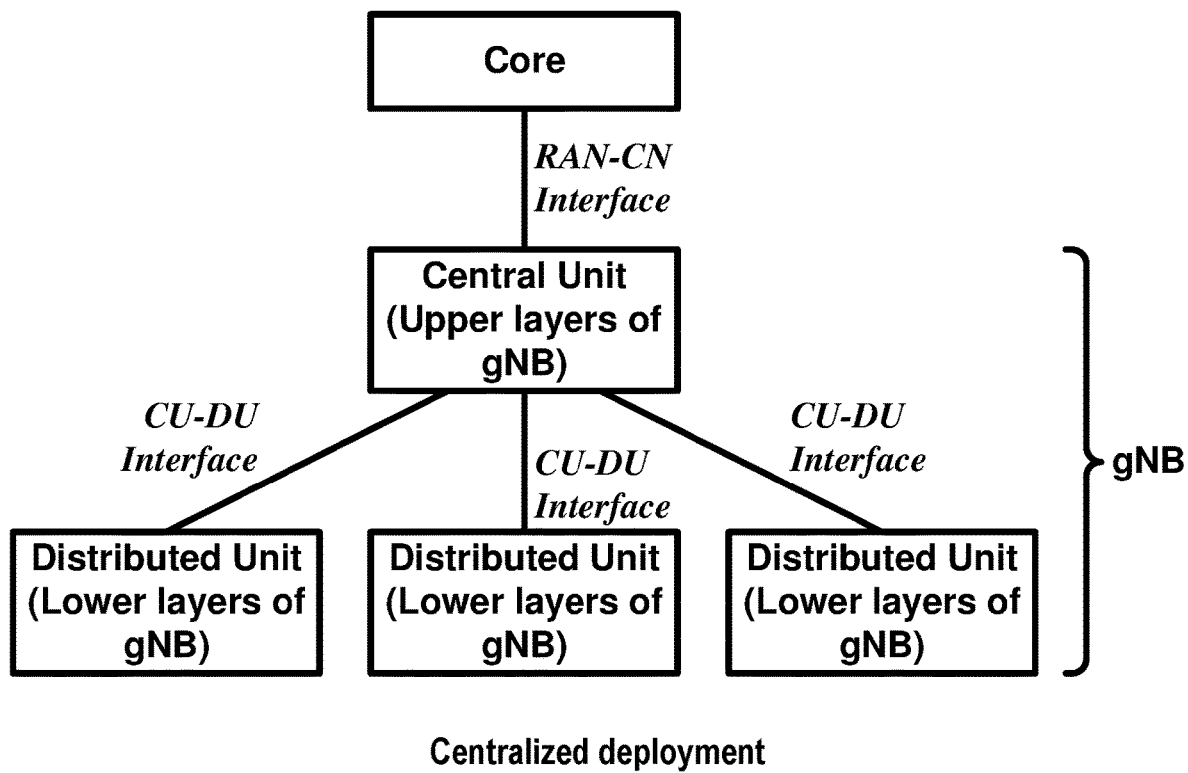

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
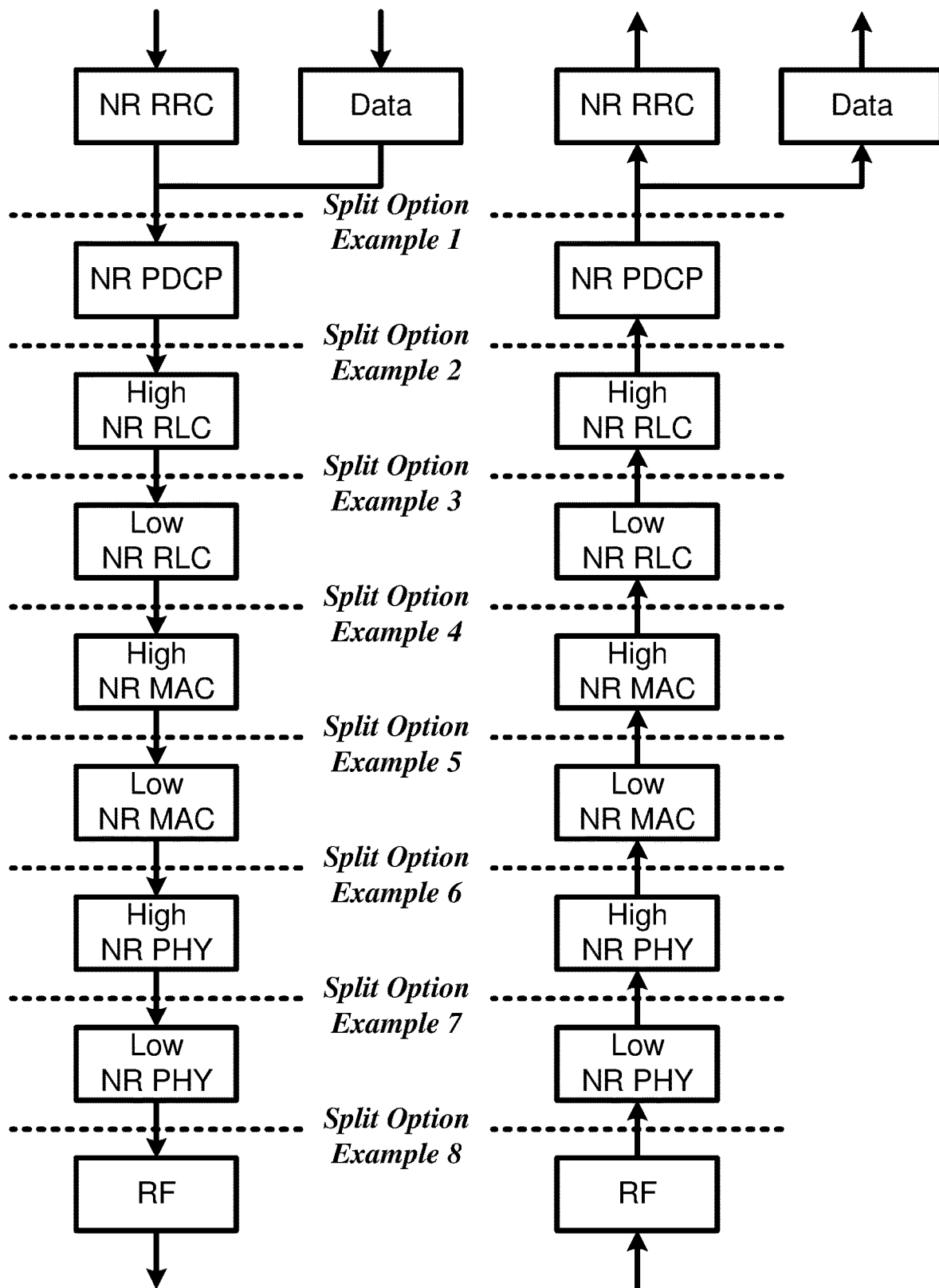
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping for uplink direction to access a cell. In a single beam scenario, a gNB may configure time-repetition transmission for one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of these signals and physical channels in multiple beams. A UE may identify at least OFDM symbol index, slot index in a radio frame and radio frame number from an SS block.

Figure 15:
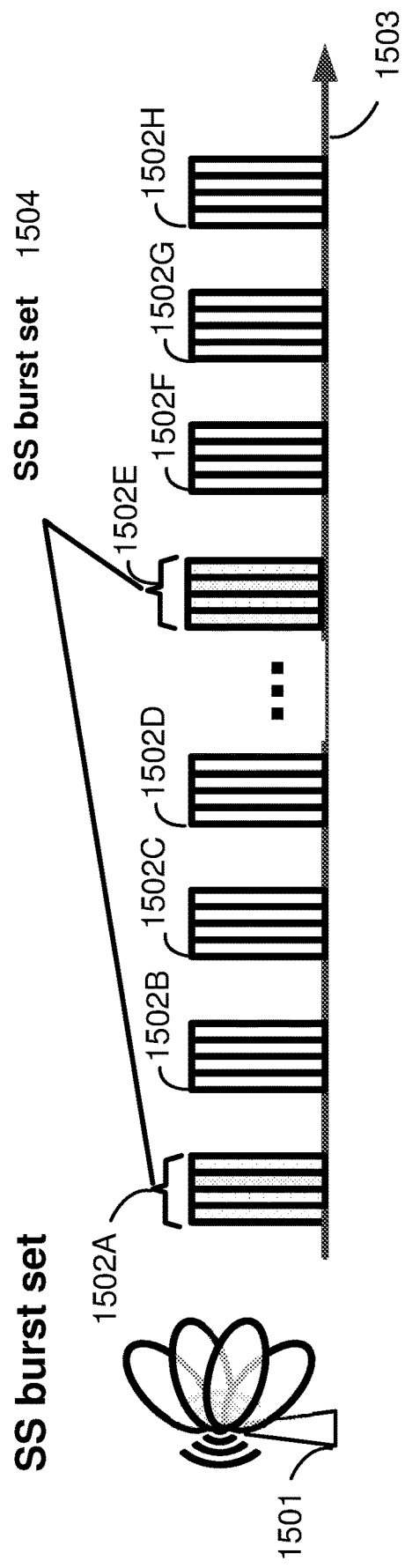
FIG. 15 is an example diagram for synchronization signal block transmission as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. A beam has a steering direction. If multiple SS bursts are transmitted with beams, these SS bursts together may form an SS burst set as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

Figure 16:
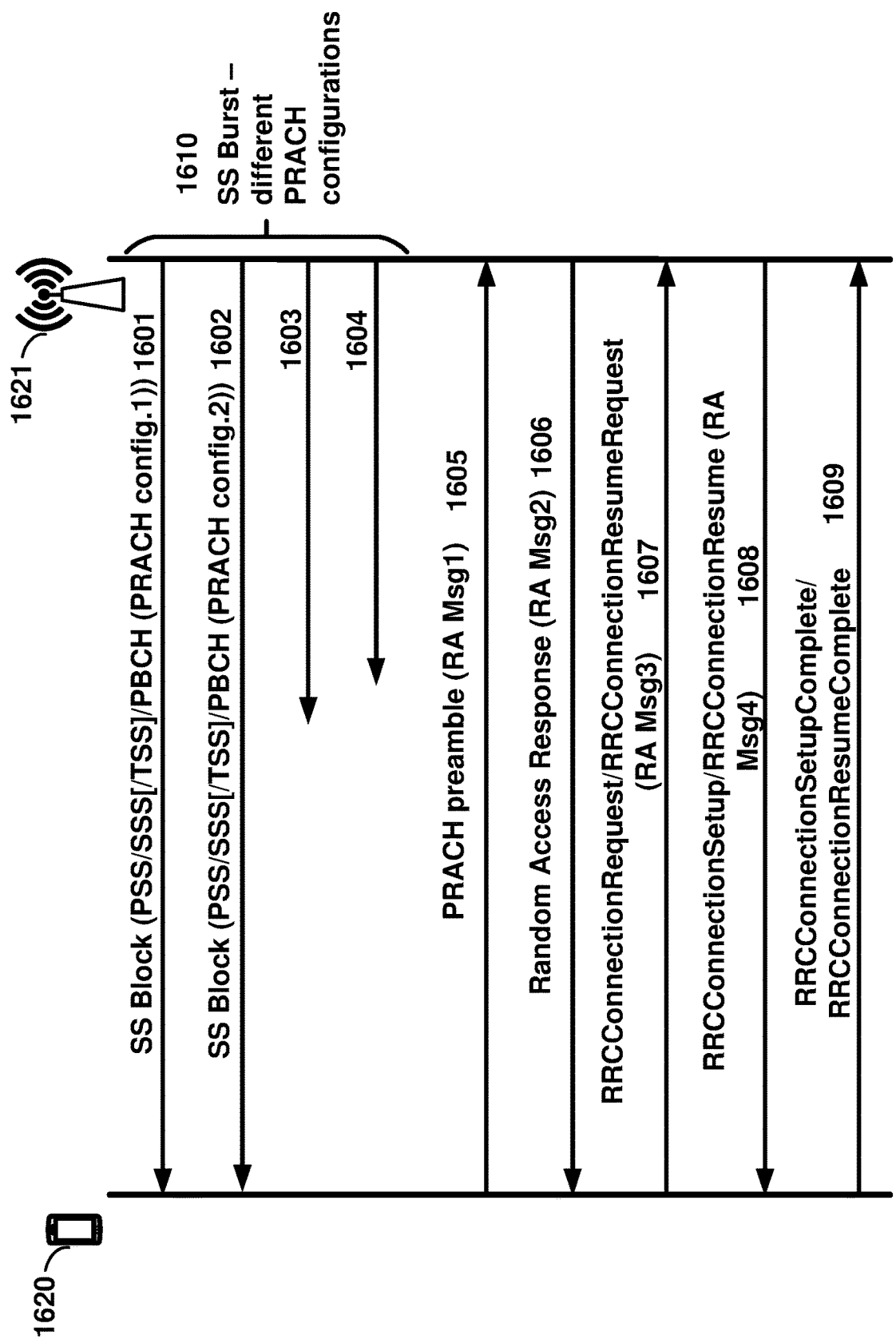
FIG. 16 is an example diagram of random access procedure with multiple beams as per an aspect of an embodiment of the present disclosure.

FIG. 16 shows an example of a random access procedure (e.g., via a RACH) that may include sending, by a base station, one or more SS blocks. A wireless device 1620 (e.g., a UE) may transmit one or more preambles to a base station 1621 (e.g., a gNB in NR). Each preamble transmission by the wireless device may be associated with a separate random access procedure, such as shown in FIG. 16. The random access procedure may begin at step 1601 with a base station 1621 (e.g., a gNB in NR) sending a first SS block to a wireless device 1621 (e.g., a UE). Any of the SS blocks may comprise one or more of a PSS, SSS, tertiary synchronization signal (TSS), or PBCH signal. The first SS block in step 1601 may be associated with a first PRACH configuration. At step 1602, the base station 1621 may send to the wireless device 1620 a second SS block that may be associated with a second PRACH configuration. At step 1603, the base station 1621 may send to the wireless device 1620 a third SS block that may be associated with a third PRACH configuration. At step 1604, the base station 1621 may send to the wireless device 1620 a fourth SS block that may be associated with a fourth PRACH configuration. Any number of SS blocks may be sent in the same manner in addition to, or replacing, steps 1603 and 1604. An SS burst may comprise any number of SS blocks. For example, SS burst 1610 comprises the three SS blocks sent during steps 1602-1604.

The wireless device 1620 may send to the base station 1621 a preamble, at step 1605, e.g., after or in response to receiving one or more SS blocks or SS bursts. The preamble may comprise a PRACH preamble, and may be referred to as RA Msg 1. The PRACH preamble may be transmitted in step 1605 according to or based on a PRACH configuration that may be received in an SS block (e.g., one of the SS blocks from steps 1601-1604) that may be determined to be the best SS block beam. The wireless device 1620 may determine a best SS block beam from among SS blocks it may receive prior to sending the PRACH preamble. The base station 1621 may send a random access response (RAR), which may be referred to as RA Msg2, at step 1606, e.g., after or in response to receiving the PRACH preamble. The RAR may be transmitted in step 1606 via a DL beam that corresponds to the SS block beam associated with the PRACH configuration. The base station 1621 may determine the best SS block beam from among SS blocks it previously sent prior to receiving the PRACH preamble. The base station 1621 may receive the PRACH preamble according to or based on the PRACH configuration associated with the best SS block beam.

The wireless device 1620 may send to the base station 1621 an RRCConnectionRequest and/or RRCConnectionResumeRequest message, which may be referred to as RA Msg3, at step 1607, e.g., after or in response to receiving the RAR. The base station 1621 may send to the wireless device 1620 an RRCConnectionSetup and/or RRCConnectionResume message, which may be referred to as RA Msg4, at step 1608, e.g., after or in response to receiving the RRCConnectionRequest and/or RRCConnectionResumeRequest message. The wireless device 1620 may send to the base station 1621 an RRCConnectionSetupComplete and/or RRCConnectionResumeComplete message, which may be referred to as RA Msg5, at step 1609, e.g., after or in response to receiving the RRCConnectionSetup and/or RRCConnectionResume. An RRC connection may be established between the wireless device 1620 and the base station 1621, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 17:
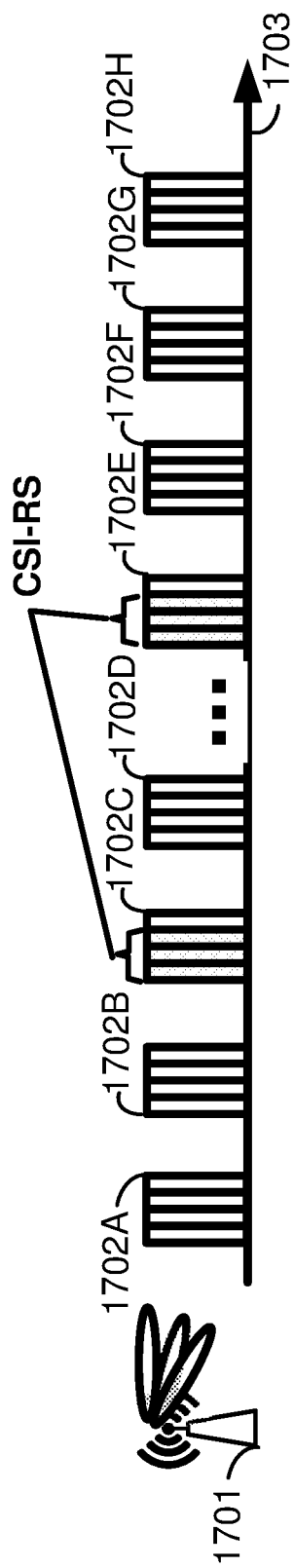
FIG. 17 is an example diagram of channel state information reference signal transmission as per an aspect of an embodiment of the present disclosure.

FIG. 17 shows an example of transmitting CSI-RSs periodically for a beam. A base station 1701 may transmit a beam in a predefined order in the time domain, such as during time periods 1703. Beams used for a CSI-RS transmission, such as for CSI-RS 1704 in transmissions 1702C and/or 1703E, may have a different beam width relative to a beam width for SS-blocks transmission, such as for SS blocks 1702A, 1702B, 1702D, and 1702F-1702H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 18:
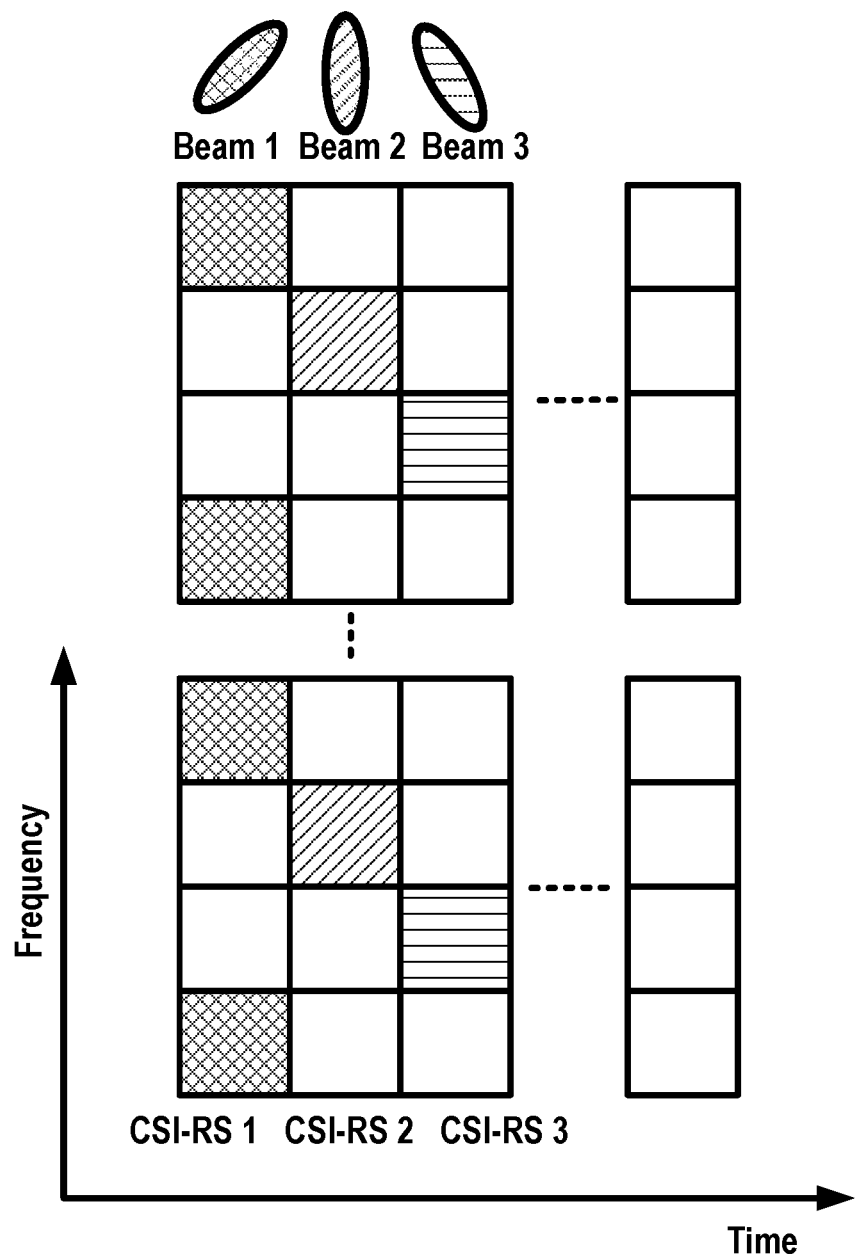
FIG. 18 is an example diagram of channel station information reference signal transmission as per an aspect of an embodiment of the present disclosure.

FIG. 18 shows an example of a CSI-RS that may be mapped in time and frequency domains. Each square shown in FIG. 18 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 18 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

Figure 20A:
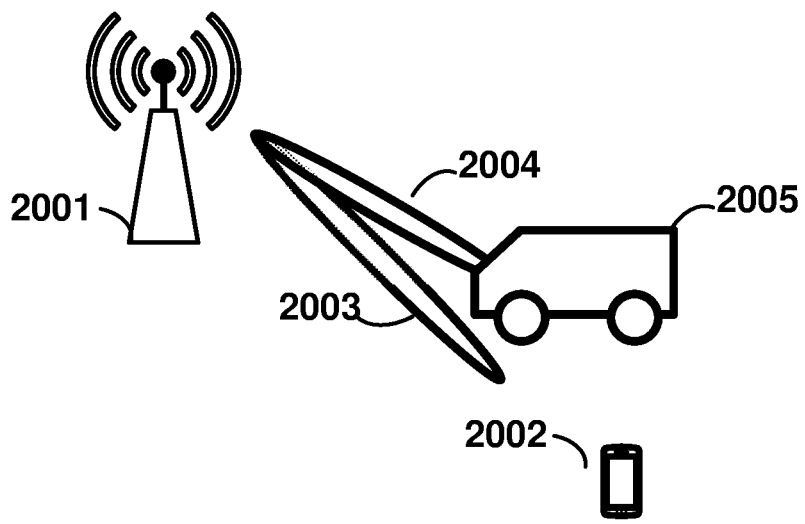
FIG. 20A and FIG. 20B are example diagrams of downlink beam failure in one TRP and in multiple TRPs respectively as per an aspect of an embodiment of the present disclosure.
Figure 20B:
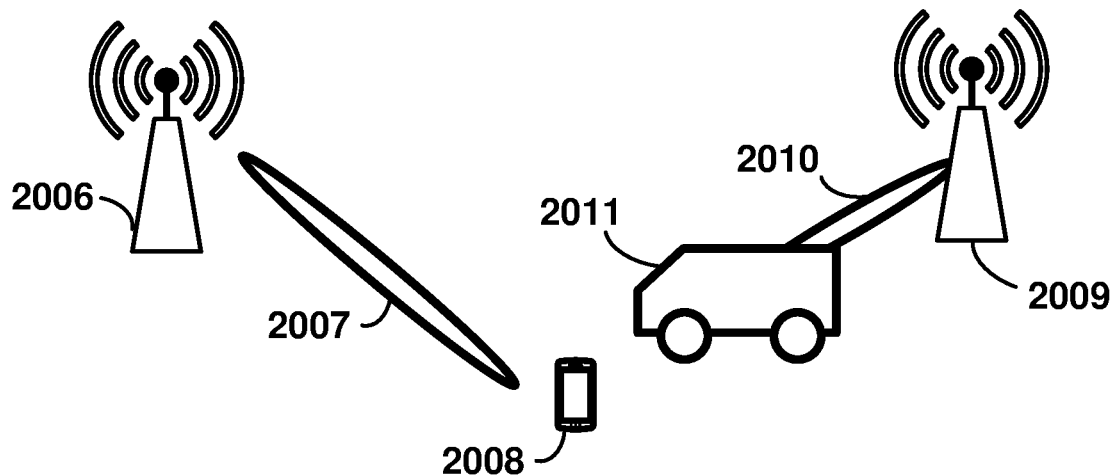

A base station and/or a wireless device may perform a downlink L1/L2 beam management procedure. One or more downlink L1/L2 beam management procedures may be performed within one or multiple transmission and receiving points (TRPs), such as shown in FIG. 20A and FIG. 20B, respectively.

Figure 19:
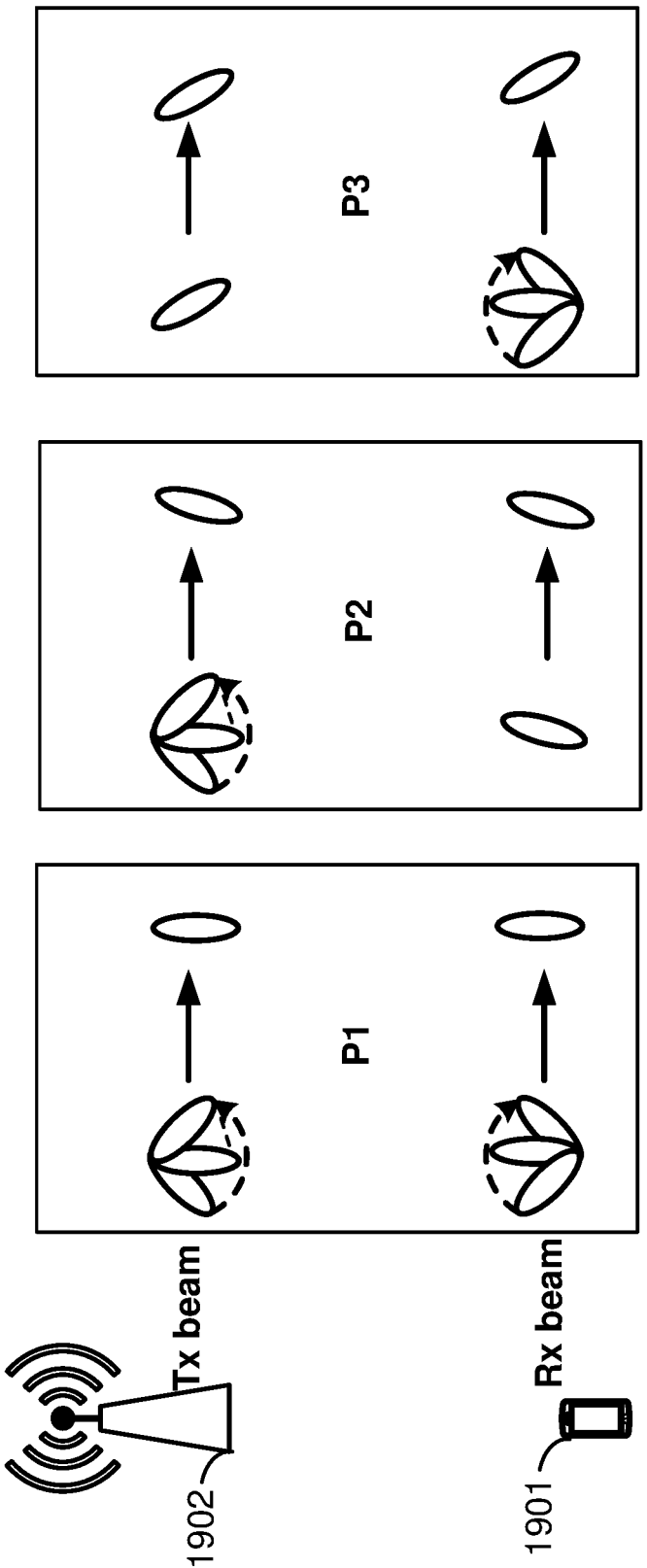
FIG. 19 is an example diagram of downlink beam management procedures as per an aspect of an embodiment of the present disclosure.

FIG. 19 shows examples of three beam management procedures, P1, P2, and P3. Procedure P1 may be used to enable a wireless device measurement on different transmit (Tx) beams of a TRP (or multiple TRPs), e.g., to support a selection of Tx beams and/or wireless device receive (Rx) beam(s) (shown as shaded ovals in the top row and bottom row, respectively, of P1). Beamforming at a TRP (or multiple TRPs) may include, e.g., an intra-TRP and/or inter-TRP Tx beam sweep from a set of different beams (shown, in the top rows of P1 and P2, as unshaded ovals rotated in a counter-clockwise direction indicated by the dashed arrow). Beamforming at a wireless device 1901, may include, e.g., a wireless device Rx beam sweep from a set of different beams (shown, in the bottom rows of P1 and P3, as unshaded ovals rotated in a clockwise direction indicated by the dashed arrow). Procedure P2 may be used to enable a wireless device measurement on different Tx beams of a TRP (or multiple TRPs) (shown, in the top row of P2, as unshaded ovals rotated in a counter-clockwise direction indicated by the dashed arrow), e.g., which may change inter-TRP and/or intra-TRP Tx beam(s). Procedure P2 may be performed, e.g., on a smaller set of beams for beam refinement than in procedure P1. P2 may be a particular example of P1. Procedure P3 may be used to enable a wireless device measurement on the same Tx beam (shown as shaded oval in P3), e.g., to change a wireless device Rx beam if the wireless device 1901 uses beamforming.

A wireless device 1901 (e.g., a UE) and/or a base station 1902 (e.g., a gNB) may trigger a beam failure recovery mechanism. The wireless device 1901 may trigger a beam failure recovery (BFR) request transmission, e.g., if a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 1901 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 1902 may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 1901, and the channel characteristics from a transmission via a control channel to the wireless device, are similar or the same under a configured criterion.

FIG. 20A shows an example of a beam failure event involving a single TRP. A single TRP such as at a base station 2001 may transmit, to a wireless device 2002, a first beam 2003 and a second beam 2004. A beam failure event may occur if, e.g., a serving beam, such as the second beam 2004, is blocked by a moving vehicle 2005 or other obstruction (e.g., building, tree, land, or any object) and configured beams (e.g., the first beam 2003 and/or the second beam 2004), including the serving beam, are received from the single TRP. The wireless device 2002 may trigger a mechanism to recover from beam failure when a beam failure occurs.

FIG. 20B shows an example of a beam failure event involving multiple TRPs. Multiple TRPs, such as at a first base station 2006 and at a second base station 2009, may transmit, to a wireless device 2008, a first beam 2007 (e.g., from the first base station 2006) and a second beam 2010 (e.g., from the second base station 2009). A beam failure event may occur when, e.g., a serving beam, such as the second beam 2010, is blocked by a moving vehicle 2011 or other obstruction (e.g., building, tree, land, or any object) and configured beams (e.g., the first beam 2007 and/or the second beam 2010) are received from multiple TRPs. The wireless device 2008 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A wireless device may transmit one or more sounding reference signals (SRS). A base station may send an indication for the wireless to transmit one or more SRS for channel quality estimation, which may be to enable frequency-selective scheduling on the uplink. Additionally or alternatively, transmission of SRS may be used for other purposes, such as to enhance power control, and/or to support various startup functions for wireless devices not recently scheduled. Such startup functions may include, e.g., initial modulation and coding scheme selection, initial power control for data transmissions, timing advance, and/or frequency semi-selective scheduling. Additionally or alternatively, transmission of SRS may be used for uplink beam management. The uplink beam management may be used at least for adjusting transmission beam of the wireless device, when uplink beamforming is supported at the wireless device.

Subframes in which SRSs may be transmitted by a wireless device within a cell may be indicated by cell-specific broadcast signaling, and/or by a wireless device-specific signaling. For common configured SRS transmission, the subframes for SRS transmission may be indicated by a RRC cell-specific parameter.

A wireless device may receive an indication to transmit at least one of three types of SRS: periodic SRS transmission (e.g., type 0), aperiodic SRS transmission (e.g., type 1), semi-persistent SRS transmission (e.g., type 2). Periodic SRS transmission from a wireless may occur at regular time intervals, e.g., from as often as once every 2 ms to as infrequently as once every 160 ms. The SRS transmission may be in the last several SC-FDMA or OFDM symbols in the configured subframes, such as shown in FIG. 21.

Figure 21:
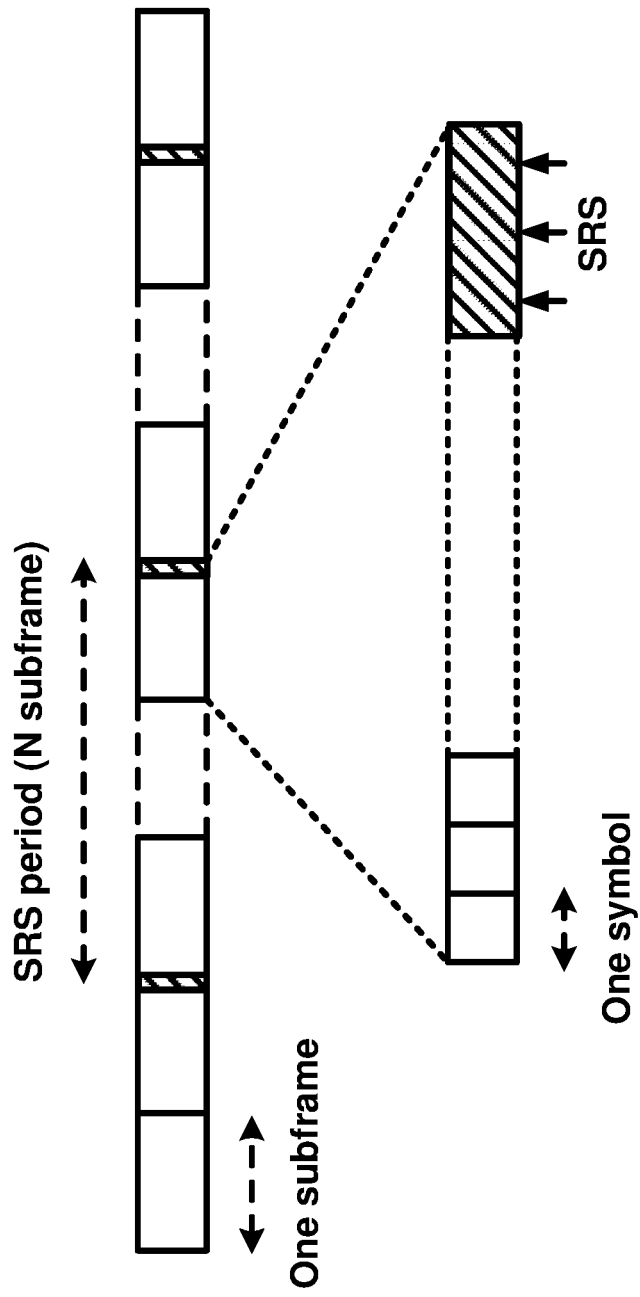
FIG. 21 is an example diagram of sounding reference signal transmission as per an aspect of an embodiment of the present disclosure.

FIG. 21 shows an example arrangement of subframes that may comprise SRS transmissions. Each rectangle at the top row of FIG. 21 may correspond to one subframe. An SRS period may comprise a plurality of subframes, such as N subframes. Each subframe may comprise a plurality of symbols, such as shown at the bottom row of FIG. 21. One or more symbols may comprise an SRS transmission. An SRS transmission may be included in each SRS period.

A base station (e.g., a gNB) may transmit, to a wireless device, a DCI. The base station may transmit the DCI via a PDCCH, e.g., as part of a scheduling grant, which may trigger an aperiodic SRS transmission, e.g., a one-shot transmission. The time instants for periodic and aperiodic SRS may be configured per device using high layer signaling. For example, for wireless device-specific periodic SRS configuration, the subframes used for SRS transmission may be indicated by a wireless device-specific RRC signaling.

A wireless device may transmit SRS precoded with same or different Tx beams within a time duration. The wireless device may determine Tx beam for SRS transmission, based on one or more of: applying gNB-transparent Tx beam to SRS (e.g., the wireless device may determine a Tx beam for each SRS port/resource), or -a base station indication (e.g., via SRI).

A wireless device may transmit SRSs, with a number of SRS ports (e.g., 1, 2, or 4), comb levels (e.g., 2 or 4), and/or configurable frequency hopping, according to configuration parameters indicated by a RRC signaling.

A wireless device may transmit SRSs using one or more configured SRS parameters. The one or more configured SRS parameters may comprise one or more of: a SRS bandwidth, SRS numerologies, density in frequency domain (e.g., comb levels) and/or in time domain (including, e.g., multi-symbol SRS transmissions), partial band size, and full band size.

A base station (e.g., a gNB) may transmit to a wireless device one or more RRC messages comprising one or more SRS configurations. At least one of the one or more SRS configuration may comprise one or more SRS resources. At least one of the one or more SRS resources may comprise a SRS resource index (SRI), a set of resource elements (RE) within a time duration and/or frequency span, and N antenna ports (e.g., where N≥1). At least one of the one or more SRS resources may be used for aperiodic transmission. A wireless device may transmit one or more SRSs by using sequences that may achieve low-peak-to-average power ratio (e.g., Zadoff-Chu sequences).

A wireless device may be equipped with multiple Tx antennas, which may enable multiple uplink Tx beam transmission. The wireless device may perform uplink beam management by configuration, at least if there is no reciprocity between downlink beamforming and uplink beamforming.

Figure 22:
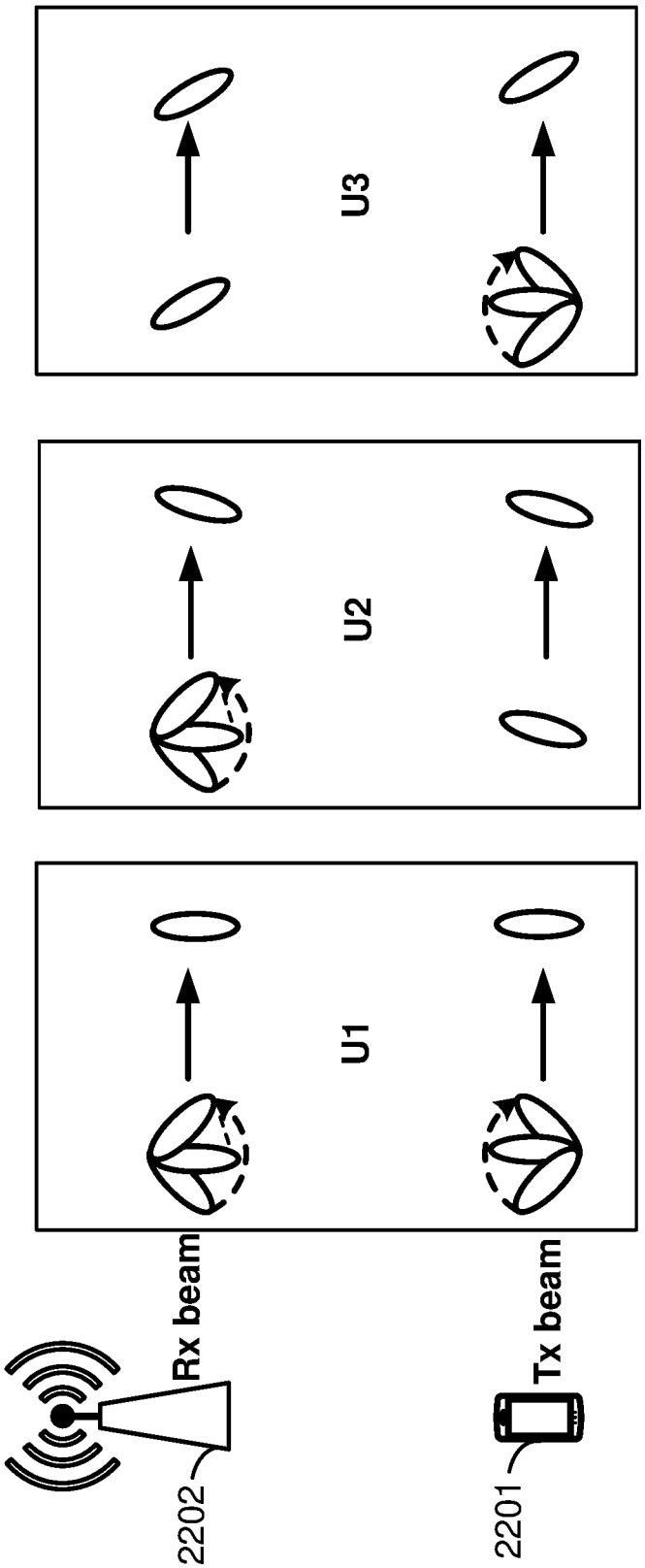
FIG. 22 is an example diagram of uplink beam management procedures as per an aspect of an embodiment of the present disclosure.

FIG. 22 shows an example of three types of uplink beam management procedures that may be supported by a wireless device 2201. A base station 2202 (e.g., a gNB) and the wireless device 2201 may perform a first type (e.g., U1) of uplink beam management procedure, e.g., to select a suitable beam pair link (shown as shaded ovals in U1) between a Tx beam of the wireless device 2201 (shown in the bottom row of U1 as unshaded ovals rotated in a clockwise direction indicated by the dashed arrow) and a Rx beam of the base station 2202 (shown in the top row of U1 as unshaded ovals rotated in a counter-clockwise direction indicated by the dashed arrow). This first type of uplink beam management procedure may comprise beam sweeping by the wireless device and/or beam sweeping by the base station 2202. The base station 2202 may perform a second type (e.g., U2) of uplink beam management procedure, e.g., to change a Rx beam such as by performing a Rx beam sweeping (shown in the top row of U2 as unshaded ovals rotated in a counter-clockwise direction indicated by the dashed arrow). During this second type of uplink beam procedure, the base station 2202 may assume that the Tx beam direction of the wireless device 2201 is fixed (shown as the shaded oval in the bottom row of U2). The wireless device 2201 may perform a third type (e.g., U3) of uplink beam management procedure, e.g., to change a Tx beam such as by performing a Tx beam sweeping (shown in the bottom row of U3 as unshaded ovals rotated in a clockwise direction indicated by the dashed arrow). During this third type of uplink beam management procedure, the base station 2202 may indicate the best Tx beam (shown as the shaded ovals in the top row of U3) to the wireless device 2201.

The wireless device 2201 may perform random access procedure on multiple Tx beams, e.g., in the first procedure U1. The base station 2202 may transmit a RAR on a Tx beam, e.g., in the first procedure U1, and the RAR may include the information of the best determined Tx beam the wireless device may use.

The base station 2202 may transmit, e.g., in the second procedure U2, an indication to the wireless device 2201 to keep a Tx beam unchanged for a configured time, during which, the base station 2202 may perform a Rx beam sweeping to find out the best determined Rx beam. The wireless device 2201 may not necessarily know which Rx beam the base station 2202 may finally select.

The base station 2202 may transmit, e.g., to the wireless device 2201 in the third procedure U3, a DCI that may trigger uplink transmit beam sweeping by the wireless device 2201 in a configured time, during which, the base station 2202 may keep the RX beam unchanged. The base station 2202 may measure the channel of the beam pair link. The base station 2202 may indicate to the wireless device 2201 a best determined Tx beam. The wireless device 2201 may use the best determined Tx beam for future uplink transmission, e.g., if the Tx beam satisfies a selection criteria.

The base station 2202 may perform beam selection based on measurement of one or more uplink reference signals (e.g., SRSs). The base station 2202 may transmit one or more message comprising one or more SRS configurations. The one or more SRS configuration may comprise one or more of: SRS resource index (SRI), SRS time parameters (e.g., subframe, offset, symbols, duration), frequency parameters (e.g., SRS bandwidth, frequency position, hopping bandwidth, comb factors), cyclic shift parameter, beam sweeping parameters (e.g., beam sweeping duration, beam rotating, or beam kept fixed). The base station 2202 may transmit one or more control information that may trigger an uplink beam sweeping. The one or more control information may comprise at least one or more SRS resources. The wireless device 2201 may transmit one or more SRSs using the SRS parameters configured by an RRC message and/or indicated by a DCI. The base station 2202 may select the Tx beam using a selection criteria (e.g., the best RSRP of received SRS). The base station 2202 may indicate, to the wireless device 2201 via one or more downlink control information, the SRI associated with the selected Tx beam.

An uplink beam failure event may occur, e.g., in the third procedure U3, if the wireless device 2201 fails to receive a DCI indicating the best Tx beam. An uplink beam failure may be recovered using an L1 or higher layer mechanism.

The base station 2202 may transmit, via a PDCCH, a DCI for scheduling decision and power-control commands. The DCI may comprise one or more of: downlink scheduling assignments, uplink scheduling grants, or power-control commands. The downlink scheduling assignments may comprise one or more of: PDSCH resource indication, transport format, HARQ information, control information related to multiple antenna schemes, or a command for power control of the PUCCH used for transmission of ACK/NACK based on or in response to downlink scheduling assignments. The uplink scheduling grants may comprise one or more of: PUSCH resource indication, transport format, HARQ related information, or a power control command of the PUSCH.

Different types of control information may correspond to different DCI payload sizes. For example, supporting spatial multiplexing with noncontiguous allocation of RBs in the frequency domain may require a larger scheduling message in comparison with an uplink grant that may allow only frequency-contiguous allocation. The DCI may be categorized into different DCI formats, where a format may correspond to a certain payload size and/or usage. The wireless device 2201 may monitor one or more PDCCH to detect one or more DCI with one or more DCI format. The one or more PDCCH may be transmitted in common search space or wireless device-specific search space. The wireless device 2201 may monitor PDCCH with only a limited set of DCI format, e.g., to save power consumption. The wireless device 2201 may not be required to detect a DCI with some DCI formats (e.g., DCI format 6, which may be used for an eMTC wireless device). The more DCI formats to be detected, the more power may be consumed at the wireless device 2201.

Information in the DCI formats that may be used for downlink scheduling may be organized into different groups. One or more fields of the DCI formats may comprise one or more of: resource information, such as a carrier indicator (e.g., 0 or 3 bits) and/or a RB allocation; a HARQ process number; an MCS, NDI, and/or RV (e.g., for the first TB and/or for the second TB); MIMO related information such as PMI, precoding information, a transport block swap flag, a power offset between PDSCH and a reference signal, a reference-signal scrambling sequence, a number of layers, and/or a number of antenna ports for a transmission; PDSCH resource-element mapping and/or QCI; downlink assignment index (DAI); a TPC for PUCCH; a SRS request (e.g., 1 bit), that may comprise an indication of or trigger for a one-shot SRS transmission; an ACK and/or NACK offset; a DCI format indication, e.g., which may be used to differentiate between DCI format 1A and DCI format 0 or other formats that may have the same message size; and/or padding (e.g., if necessary).

Information in the DCI formats that may be used for uplink scheduling may be organized into different groups. One or more fields of the DCI formats may comprise one or more of: resource information, such as a carrier indicator, resource allocation type, and/or a RB allocation; an MCS and/or NDI (e.g., for the first TB and/or for the second TB); a phase rotation of the uplink DMRS; precoding information; a CSI request, a request for an aperiodic CSI report; a SRS request (e.g., 2 bits), that may comprise an indication of or a trigger for an aperiodic SRS transmission that may use one of up to three preconfigured settings; an uplink index/DAI; a TPC for PUSCH; a DCI format indication, e.g., which may be used to differentiate between DCI format 1A and DCI format 0; and/or padding (e.g., if necessary).

A base station may transmit one or more PDCCH in different control resource sets, e.g., which may support wide bandwidth operation. The base station may transmit one or more RRC message comprising configuration parameters of one or more control resource sets. At least one of the one or more control resource sets may comprise one or more of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and/or a REG bundle size, such as for interleaved CCE-to-REG mapping (e.g., CORESET_REG_bundle).

The base station may transmit one or more message comprising configuration parameters of one or more active bandwidth parts (BWP). The one or more active BWPs may have different numerologies. The base station may transmit one or more control information for cross-BWP scheduling to a wireless device.

Transmission Power Control of SRS for Uplink Beam Management

In an example, a base station may transmit one or more radio resource control message comprising one or more parameters of uplink power control. The one or more parameters may comprise at least one of: a first power parameter (e.g., $P_O$), a second power parameter (e.g., alpha), a third power parameter (e.g., $P_{CMAX}$).

In an example, a UE may transmit a PUSCH with a transmission power ($P_{PUSCH}$). The UE may determine a transmission power $P_{PUSCH}$ on subframe i for a serving cell c by: $P_{PUSCH,c}(i) = \min\{P_{CMAX,c}(i), 10 \log_{10}(M_{PUSCH,c}(i)) +$ $P_{O\_PUSCH,c}(j)+\alpha_c(j)\cdot PL_c+\Delta_{TF,c}(i)+f_c(i)\}$[dBm]. In an example, $P_{CMAX,c}(i)$ may be a configured UE transmit power in subframe i for serving cell c. $M_{PUSCH,c}(i)$ may be a bandwidth value of the PUSCH resource assignment expressed in fraction of a resource block. $P_{O\_PUSCH,c}(j)$ and $\alpha_c(j)$ may be open loop parameters configured by high layer for the serving cell c in subframe i. $PL_c$ may be a path loss measured by the wireless device. $\Delta_{TF,c}(i)$ may be a delta parameter. $f_c(i)$ may be a current PUSCH power control adjustment state for serving cell c.

In an example, a UE may determine $f_c(i)$ based on an accumulation parameter (e.g., Accumulation-enabled or tpc-Accumulation) indicated by high layer signaling. If accumulation is enabled based on the accumulation parameter, the UE may determine $f_c(i)$ by $f_c(i)=f_c(i-1)+\delta_{PUSCH,c}(i-K_{PUSCH})$. If accumulation is not enabled based on the accumulation parameter, the UE may determine $f_c(i)=\delta_{PUSCH,c}(i-K_{PUSCH})$. In an example, $\delta_{PUSCH,c}(i-K_{PUSCH})$ may be signaled on PDCCH/EPDCCH with a DCI format (e.g., DCI format 0/0A/0B/4/4A/4B in LTE/LTE_A specification) on subframe/slot $i-K_{PUSCH}$. $K_{PUSCH}$ may be a predefined value, or a configured value.

In an example, for CSI acquisition, a UE may transmit one or more SRS with a transmit power ($P_{SRS}$). The UE may determine a transmission power $P_{SRS}$ on subframe i for serving cell c by: $P_{SRS}(i)=\min\{P_{CMAX,c}(i), 10 \log_{10}(M_{SRS,c})+P_{O\_SRS,c}(m)+\alpha_{SRS,c}\cdot PL_c+f_{SRS,c}(i)\}$[dBm], if frame structure type 2 (e.g., TDD configurations) is configured for serving cell c, and PUSCH/PUCCH transmission is not configured for serving cell c (in which case, the serving cell c is referred to as PUSCH-less cell). If frame structure for serving cell c is not frame structure type 2, (or is frame structure type 1 (e.g., FDD), or other frame structures other than frame structure type 2), and/or PUSCH/PUCCH transmission is configured for serving cell c, The UE may determine a transmission power $P_{SRS}$ on subframe i for serving cell c by: $P_{SRS,c}(i)=\min\{P_{CMAX,c}(i), P_{SRS\_OFFSET,c}(m)+10 \log_{10}(M_{SRS,c})+P_{O\_PUSCH,c}(j)+\alpha_c(j)\cdot PL_c+f_c(i)\}$ [dBm]. In an example, $P_{CMAX,c}(i)$ may be a configured UE transmit power in subframe i for serving cell c. $P_{SRS\_OFFSET,c}(m)$ may be semi-statically configured by higher layers for m=0 and m=1 for serving cell c. $M_{SRS,c}$ may be a bandwidth of the SRS transmission in subframe i for serving cell c expressed in number of resource blocks. $f_c(i)$ may be a current PUSCH power control adjustment state for serving cell c. $P_{O\_PUSCH,c}(j)$ and $\alpha_c(j)$ may be open loop parameters configured by high layer for subframe. $\alpha_{SRS,c}$ may be a higher layer parameter (e.g., alpha-SRS) configured by higher layers for serving cell c. $P_{O\_SRS,c}(m)$ may be an open loop parameter composed of a sum of a component $P_{O\_NOMINAL\_SRS,c}(m)$ which is p0-Nominal-PeriodicSRS or p0-Nominal-AperiodicSRS provided from higher layers for m=0 or 1 and a component $P_{O\_UE\_SRS,c}(m)$ which is p0-UE-PeriodicSRS or p0-UE-AperiodicSRS provided by higher layers for serving cell c.

In an example, when a serving cell c is configured with frame structure type 2 and the serving cell c is not configured with PUSCH/PUCCH transmission, a wireless device may determine the parameter $f_{SRS,c}(i)$ by $f_{SRS,c}(i)=f_{SRS,c}(i-1)+\delta_{SRS,c}(i-K_{SRS})$, when accumulation is enabled. The wireless device may determine the parameter $f_{SRS,c}(i)$ by $f_{SRS,c}(i)=\delta_{SRS,c}(i-K_{SRS})$, when accumulation is not enabled based on higher layer parameter (e.g., Accumulation-enabled, or tpc-Accumulation). $\delta_{SRS,c}(i-K_{SRS})$ is a correction value, also referred to as a SRS transmission power control (TPC) command signaled on PDCCH with a DCI format (e.g., DCI format 3B) in the most recent subframe $i-K_{SRS}$, where $K_{SRS}>=4$.

In an example, the correction value $\delta_{SRS}$ may be indicated by a TPC command field (e.g., 1 bit or 2 bits) in a DCI format (e.g., DCI format 3B). If accumulation is enabled, a 2-bit TPC command field setting to "00" may indicate the correction value $\delta_{SRS}$ is −1 dB, TPC command field setting to "01" may indicate the correction value $\delta_{SRS}$ is 0 dB, TPC command field setting to "10" may indicate the correction value $\delta_{SRS}$ is 1 dB, and TPC command field setting to "11" may indicate the correction value $\delta_{SRS}$ is 3 dB. If accumulation is not enabled, TPC command field setting to "00" may indicate the correction value $\delta_{SRS}$ is −4 dB, TPC command field setting to "01" may indicate the correction value $\delta_{SRS}$ is −1 dB, TPC command field setting to "10" may indicate the correction value $\delta_{SRS}$ is 1 dB, and TPC command field setting to "11" may indicate the correction value $\delta_{SRS}$ is 4 dB.

In an LTE/LTE_A system, SRS transmission may share with PUSCH transmission one or more power control parameters. For example, an accumulation parameter "accumulationEnabled" or "tpc-Accumulation", configured in high layer signaling, may apply for both PUSCH and SRS. TPC command in a DCI may apply for both PUSCH and SRS. In an example, when a cell is a PUSCH-less cell (e.g., configured without PUSCH/PUCCH transmission) and is configured with TDD frame structure, a base station may be allowed to configure for SRS transmission a separate/dedicated parameter indicating whether accumulation is enabled or not. A wireless device may determining $f_{SRS,c}(i)$ and/or $P_{SRS}(i)$ according to the separate/dedicated parameter. When the cell is configured with PUSCH/PUCCH transmission and/or is configured with FDD frame structure (or other frame structures other than TDD), the base station may not be allowed to configure for SRS transmission a separate/dedicated parameter indicating whether accumulation is enabled or not. The wireless device may always determine $f_{SRS,c}(i)$ and/or PSRS(i) based on the accumulation parameter configured for PUSCH transmission. For example, when the cell is configured with PUSCH/PUCCH transmission and/or is configured with FDD frame structure (or other frame structures other than TDD), if the accumulation parameter (e.g., Accumulation-enabled, or tpc-Accumulation) in a RRC message is set to "enabled", the wireless device may determine $P_{SRS}(i)$ based on $f_c(i)$, where $f_c(i)=f_c(i-1)+\delta_{PUSCH,c}(i-K_{PUSCH})$. When the cell is configured with PUSCH/PUCCH transmission and/or is configured with FDD frame structure (or other frame structures other than TDD), if the accumulation parameter (e.g., Accumulation-enabled, or tpc-Accumulation) in a RRC message is set to "not enabled" (or "disabled"), the wireless device may determine $P_{SRS}(i)$ based on $f_c(i)$, where $f_c(i)=\delta_{PUSCH,c}(i-K_{PUSCH})$. In an example, sharing some power control parameters (e.g., comprising the accumulation parameter) for PUSCH transmission and SRS transmission may be valid and straightforward for an LTE/LTE_A system, where uplink transmission beamforming may be not supported. In the LTE/LTE_A system, the wireless device may transmit SRS for a CSI acquisition. The wireless device may not be required to transmit SRS for uplink beam management in the LTE/LTE_A system.

In a NR system, a wireless device may support multiple Tx beams. The wireless device may transmit SRSs for a CSI acquisition or an uplink beam management. SRS transmission for uplink beam management may be different from SRS transmission for CSI acquisition, in terms of beam width, and/or antenna power number. For example, a UE may transmit one or more first SRSs for the uplink beam management with wide beam width and/or small number of antenna ports (e.g., 1 or 2). The UE may transmit one or more second SRSs for the CSI acquisition with narrow beam width and/or large number of antenna ports (e.g., 4 or 8). In an example, when performing uplink beam management procedure, a base station may select one or more Tx beam based on the received one or more SRS with different beam direction. In an example, when performing CSI acquisition, a base station may estimate the CSI value(s) based on the received one or more SRS with multiple antenna ports. In an example, a base station may require different receiving power for SRS transmission for uplink beam management and SRS transmission for CSI acquisition. Different receiving power may require different power control mechanism.

In an example, with the uplink beam management (e.g., U1 or U3 in FIG. 22), the wireless device may transmit multiple SRSs in a beam sweeping way to help a base station to identify a suitable beam pair link. The wireless device may not transmit PUSCH in a beam sweep way and may transmit PUSCH with a Tx beam identified in the uplink beam management. SRS transmission in a beam sweeping way may require different power control settings from PUSCH transmission with a single beam. Existing power control technologies may result in delay of uplink beam management when a wireless device support multiple Tx beam transmission. Existing power control technologies may result in extra power consumption for uplink beam management. Example embodiments may provide methods to improve uplink beam management delay and/or improve power consumption. The methods may comprise decoupling power control settings for PUSCH and SRS transmission. The methods may comprise configuring by a base station, separate power control parameters for PUSCH and SRS transmission. The methods may comprise determining by a wireless device, transmission power of PUSCH and SRS separately according to the separate power control parameters.

In an example, a base station may transmit one or more radio resource control (e.g., RRC) message comprising one or more parameters of SRS resource configuration. The one or more parameters may comprise parameters of one or more of SRS resource set. One SRS resource set may be identified by a first set index and at least one of: bandwidth; frequency hopping; transmission comb and offset; time domain resource allocation; frequency-domain position; and/or antenna ports.

In an example, a base station may transmit one or more MAC control element comprising one or more parameters indicating activation or deactivation of one or more SRS resource set. The one or more parameters may comprise parameters of the one or more of SRS resource set. One SRS resource set may be identified by a first set index and at least one of: bandwidth; frequency hopping; transmission comb and offset; time domain resource allocation; frequency-domain position; and/or antenna ports.

In an example, the one or more MAC control element for Activation/Deactivation of SRS resources may be identified by a MAC subheader with a LCID. The LCID for SRS resource MAC control element may have a fixed value, different from other LCIDs for other types of MACE CE or MAC SDU. The one or more MAC CE may have variable size according to the number of SRS process. In an example, the number of SRS process may be configured in a RRC signaling. An Activation/Deactivation SRS command may activate or deactivate SRS resources for a SRS process, associated with one or more SRS resource set. A UE may be configured with one or more SRS processes.

In an example, a base station may transmit one or more RRC message comprising one or more power control parameters of SRS transmission. The one or more power control parameters may comprise one or more SRS power control parameter set. One SRS power control parameter set may comprise at least one of: a second set index; a SRS indication parameter indicating whether absolute power control adjustment, or accumulated power control adjustment is enabled for SRS transmission; and/or one or more SRS power control parameters. The one or more SRS power control parameters may comprise at least one of: allowable transmission power (e.g., $P_{CMAX}$); target receiving power (e.g., $P_O$); power compensation factor (e.g., alpha); and/or one or more power offset.

In an example, a base station may transmit a first DCI triggering a SRS transmission for CSI acquisition. The first DCI may comprise one of: one or more SRS resource set index; one or more SRS power control parameter set index; and/or one or more power control command.

In an example, in response to receiving the first DCI, a wireless device may transmit one or more SRS with a transmission power, by using one or more SRS resource indicated by the one or more SRS resource set index. In an example, the wireless device may determine the transmission power based on one or more SRS power control parameters associated with one of the one or more SRS power control parameter set indicated by the one or more SRS power control parameter set index. The transmission power may comprise a power control adjustment. In an example, the wireless device may determine the power control adjustment based on a power control command signaled in the first DCI, if a SRS indication parameter associated with one of the one or more SRS power control parameter set indicated by the one or more SRS power control parameter set index indicates absolute power control adjustment is enabled. The UE may determine the power control adjustment based on combination of a previous SRS transmission power adjustment and the power control command signaled on the first DCI, if the SRS indication parameter indicates accumulated power control adjustment is enabled.

In an example, a base station may transmit a second DCI triggering a SRS transmission for uplink beam management. The second DCI may comprise one of: one or more second SRS resource set index; one or more second SRS power control parameter set index; and/or one or more second SRS power control command.

In an example, in response to receiving the second DCI, the wireless device may transmit one or more SRS with a transmission power, by using one or more SRS resource indicated in the one or more second SRS resource set index. In an example, the wireless device may determine the transmission power based on one or more SRS power control parameters associated with one of the one or more SRS power control parameter set indicated in the one or more second SRS power control parameter set index. The transmission power may comprise a power control adjustment. In an example, the wireless device may determine a power control adjustment based on a second power control command signaled on the second DCI, if the SRS indication parameter associated with one of the one or more SRS power control parameter set indicated by the one or more second SRS power control parameter set index indicates absolute power control adjustment is enabled. In an example, the wireless device may determine the power control adjustment based on combination of a previous SRS transmission power adjustment and a second power control command signaled on the second DCI, if the SRS indication parameter indicates accumulated power control adjustment is enabled.

In an example, by using different power control parameter configuration for different SRS (e.g., SRS for CSI acquisition, SRS for uplink beam management), a wireless device may transmit different SRS with different transmission power to meet the requirement of signal quality at a base station.

In an example, a base station may transmit one or more RRC message comprising one or more parameters of SRS resource configuration. The one or more parameters may comprise one or more of SRS resource set. One SRS resource set may comprise at least one of: bandwidth; frequency hopping; transmission comb and offset; time domain resource allocation; frequency-domain position; and/or antenna ports.

In an example, a base station may transmit one or more RRC message comprising one or more power control parameters of SRS transmission. The one or more power control parameters may comprise one or more first SRS power control parameter set for uplink beam management and one or more second SRS power control parameter set for CSI acquisition. One of the one or more first SRS power control parameter set may comprise at least one of: a SRS indication parameter indicating whether absolute power control adjustment or accumulated power control adjustment is enabled for SRS transmission; and one or more SRS power control parameters comprising at least one of: allowable transmission power (e.g., $P_{CMAX}$); target receiving power (e.g., $P_O$); power compensation factor (e.g., alpha); and/or one or more power offset. One of the one or more second SRS power control parameter set may comprise at least one of: a SRS indication parameter indicating whether absolute power control adjustment, or accumulated power control adjustment may be used for SRS transmission; and one or more SRS power control parameters comprising at least one of: allowable transmission power (e.g., $P_{CMAX}$); target receiving power (e.g., $P_O$); power compensation factor (e.g., alpha); and/or one or more power offset.

In an example, a base station may transmit a first DCI triggering a SRS transmission for CSI acquisition. The one or more DCI may comprise one of: one or more SRS resource set index; and/or one or more power control command. In response to receiving the first DCI, a wireless device may transmit one or more SRS with a transmission power, by using one or more SRS resource associated with one of the one or more SRS resource set indicated in the one or more SRS resource set index. In an example, the wireless device may determine the transmission power based on the one or more SRS power control parameters indicated in the one or more first SRS power control parameter set. The transmission power may comprise at least a power control adjustment. The power control adjustment may depend on a SRS indication parameter associated with the one or more first SRS power control parameter set.

In an example, a base station may transmit a second DCI triggering a SRS transmission for uplink beam management. The second DCI may comprise one of: one or more SRS resource set index; one or more SRS power control command. In response to receiving the second DCI, a wireless device may transmit one or more SRS with a transmission power, by using one or more SRS resource associated with one of the one or more SRS resource set indicated in the one or more SRS resource set index. The wireless device may determine the transmission power based on the one or more SRS power control parameters indicated in the one or more second SRS power control parameter set. The transmission power may comprise at least a power control adjustment. The power control adjustment may depend on the SRS indication parameter associated with the one or more second SRS power control parameter set.

In an example, a base station may transmit one or more RRC message comprising one or more parameters of SRS resource configuration. The one or more parameters may comprise one or more SRS resource set. One SRS resource set may comprise at least one of: bandwidth; frequency hopping; transmission comb and offset; time domain resource allocation; frequency-domain position; and/or antenna ports.

In an example, a base station may transmit one or more RRC message comprising one or more power control parameters of SRS transmission. The one or more power control parameters may comprise one or more first SRS power control parameter set and one or more second SRS power control parameter set. One of the one or more first SRS power control parameter set may comprise at least one of: a SRS indication parameter indicating whether absolute power control adjustment, or accumulated power control adjustment may be used for SRS transmission; and one or more SRS power control parameters comprising at least one of: allowable transmission power (e.g., $P_{CMAX}$); target receiving power (e.g., $P_O$); power compensation factor (e.g., alpha); and/or one or more power offset. One of the one or more second SRS power control parameter set may comprise at least one of: a SRS indication parameter indicating whether absolute power control adjustment, or accumulated power control adjustment may be used for SRS transmission; and one or more SRS power control parameters comprising at least one of: allowable transmission power (e.g., $P_{CMAX}$); target receiving power (e.g., $P_O$); power compensation factor (e.g., alpha); and/or one or more power offset.

In an example, the one or more first SRS power control parameter set may be used for SRS transmission for CSI acquisition. The one or more second SRS power control parameter set may be used for SRS transmission for uplink beam management.

In an example, a base station may transmit a first DCI triggering a SRS transmission for CSI acquisition. The first DCI may comprise one of: one or more SRS resource set index; one or more first SRS power control parameter set index; and/or one or more power control command. In response to receiving the first DCI, a wireless device may transmit one or more SRS with a transmission power, by using one or more SRS resource associated with one of the one or more SRS resource set indicated in the one or more SRS resource set index. The wireless device may determine the transmission power based on one or more SRS power control parameters associated with one of the one or more first SRS power control parameter set indicated by the one or more first SRS power control parameter set index, and a power control adjustment. The power control adjustment may depend on the SRS indication parameter associated with one of the one or more first SRS power control parameter set indicated by the one or more first SRS power control parameter set index.

In an example, a base station may transmit a second DCI triggering a SRS transmission for uplink beam management. The second DCI may comprise one of: one or more SRS resource set index; one or more second SRS power control parameter set index; one or more SRS power control command. In response to receiving the second DCI, a wireless device may transmit one or more SRS with a transmission power, by using one or more SRS resource associated with one of the one or more SRS resource set indicated in the one or more SRS resource set index. The wireless device may determine the transmission power based on one or more SRS power control parameters associated with one of the one or more second SRS power control parameter set indicated by the one or more second SRS power control parameter set index. The transmission power may comprise at least a power control adjustment. The power control adjustment may depend on the SRS indication parameter associated with one of the one or more second SRS power control parameter set indicated by the one or more second SRS power control parameter set index.

In an example, a base station may transmit one or more RRC message comprising one or more parameters of SRS resource configuration. The one or more parameters may comprise one or more of SRS resource set. One SRS resource set may comprise at least one of: bandwidth; frequency hopping; transmission comb and offset; time domain resource allocation; frequency-domain position; and/or antenna ports.

In an example, a base station may transmit one or more RRC message comprising one or more power control parameters of SRS transmission comprising one or more first SRS power control parameter set and one or more second SRS power control parameter set. One of the one or more first SRS power control parameter set may comprise at least one of: a SRS indication parameter indicating whether absolute power control adjustment may be used for SRS transmission, or accumulated power control adjustment may be used for SRS transmission; one or more SRS power control parameters. One of the one or more second SRS power control parameter set may comprise one or more SRS power control parameters.

In an example, the one or more first SRS power control parameter set may be used for CSI acquisition. The one or more second SRS power control parameter set may be used for uplink beam management.

In an example, a base station may transmit a first DCI triggering a SRS transmission for CSI acquisition. The first DCI may comprise one of: one or more SRS resource set index; one or more first SRS power control parameter set index; and/or one or more power control command. In response to receiving the first DCI, a wireless device may transmit one or more SRS with a transmission power, with one or more SRS resource associated with one of the one or more SRS resource set indicated in the one or more SRS resource set index. The wireless device may determine the transmission power based on the one or more SRS power control parameters associated with one of the one or more first SRS power control parameter set indicated by the one or more first SRS power control parameter set index. The transmission power may comprise at least a power control adjustment. The power control adjustment may depend on the SRS indication parameter associated with one of the one or more first SRS power control parameter set indicated by the one or more first SRS power control parameter set index.

In an example, a base station may transmit a second DCI triggering a SRS transmission for uplink beam management. The second DCI may comprise one of: one or more SRS resource set index; one or more second SRS power control parameter set index; and/or one or more power control command. In response to receiving the second DCI, a wireless device may transmit one or more SRS with a transmission power on one or more SRS resource associated with one of the one or more SRS resource set indicated in the one or more SRS resource set index. The wireless device may determine a transmission power based on the one or more SRS power control parameters associated with one of the one or more second SRS power control parameter set indicated by the one or more second SRS power control parameter set index. The transmission power may comprise at least a power control adjustment. The power control adjustment may be based on an absolute power adjustment. The power control adjustment may be based on a power control command signaled on PDCCH with the second DCI.

In an example, a base station may transmit one or more RRC message comprising one or more power control parameters of PUSCH transmission. The one or more power control parameters may comprise one or more PUSCH power control parameter set. On PUSCH power control parameter set may comprise at least one of: a first set index, a PUSCH indication parameter indicating whether absolute power control adjustment or accumulated power control adjustment may be used for PUSCH transmission, and one or more PUSCH power control parameters comprising at least one of: allowable transmission power (e.g., $P_{CMAX}$); target receiving power (e.g., $P_O$); and/or power compensation factor (e.g., alpha).

In an example, a base station may transmit a DCI indicating a PUSCH scheduling. The DCI may comprise one of: one or more PUSCH resource configuration, one or more PUSCH power control parameter set index, one or more PUSCH power control command. In an example, when receiving the DCI, a wireless device may transmit one or more PUSCH with a transmission power, on one or more PUSCH resource indicated in the one or more PUSCH resource configuration. The wireless device may determine a transmission power for PUSCH transmission, based on the one or more PUSCH power control parameters indicated in the one or more PUSCH power control parameter set index. The transmission power may comprise at least a power control adjustment. The power control adjustment may depend on the PUSCH indication parameter associated with the one or more PUSCH power control parameter set.

In an example, a base station may transmit one or more RRC message comprising one or more parameters of SRS resource configuration. The one or more parameters may comprise one or more of SRS resource set comprising at least one of: bandwidth; frequency hopping; transmission comb and offset; time domain resource allocation; frequency-domain position; and/or antenna ports. The base station may transmit one or more RRC message comprising one or more power control parameters of SRS transmission. The one or more power control parameters may comprise one or more SRS power control parameter set. One SRS power control parameter set may comprise at least one of: an SRS indication parameter indicating whether absolute power control adjustment or accumulated power control adjustment may be used for SRS transmission; and one or more SRS power control parameters. The base station may transmit one or more RRC message comprising one or more power control parameters of PUSCH transmission. The one or more power control parameters may comprise one or more PUSCH power control parameter set. One PUSCH power control parameter set may comprise at least one of: an PUSCH indication parameter indicating whether absolute power control adjustment or accumulated power control adjustment may be used; and/or one or more PUSCH power control parameters.

In an example, a base station may transmit a first DCI with one or more first DCI format triggering SRS transmission for uplink beam management, to a wireless device. The first DCI may be CRC-scrambled by a first Radio Network Temporary Identifier (RNTI). The first DCI may comprise at least one of: one or more first SRS resource set index; and one or more first SRS power control command. In response to receiving the first DCI triggering SRS transmission for uplink beam management, the wireless device may transmit SRS with a transmission power via one or more radio resource indicated in the one or more first SRS resource set index. The wireless device may determine a transmission power based on one or more SRS power control parameters in the one or more SRS power control parameter set.

In an example, a base station may transmit a second DCI with one or more second DCI format scheduling PUSCH transmission and aperiodic SRS transmission for CSI acquisition, to a wireless device. The second DCI with the one or more second DCI format may be CRC-scrambled by the first RNTI. The second DCI may comprise at least one of: PUSCH resource information; one or more second SRS resource set index; and one or more TPC for PUSCH. In response to receiving the second DCI, the wireless device may transmit PUSCH with a transmission power based on the PUSCH indication parameter associated with the one or more PUSCH power control parameter set. In response to receiving the second DCI, the wireless device may transmit SRS for CSI acquisition with a transmission power based on one or more power control parameters in the one or more PUSCH power control parameter set.

In an example, a base station may transmit one or more RRC message comprising one or more parameters of SRS resource configuration. The one or more parameters may comprise one or more of SRS resource set. One SRS resource set may comprise at least one of: bandwidth; frequency hopping; transmission comb and offset; time domain resource allocation; frequency-domain position; and/or antenna ports. The base station may transmit one or more RRC message comprising one or more power control parameters of SRS transmission. The one or more power control parameters may comprise one or more first SRS power control parameter set and one or more second SRS power control parameter set. One of the one or more first SRS power control parameter set may comprise at least one of: an SRS indication parameter indicating whether absolute power control adjustment or accumulated power control adjustment may be used for SRS transmission; and one or more SRS power control parameters. One of the one or more second SRS power control parameter set may comprise at least one of: an SRS indication parameter indicating whether absolute power control adjustment or accumulated power control adjustment may be used for SRS transmission; and one or more SRS power control parameters.

In an example, the one or more first SRS power control parameter set may be used for uplink beam management. The one or more second SRS power control parameter set may be used for CSI acquisition.

In an example, a base station may transmit a first DCI triggering SRS transmission for uplink beam management. The base station may transmit a second DCI triggering SRS transmission for CSI acquisition. The first DCI may have a different DCI format with the second DCI. The first DCI may have the same or similar DCI payload size with the second DCI. The first DCI may have CRC-scrambled by a first RNTI. The second DCI may have CRC-scrambled by a second RNTI. The first RNTI may be different from the second RNTI. In the example, the first DCI may comprise at least one of: one or more first SRS resource set index; and one or more first SRS power control command. The second DCI may comprise at least one of: one or more second SRS resource set index; and one or more second SRS power control command. In an example, each of the one or more second SRS power control command may correspond to one UE, serving cell, or TRP. In response to receiving the first DCI triggering SRS transmission for uplink beam management, the wireless device may transmit SRS with a transmission power based on one or more power control parameter associated with the one or more first SRS power control parameter set and a power control command in the first DCI. In response to receiving the second DCI triggering SRS transmission for CSI acquisition, the wireless device may transmit SRS with a transmission power based on one or more power control parameter associated with the one or more second SRS power control parameter set and a power control command in the second DCI.

In an example, a base station may transmit one or more RRC message comprising one or more parameters of SRS resource configuration comprising one or more first SRS resource set and one or more second SRS resource set. One of the one or more first SRS resource set may comprise at least one of: bandwidth, frequency hopping, transmission comb and offset, time domain resource allocation, frequency-domain position bandwidth, and/or antenna ports. One of the one or more second SRS resource set may comprise at least one of: bandwidth, frequency hopping, transmission comb and offset, time domain resource allocation, frequency-domain position bandwidth, and/or antenna ports.

In an example, the one or more first SRS resource set may be used for uplink beam management. The one or more second SRS resource set may be used for CSI acquisition.

In an example, a base station may transmit one or more RRC message comprising one or more power control parameters of SRS transmission. The one or more power control parameters may comprise one or more first SRS power control parameter set and one or more second SRS power control parameter set. One of the one or more first SRS power control parameter set may comprise at least one of: an SRS indication parameter indicating whether absolute power control adjustment or accumulated power control adjustment is enabled for SRS transmission; and one or more SRS power control parameters. One of the one or more second SRS power control parameter set may comprise at least one of: an SRS indication parameter indicating whether absolute power control adjustment may be used for SRS transmission or accumulated power control adjustment may be used for SRS transmission; and one or more SRS power control parameters.

In an example, the one or more first SRS power control parameter set may be used for uplink beam management. The one or more second SRS power control parameter set may be used for CSI acquisition.

In an example, a base station may transmit a DCI triggering SRS transmission for uplink beam management and/or CSI-acquisition. The DCI may comprise at least one of: one or more SRS resource set index; and/or one or more SRS power control command. In response to receiving the DCI triggering SRS transmission, the wireless device may transmit one or more SRS by using one or more SRS resources associated with one of the one or more first SRS resource indicated by the one or more SRS resource set index, if the one or more SRS resource set index indicates one of the one or more first SRS resource set. The wireless device may transmit one or more SRS by using one or more SRS resource associated with one of the one or more second SRS resource indicated by the one or more SRS resource set index, if the one or more SRS resource set index indicates one of the one or more second SRS resource set. The wireless device may determine a transmission power fort the one or more SRS based on one or more SRS power control parameters associated with one of the one or more first SRS power control parameter set, if the one or more SRS resource set index indicates one of the one or more first SRS resource set. In an example, the wireless device may determine the transmission power based on one or more SRS power control parameters associated with one of the one or more second SRS power control parameter set, if the one or more SRS resource set index indicates one of the one or more second SRS resource set.

In one example, a base station may transmit a DCI with the same DCI format and CRC-scrambled by the same RNTI, to trigger SRS transmission for CSI acquisition, or uplink beam management. With one or more of the embodiments, the blind decoding complexity of PDCCH may be reduced at a UE receiver.

In an example, a base station may transmit one or more RRC message comprising one or more parameters of power control adjustment timing. The one or more parameters may comprise at least one of: one power control adjustment timing for PUSCH (e.g., $K_{PUSCH}$); one power control adjustment timing for SRS for CSI acquisition (e.g., $K_{SRS-CSI}$); and/or one power control adjustment timing for SRS for uplink beam management (e.g., $K_{SRS-BM}$).

In an example, $K_{SRS-BM}$ for SRS transmission for uplink beam management may be configured shorter than $K_{SRS-CSI}$ since uplink beam management may have tighter timing requirement than normal SRS transmission for uplink CSI acquisition. In an example, $K_{SRS-BM}$ for SRS transmission for uplink beam management may be configured shorter than KPUSCH since uplink beam management may have tighter timing requirement than PUSCH transmission.

In an example, the power control adjustment time for $K_{PUSCH}$, $K_{SRS-CSI}$, and/or $K_{SRS-BM}$, may be in unit of subframes, or slots, or symbols, with a numerology. The numerology may be a reference downlink or uplink numerology (e.g., that used for PSS/SSS, or PBCH, or PDCCH, or PUCCH, PUSCH), or a configured numerology.

In an example, a base station may transmit a first DCI for PUSCH scheduling, to a wireless device. The one or more first DCI may comprise at least one of: one or more PUSCH resource allocation; and/or one or more PUSCH power control command. In response to receiving the one or more first DCI, the UE may transmit PUSCH with a transmission power. The transmission power may comprise at least a power control adjustment. The wireless device may determine the power control adjustment of PUSCH transmission (e.g.,$f_c(i)$), in subframe i in serving cell c by $f_c(i)=f_c(i)+\delta_{PUSCH,c}(i-K_{PUSCH})$, if the PUSCH indication parameter associated with the one or more PUSCH power control parameter set indicates that the accumulated power control adjustment is employed (or enabled). The UE may determine the power control adjustment of PUSCH transmission by $f_c(i)=\delta_{PUSCH,c}(i-K_{PUSCH})$, if the PUSCH indication parameter associated with the one or more PUSCH power control parameter set indicates that the absolute power control adjustment is employed (or the accumulated power control adjustment is not enabled). In an example, $\delta_{PUSCH,c}(i-K_{PUSCH})$ may be a power control value indicated by the one or more PUSCH power control command in the first DCI for serving cell c on subframe $i-K_{PUSCH}$.

In an example, a base station may transmit a second DCI for SRS transmission for CSI acquisition, to a wireless device. The second DCI may comprise at least one of: one or more SRS resource set; and/or one or more SRS power control command. In response to receiving the second DCI, the wireless device may transmit SRS with a transmission power. The transmission power may comprise at least a power control adjustment based on the SRS indication parameter associated with the one or more power control parameter set for CSI acquisition. The wireless device may determine the power control adjustment parameter of SRS transmission (e.g., $f_{SRS}(i)$) in subframe i in serving cell c by $f_{SRS,c}(i)=f_{SRS,c}(i-1)+\delta_{SRS,c}(i-K_{SRS-CSI})$, if the SRS indication parameter associated with the one or more SRS power control parameter set for CSI acquisition indicates that the accumulated power control adjustment is employed (or enabled). The wireless device may determine the power control adjustment parameter of SRS transmission (e.g., $f_{SRS}(i)$) in subframe i in serving cell c by $f_{SRS,c}(i)=\delta_{SRS,c}(i-K_{SRS-CSI})$, if the SRS indication parameter associated with the one or more SRS power control parameter set for CSI acquisition indicates that the absolute power control adjustment is employed (or the accumulated power control adjustment is not enabled). In an example, $\delta_{SRS,c}(i-K_{SRS-CSI})$ may be a power control value indicated in the second DCI for serving cell c on subframe $i-K_{SRS-CSI}$.

In an example, a base station may transmit a third DCI for SRS transmission for uplink beam management, to a wireless device. The third DCI may comprise at least one of: one or more SRS resource set; and/or one or more SRS power control command. In response to receiving the third DCI, the wireless device may transmit SRS with a transmission power. The transmission power may comprise at least power control adjustment based on the SRS indication parameter associated with the one or more power control parameter set for uplink beam management. The wireless device may determine the power control adjustment parameter of SRS transmission (e.g., $f_{SRS}(i)$) in subframe i in serving cell c, by $f_{SRS,c}(i)=f_{SRS,c}(i-1)+\delta_{SRS,c}(i-K_{SRS-BM})$, if the SRS indication parameter associated with the one or more SRS power control parameter set for uplink beam management indicates that the accumulated power control adjustment is employed (or enabled). The wireless device may determine the power control adjustment parameter of SRS transmission (e.g., $f_{SRS}(i)$) in subframe i in serving cell c by $f_{SRS,c}(i)=\delta_{SRS,c}(i-K_{SRS-BM})$, if the SRS indication parameter associated with the one or more SRS power control parameter set for the uplink beam management indicates that the absolute power control adjustment is employed (or the accumulated power control adjustment is not enabled). In an example, $\delta_{SRS,c}(i-K_{SRS-BM})$ may be a power control value indicated in the third DCI for serving cell c on subframe $i-K_{SRS-BM}$.

In an example, a base station may transmit one or more RRC message comprising one or more parameters of power control command adjustment timing. The one or more parameters may comprise at least one of: one power control adjustment timing for PUSCH (e.g., $K_{PUSCH}$); and/or One power control adjustment timing for SRS (e.g., $K_{SRS}$).

In an example, a wireless device may transmit one or more PUSCH with a transmission power comprising at least a power control adjustment. A power control adjustment may depend on a power control value indicated in a DCI received at $K_{PUSCH}$ subframes before the current subframe.

In an example, a wireless device may transmit one or more SRS for CSI acquisition and/or uplink beam management with a transmission power and a power control adjustment. A power control adjustment may depend on a power control value indicated in a DCI received at least $K_{SRS}$ subframes (or slots, or symbols) before the current subframe.

In an example, a base station may transmit one or more RRC message comprising at least one power control command application time (e.g., K). In an example, a wireless device may transmit one or more PUSCH with a transmission power comprising at least a power control adjustment. A power control adjustment may depend on a power control value indicated in a DCI received at K subframes before the current subframe. In an example, a UE may transmit one or more SRS for CSI acquisition and/or uplink beam management with a transmission power comprising at least a power control adjustment. A power control adjustment may depend on a power control value indicated in a DCI received at least K subframes (or slots, or symbols) before the current subframe.

In an example, the power control adjustment time for $K_{PUSCH}$, $K_{SRS-CSI}$, and/or $K_{SRS-BM}$ may be a fixed value, without RRC configuration. In an example, one or more system parameter set (e.g., numerology, FDD, or TDD configuration, and/or one or more system parameter configuration) may be associated with a power control adjustment time.

In an example, a base station may transmit a first DCI for PUSCH scheduling, to a wireless device. The first DCI may comprise at least one of: PUSCH resource allocation; one or more PUSCH power control command; and/or one power control adjustment timing for PUSCH (e.g., $K_{PUSCH}$). In response to receiving the first DCI, the wireless device may transmit PUSCH with a transmission power comprising at least a power control adjustment. The power control adjustment may be based on the PUSCH indication parameter in the one or more PUSCH power control parameter set. The wireless device may determine a power control adjustment of PUSCH transmission by $f_c(i)=f_c(i)+\delta_{PUSCH,c}(i-K_{PUSCH})$, if the PUSCH indication parameter in the one or more PUSCH power control parameter set indicates that the accumulated power control adjustment is employed (or enabled). The wireless device may determine the power control adjustment of PUSCH transmission by $f_c(i)=\delta_{PUSCH,c}(i-K_{PUSCH})$, if the PUSCH indication parameter in the one or more PUSCH power control parameter set indicates that the absolute power control adjustment is employed (or the accumulated power control adjustment is not enabled). In an example, $\delta_{PUSCH,c}(i-K_{PUSCH})$ may be a power control value indicated in the first DCI for serving cell c on subframe $i-K_{PUSCH}$.

In an example, a base station may transmit a second DCI for SRS transmission for CSI acquisition, to a wireless device. The second DCI may comprise at least one of: one or more SRS resource set; one or more SRS power control command; and/or one power control adjustment timing for SRS for CSI acquisition (e.g., $K_{SRS-CSI}$). In response to receiving the second DCI, the wireless device may transmit SRS with a transmission power comprising at least a power control adjustment. The power control adjustment may be based on the SRS indication parameter in the one or more SRS power control parameter set for CSI acquisition. The wireless device may determine a power control adjustment of SRS transmission by $f_{SRS,c}(i)=f_{SRS,c}(i-1)+\delta_{SRS,c}(i-K_{SRS-CSI})$, if the SRS indication parameter in the one or more SRS power control parameter set indicates that the accumulated power control adjustment is employed (or enabled). The wireless device may determine a power control adjustment of SRS transmission by $f_{SRS,c}(i)=\delta_{SRS,c}(i-K_{SRS-CSI})$, if the SRS indication parameter in the one or more SRS power control parameter set indicates that the absolute power control adjustment is employed (or the accumulated power control adjustment is not enabled). In an example, $\delta_{SRS,c}(i-K_{SRS-CSI})$ may be a power control value indicated in the second DCI for serving cell c on subframe $i-K_{SRS-CSI}$.

In an example, a base station may transmit a third DCI for SRS transmission for uplink beam management, to a wireless device. The third DCI may comprise at least one of: one or more SRS resource set; one or more SRS power control command; and/or one power control adjustment timing for SRS for uplink beam management (e.g., $K_{SRS-BM}$). In response to receiving the third DCI, the wireless device may transmit SRS with a transmission power comprising at least a power control adjustment. A power control adjustment may be based on the SRS indication parameter in the one or more SRS power control parameter set for uplink beam management. The wireless device may determine a power control adjustment of SRS transmission by $f_{SRS,c}(i)=f_{SRS,c}(i-1)+\delta_{SRS,c}(i-K_{SRS-BM})$, if the SRS indication parameter in the one or more SRS power control parameter set indicates that the accumulated power control adjustment is employed (or enabled). The wireless device may determine the power control adjustment parameter of SRS transmission (e.g., $f_{SRS}(i)$) in subframe i in serving cell c by $f_{SRS,c}(i)=\delta_{SRS,c}(i-K_{SRS-BM})$, if the SRS indication parameter in the one or more SRS power control parameter set indicates that the absolute power control adjustment is employed (or the accumulated power control is not enabled). In an example, $\delta_{SRS,c}(i-K_{SRS-BM})$ may be a power control value indicated in the third DCI for serving cell c on subframe $i-K_{SRS-BM}$.

In an example, a base station may transmit a first DCI for PUSCH scheduling to a wireless device. The first DCI may comprise at least one of: PUSCH resource allocation; one or more PUSCH power control command; and/or one power control adjustment timing for PUSCH (e.g., $K_{PUSCH}$). In response to receiving the first DCI, the wireless device may transmit PUSCH with a transmission power comprising at least a power control adjustment. The power control adjustment may be based on the PUSCH indication parameter in the one or more PUSCH power control parameter set. The wireless device may determine a power control adjustment of PUSCH transmission by $f_c(i)=f_c(i)+\delta_{PUSCH,c}(i-K_{PUSCH})$, if the PUSCH indication parameter in the one or more PUSCH power control parameter set indicates that the accumulated power control adjustment is employed (or enabled). The wireless device may determine a power control adjustment of PUSCH transmission by $f_c(i)=\delta_{PUSCH,c}(i-K_{PUSCH})$, if the PUSCH indication parameter in the one or more PUSCH power control parameter set indicates that the absolute power control adjustment is employed (or the accumulated power control adjustment is not enabled). In an example, $\delta_{PUSCH,c}(i-K_{PUSCH})$ may be a a power control value indicated in the first DCI for serving cell c on subframe $i-K_{PUSCH}$.

In an example, a base station may transmit a second DCI for SRS transmission for CSI acquisition or uplink beam management, to a wireless device. The second DCI may comprise at least one of: one or more SRS resource set, one or more SRS power control command, one power control adjustment timing for SRS (e.g., $K_{SRS}$). In response to receiving the second DCI, the wireless device may transmit SRS with a transmission power comprising at least a power control adjustment. A power control adjustment may be based on the SRS indication parameter in one or more SRS power control parameter set. The wireless device may determine a power control adjustment of SRS transmission by $f_{SRS,c}(i)=f_{SRS,c}(i-1)+\delta_{SRS,c}(i-K_{SRS})$, if the SRS indication parameter in the one or more SRS power control parameter set indicates that the accumulated power control adjustment is employed (or enabled). The wireless device may determine a power control adjustment of SRS transmission by $f_{SRS,c}(i)=\delta_{SRS,c}(i-K_{SRS})$, if the SRS indication parameter in the one or more SRS power control parameter set indicates that the absolute power control adjustment is employed (or the accumulated power control adjustment is not enabled). In an example, $\delta_{SRS,c}(i-K_{SRS})$ may be a power control value indicated in the second DCI for serving cell c on subframe $i-K_{SRS}$.

In an example, a base station may transmit one or more RRC message comprising one or more parameters of SRS resource configuration. The one or more parameters may comprise one or more SRS resource set comprising at least one of: bandwidth, frequency hopping, transmission comb and offset, time domain resource allocation, frequency-domain position bandwidth, and/or antenna ports. The base station may transmit one or more RRC message comprising one or more power control parameters of SRS transmission. The one or more power control parameters may comprise at least one of: an SRS indication parameter, indicating whether absolute power control adjustment or accumulated power control adjustment may be used for SRS transmission; and one or more SRS power control parameters.

In an example, a base station may transmit a DCI triggering SRS transmission for CSI acquisition or uplink beam management, to a wireless device. The DCI may comprise at least one of: one or more SRS resource set index, one or more SRS power control command. In response to receiving the DCI, the wireless device may transmit the one or more SRS by using one or more SRS resource associated with one of the one or more SRS resource set indicated by the one or more SRS resource set index (e.g., j) in subframe i for serving cell c with a transmit power comprising at least a power control adjustment determined by: $P_{SRS}(i,j)=\min\{P_{CMAX,c}(i,m), 10 \log_{10}(M_{SRS,c,j})+P_{O\_SRS,c}(m)+\alpha_{SRS,c}(m)\cdot PL_c+f_{SRS,c}(i)\}[dBm]$. In an example, $P_{SRS}(i,j)$ may be a calculated SRS transmission power for SRS resource set j for serving cell c in subframe i. $P_{CMAX,c}(i,m)$ may be a configured wireless device transmit power in subframe i for SRS transmission for serving cell c in the one or more RRC signaling. $P_{CMAX,c}(i,m)$ may be a transmission power associated with one or more SRS power control parameters in the one or more SRS power control parameter set m. In an example, m=0 may correspond to a periodic SRS transmission with a first one of the one or more SRS power control parameter set. m=1 may correspond to an aperioidic SRS transmission for CSI acquisition with a second one of the one or more SRS power control parameter set. m=2 may correspond to an aperiodic SRS transmission for uplink beam management with a third one of the one or more SRS power control parameter set. $M_{SRS,c,j}$ may be a bandwidth of the SRS transmission for SRS resource set j in subframe i for serving cell c expressed in number of resource blocks configured in the one or more RRC signaling. $\alpha_{SRS,c}(m)$ may be a value of alpha-SRS configured in the one or more RRC signaling for serving cell c. $\alpha_{SRS,c}(m)$ may be the alpha-SRS associated with one or more SRS power control parameters in the one or more SRS power control parameter set m. In an example, m=0 may correspond to a periodic SRS transmission with a first one of the one or more SRS power control parameter set. m=1 may correspond to an aperiodic SRS transmission for CSI acquisition with a second one of the one or more SRS power control parameter set. m=2 may correspond to an aperiodic SRS transmission for uplink beam management with a third one of the one or more SRS power control parameter set. $PL_c$ may be a downlink path loss value calculated by the wireless device for serving cell c. $P_{O\_SRS,c}(m)$ may be a target receiving power parameter for SRS transmission. $P_{O\_SRS,c}(m)$ may be the target receiving power associated with one or more SRS power control parameters in the one or more SRS power control parameter set m. In an example, m=0 may correspond to a periodic SRS transmission with a first one of the one or more SRS power control parameter set. m=1 may correspond to an aperioidic SRS transmission for CSI acquisition with a second one of the one or more SRS power control parameter set. m=2 may correspond to an aperiodic SRS transmission for uplink beam management with a third one of the one or more SRS power control parameter set. The wireless device may determine $f_{SRS,c}(i)$ by $f_{SRS,c}(i)=f_{SRS,c}(i-1)+\delta_{SRS,c}(i-K_{SRS})$, if the SRS indication parameter in the one or more SRS power control parameter set indicates that the accumulated power control adjustment is employed (or enabled). The wireless device may determine $f_{SRS,c}(i)$ by $f_{SRS,c}(i)=\delta_{SRS,c}(i-K_{SRS})$, if the SRS indication parameter in the one or more SRS power control parameter set indicates that the absolute power control adjustment is employed (or the accumulated power control adjustment is not enabled). In an example, $\delta_{SRS,c}(i-K_{SRS})$ may be a power control value indicated in a second DCI for serving cell c on subframe $K_{SRS}$. In an example, $K_{SRS}$ is configured in the one or more RRC, or in a DCI.

In an example, a wireless device may determine the transmission power and power control adjustment based on one or more embodiment, for one or more frame structure (e.g., without PUSCH/PUCCH transmission and TDD).

In an example, a base station may transmit one or more RRC message comprising one or more parameters of SRS resource configuration. The one or more parameters may comprise at least one or more of SRS resource set comprising at least one of: bandwidth; frequency hopping; transmission comb and offset; time domain resource allocation; frequency-domain position bandwidth; and/or antenna ports. The base station may transmit one or more RRC message comprising one or more power control parameters of PUSCH transmission. The one or more power control parameters may comprise one or more PUSCH power control parameter set. One PUSCH power control parameter set may comprise at least one of: a PUSCH indication parameter indicating whether absolute power control adjustment or accumulated power control adjustment may be used for PUSCH transmission; and/or one or more PUSCH power control parameters.

In an example, a base station may transmit a DCI scheduling PUSCH transmission, to a wireless device. The DCI may comprise at least one of: PUSCH Resource information; or one or more SRS resource set index; and/or One or more TPC for PUSCH. In response to receiving the DCI, the wireless device may transmit the one or more SRS using one or more SRS resource associated with the one or more SRS resource set index (e.g., j) in subframe i for cell c with a transmit power comprising at least a power control adjustment determined by: $P_{SRS}(i,j)=\min\{P_{CMAX,c}(i,m), P_{SRS\_OFFSET,c}(m)+10 \log_{10}(M_{SRS,c,j})+P_{O\_PUSCH,c}(n)+\alpha_c(n)\cdot PL_c+f_c(i)\}[dBm]$, for some frame structure (e.g., FDD). In an example, $P_{SRS}(i,j)$ may be a calculated SRS transmission power for SRS resource set j for serving cell c in subframe i. $P_{CMAX,c}(i,m)$ may be a configured wireless device transmit power in subframe i for SRS transmission for serving cell c in the one or more RRC signaling. $P_{CMAX,c}(i,m)$ may be a transmission power associated with one or more SRS power control parameters in the one or more SRS power control parameter set m. In an example, m=0 may correspond to a periodic SRS transmission with a first one of the one or more SRS power control parameter set. m=1 may correspond to an aperiodic SRS transmission for CSI acquisition with a second one of the one or more SRS power control parameter set. m=2 may correspond to an aperiodic SRS transmission for uplink beam management with a third one of the one or more SRS power control parameter set. $M_{SRS,c,j}$ may be a bandwidth of the SRS transmission for SRS resource set j in subframe i for serving cell c expressed in number of resource blocks configured in the one or more RRC signaling. $P_{SRS\_OFFSET,c}(m)$ may be SRS power offset for SRS transmission configured by the one or more RRC signaling. $P_{SRS\_OFFSET,c}(m)$ may be the SRS power offset associated with one or more SRS power control parameters in the one or more SRS power control parameter set m. In an example, m=0 may correspond to a periodic SRS transmission with a first one of the one or more SRS power control parameter set. m=1 may correspond to an aperiodic SRS transmission for CSI acquisition with a second one of the one or more SRS power control parameter set. m=2 may correspond to an aperiodic SRS transmission for uplink beam management with a third one of the one or more SRS power control parameter set. $PL_c$ may be a downlink path loss value calculated by the wireless device for serving cell c. $P_{O\_PUSCH,c}(n)$ and $\alpha_c(n)$ may be configured in the one or more RRC signaling. $P_{O\_PUSCH,c}(n)$ and $\alpha_c(n)$ may be a target receiving power and a power compensation factor associated with one or more PUSCH power control parameter set n. In an example, n=0 may correspond to a PUSCH SPS transmission with a first one of the one or more PUSCH power control parameter set. n=1 may correspond to a dynamic PUSCH transmission with a second one of the one or more PUSCH power control parameter set. n=2 may correspond to a PUSCH corresponding to a random access response grant with a third one of the one or more PUSCH power control parameter set. In an example, n may be a fixed value (e.g., n=1). $f_c(i)$ may be a current PUSCH power control adjustment state for serving cell c. The wireless device may determine $f_c(i)$ by $f_c(i)=f_c(i)+\delta_{PUSCH,c}(i-K_{PUSCH})$, if the PUSCH indication parameter in the one or more PUSCH power control parameter set indicates that the accumulated power control adjustment is employed (or enabled). The wireless device may determine $f_c(i)$ by $f_c(i)=\delta_{PUSCH,c}(i-K_{PUSCH})$, if the PUSCH indication parameter in the one or more PUSCH power control parameter set indicates that the absolute power control adjustment is employed (or the accumulated power control adjustment is not enabled, or is disabled). In an example, $\delta_{PUSCH,c}(i-K_{PUSCH})$ may be a power control value indicated in the DCI for serving cell c on subframe $i-K_{PUSCH}$. $K_{PUSCH}$ may be configured in the one or more RRC messages, or in the DCI.

In an example, a wireless device may determine the transmission power and power control adjustment based on one or more embodiment, for one or more frame structure (e.g., FDD, and/or TDD).

In an example, a wireless device may receive from a base station at least one RRC message comprising one or more parameters indicating at least one of: at least one SRS power configuration; at least one PUSCH power configuration; and/or at least one SRS resource configuration. The at least one SRS power configuration may comprise at least: a SRS indication parameter indicating where accumulated power adjustment for SRS transmission is enabled or not; allowable maximum transmission power; target received power; power compensation factor; and/or one or more power offsets. The at least one PUSCH power configuration may comprise at least: a PUSCH indication parameter indicating where accumulated power adjustment for PUSCH transmission is enabled or not; allowable maximum transmission power; target received power; power compensation factor; and/or one or more power offsets. The at least one SRS resource configuration may comprise at least: one or more SRS radio resource parameters.

In an example, a wireless device may receive at least one first DCI comprising at least one of: one or more SRS resource index; and/or one or more SRS power control command. The wireless device may transmit one or more SRS with a transmission power by using one or more SRS resource indicated in the one or more SRS resource index. A wireless device may determine a transmission power of SRS transmission based on one or SRS power control parameters indicated in the one or more SRS power control configuration. The transmission power may comprise at least a power control adjustment based on the SRS indication parameter in the one or more SRS power configuration.

In an example, a wireless device may receive at least one second DCI comprising at least one of: one or more PUSCH resource configuration; one or more PUSCH power control command. The wireless device may transmit one or more PUSCH with a transmission power by using one or more PUSCH resource indicated in the one or more PUSCH resource configuration. A wireless device may determine a transmission power of PUSCH transmission based on one or PUSCH power control parameters indicated in the one or more PUSCH power control configuration. The transmission power may comprise at least a power control adjustment based on the PUSCH indication parameter in the one or more PUSCH power configuration.

SRS of Uplink Beam Management Overlapping with Other Uplink Channels/Signals

In an example, a wireless device (or a UE) may transmit a first SRS for uplink beam management with a first transmission power via a first cell. The wireless device may transmit a second SRS for CSI acquisition with a second transmission power via a second cell. The wireless device may transmit a first PRACH preamble with a third transmission power via a first RACH resource for a downlink beam failure recovery via a third cell. The wireless device may transmit a second PRACH preamble with a fourth transmission power via a second RACH resource for uplink synchronization via a fourth cell. In an example, the transmission of the first SRS may be overlapped in time with at least one of: the second SRS, the first PRACH preamble, or the second PRACH preamble. When transmission overlapping occurs, existing LTE/LTE_A technologies may not provide methods on how to calculate transmission power for these signals. Existing LTE/LTE_A technologies may result in a failure of uplink beam management when overlapped transmission occurs. Existing LTE/LTE_A technologies may result in delay of the uplink beam management when overlapped transmission occurs. Example embodiments may provide methods to improve the delay of the uplink beam management.

In an example, a gNB may transmit to a wireless device, one or more messages (e.g., RRC) comprising configuration parameters of at least one SRS, for one or multiple cells. The one or multiple cells may be grouped into one or multiple cell groups. The configuration parameters for the at least one SRS may comprise at least one of: a SRS bandwidth, SRS numerologies, density in frequency domain (e.g., comb levels) and/or in time domain (including multi-symbol SRS transmissions), partial band size and full band size. The at least one SRS may be associated with a SRS resource index (SRI). The gNB may transmit to the wireless device, one or more messages (e.g., RRC) comprising configuration parameters for an uplink beam management procedure in a first cell, or a first cell of a first cell group. The configuration parameters for the uplink beam management procedure may comprise at least one of: at least one uplink RS type (e.g., SRS, uplink DMRS, PRACH); RS configuration (e.g., one or multiple SRS resources, each associated with a SRI); QCL parameters (e.g., an indictor indicating a SRS is QCLed with DMRS of PUCCH/PUSCH or not); beam sweeping parameters (e.g., beam sweeping duration, beam rotating or beam kept fixed), SRS power control parameters.

In an example, the gNB may transmit to the wireless device, a first DCI and/or MAC CE to trigger the wireless device for performing an uplink beam management procedure via a first cell, or via a first cell of a first cell group. The first DCI and/or MAC CE may comprise at least one of: at least one SRS configuration associated with at least one SRI, SRS power control command. The at least one SRS configuration may be selected from one or multiple SRS configuration in the one or more RRC messages.

In an example, the gNB may transmit to the wireless device, a second control information (e.g., DCI) to trigger the wireless device for transmitting an aperiodic SRS transmission via the first cell, or a second cell, or a second cell of a second cell group. The second DCI may comprise at least one of: at least one SRS configuration associated with at least one SRI; and SRS power control command. The at least one SRS configuration may be selected from one or multiple SRS configuration in the one or more RRC messages.

In an example, the wireless device may transmit at least a first SRS for the uplink beam management via the first cell, or the first cell of the first cell group, in response to the first DCI and/or the MAC CE triggering performing an uplink beam management procedure, with a first transmission power. The wireless device may determine the first transmission power of the at least first SRS based on at least one of: the SRS configuration parameters, the SRS power control command.

In an example, the wireless device may schedule a transmission of at least a second SRS in response to the second DCI, with a second transmission power. The wireless device may determine the second transmission power of the at least second SRS based on one of the SRS configuration parameters, the SRS power control command.

In an example, if a configured/scheduled transmission of the at least second SRS (e.g., aperiodic SRS, or periodic SRS), via the first cell, or the second cell, or the second cell of the second cell group, overlaps in time with the transmission of the at least first SRS of the uplink beam management and if a total transmission power exceeds a first allowable power value, the wireless device may adjust a transmit power of the configured/scheduled transmission of the at least second SRS, or drop the configured/scheduled transmission of the at least second SRS. The wireless device may adjust the transmission power of the transmission of the at least second SRS such that a total transmission power of the at least first SRS and the at least second SRS does not exceed the first allowable power value. The at least second SRS may be scheduled in aperiodic transmission, triggered by the second DCI, or be configured in periodic transmission by the RRC. The first allowable power value may be a value indicated by the gNB in the one or more RRC messages. The total transmission power may comprise the first transmission power of the at least one first SRS of the uplink beam management, and the second transmission power of the configured/scheduled the at least second SRS.

In the example, example embodiment may assign a higher priority to a transmission power of the at least first SRS (for uplink beam management) compared with a transmission power of the at least second SRS (for CSI acquisition). Example embodiment may improve latency for uplink beam management, when SRS transmission overlapping occurs.

In an example, a wireless device may transmit at least a first SRS for uplink beam management via a first cell, or a first cell of a first cell group, in response to a first DCI and/or the MAC CE triggering the uplink beam management, with a first transmission power. The wireless device may determine a first transmission power of the at least first SRS based on at least one of: SRS configuration parameters, SRS power control command.

In an example, the wireless device may schedule a transmission of an uplink control channel (e.g., PUCCH) via the first cell, or a second cell, or a third cell of a second cell group. Information transmitted via the uplink control channel may comprise an uplink control information without ACK/NACK (e.g., PUCCH with CQI). The scheduled transmission of the uplink control channel may overlap in time with the transmission of the at least first SRS of the uplink beam management. In an example, the wireless device may adjust a transmit power of the uplink control channel transmission or drop the transmission of the uplink control channel, if a total transmission power exceeds a first allowable power value. The wireless device may adjust the transmission power of the transmission of the uplink control channel such that a total transmission power of the at least first SRS and the uplink control channel does not exceed the first allowable power value. The total transmission power may comprise a first transmission power of the at least first SRS of the uplink beam management, and a second transmission power of the uplink control channel. The first allowable power value may be a value indicated by the gNB in the one or more RRC messages. In the example, example embodiment may assign a higher priority to a transmission power of the SRS compared with a transmission power of the uplink control channel without ACK/NACK. Since SRS transmission for uplink beam management is required for changing the uplink beam direction, it may be more urgent than normal PUCCH transmission without ACK/NACK.

In an example, a gNB may further transmit to a wireless device, one or more messages (e.g., RRC) comprising configuration parameters for a downlink beam failure recovery (BFR) procedure. The configuration parameters for the BFR procedure may comprise at least one of: at least one RS type (e.g., SS block, or CSI-RS, or DMRS of PBCH); RS configuration (e.g., CSI-RS resource configuration); beam failure recovery request channel configuration (e.g., PRACH preamble, time/frequency, hopping, power control command); measurement setting (e.g., CSI, RSRP, RSRQ); reporting setting (e.g., reporting type (e.g., CSI reporting or beam management reporting or beam failure reporting), reporting quantity (e.g., RSRP, RSRQ, or CSI), reporting timing (e.g., aperiodic, UE-triggered) and reporting trigger parameter (e.g., timer, one or more thresholds)).

In an example, a gNB may transmit a first DCI and/or MAC CE to trigger the wireless device for performing an uplink beam management procedure. The first DCI and/or MAC CE may comprise at least one of: at least one SRS configuration, SRS power control command. The at least one SRS configuration may be selected from one or multiple SRS configuration in the one or more RRC messages. The wireless device may transmit at least a first SRS for the uplink beam management in response to the first DCI and/or the MAC CE triggering performing an uplink beam management procedure, with a first transmission power. The wireless device may determine the first transmission power of SRS based on at least one of: the SRS configuration parameters, the SRS power control command.

In an example, the wireless device may detect at least a beam failure based on the configuration parameters for the BFR procedure. In response to detecting the at least beam failure, the wireless device may transmit a preamble to the gNB with a second transmission power. The wireless device may determine the second transmission power of the preamble based on the configuration parameters for the BFR procedure.

In an example, the wireless device may initiate a random access procedure autonomously. The wireless device may initiate the random access procedure in response to receiving a DCI comprising a PDCCH order. The wireless device may transmit the preamble to the gNB with the second transmission power. The wireless device may determine the second transmission power of the preamble based on the configuration parameters of the random access procedure.

In an example, the transmission of the preamble may overlap in time with the transmission of the at least first SRS of the uplink beam management. The wireless device may adjust the second transmission power of the preamble transmission, or drop the transmission of the preamble, if a total transmission power exceeds a first allowable power value. The wireless device may adjust the second transmission power of the preamble transmission such that a total transmission power of the preamble transmission and the at least first SRS transmission does not exceed the first allowable power value. The total transmission power may comprise the first transmission power of the at least first SRS of the uplink beam management, and the second transmission power of the preamble. The first allowable power value may be a value indicated by the gNB in the one or more RRC messages.

In an example, the wireless device may assign a higher priority to a transmission power of the SRS for an uplink beam management compared with a transmission power of the preamble for a downlink beam failure recovery.

In an example, the wireless device may assign a higher priority to a transmission power of the preamble for a downlink beam failure recovery compared with a transmission power of the SRS for an uplink beam management. Assigning a higher priority to the transmission power of the preamble may comprise adjusting the transmission power of the SRS for the uplink beam management, when the transmission of the preamble overlaps in time with the transmission of the SRS, and if a total transmission power of the transmission of the preamble and the transmission of the SRS exceeds the first allowable power value.

In an example, the priority of power allocation for SRS for an uplink beam management and preamble for a downlink beam failure recovery, may be predefined, or configured in one or more RRC messages.

In an example, a wireless device may receive from a base station, one or more radio resource control (RRC) messages comprising: first configuration parameters of at least one sounding reference signal (SRS) of a first cell and a second cell; and second configuration parameters for an uplink beam management procedure for the first cell. The wireless device may receive a downlink control information initiating the uplink beam management procedure for the first cell. The wireless device may transmit at least one first SRS for the uplink beam management via the first cell. The wireless device may adjust a transmit power of a configured/scheduled transmission of a second SRS or drop the configured/scheduled transmission of the second SRS, if the configured/scheduled transmission of the second SRS via the second cell overlaps in time with the transmission of the at least one first SRS of the uplink beam management and if a total transmission power exceeds a first allowable power value. In an example, the wireless device may assign a higher priority to a transmission power of the first SRS compared with a transmission power of the second SRS.

Uplink Beam Failure Recovery

A wireless device may transmit SRSs for performing an uplink beam management procedure. The wireless device may perform the uplink beam management procedure in response to receiving a DCI (or a MAC CE) initiating the uplink beam management procedure. In an example, a gNB may transmit the DCI (or the MAC CE) to the wireless device when the gNB observes a channel quality of a wireless channel from the wireless device to the gNB becomes worse. The gNB may trigger the wireless device to perform the uplink beam management in order to adjust uplink transmission beam. In response to receiving SRSs for the uplink beam management, the gNB may select a best beam associated with one SRS from the SRSs. The one SRS may be selected based on RSRP, or RSRQ, or SINR. In an example, the one SRS may be one SRS with a best RSRP (or RSRQ/SINR) value among the SRSs. When the gNB selects the best beam (or the one SRS), the gNB may transmit a second DCI indicating the best beam (or the one SRS) to the wireless device. In response to receiving the second DCI, the wireless device may adjust transmission parameters according to the second DCI.

Figure 23:
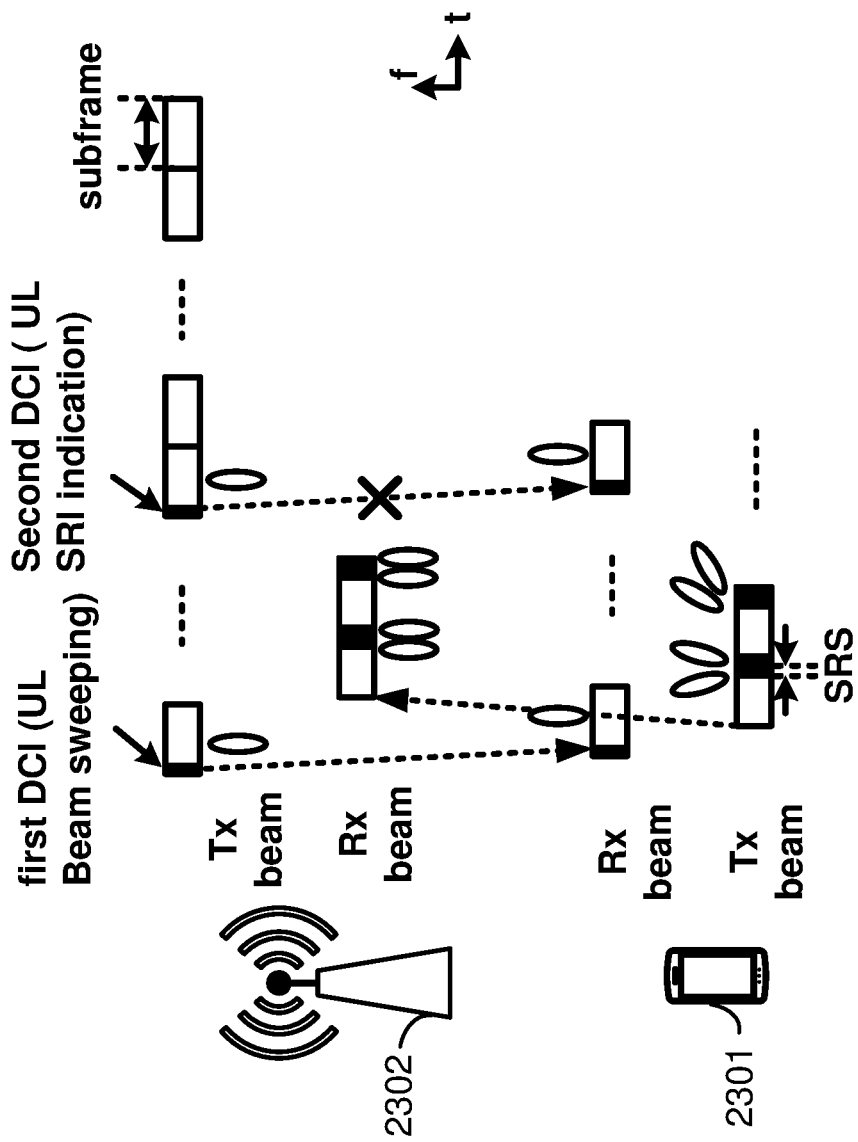
FIG. 23 is an example diagram of uplink beam failure event as per an aspect of an embodiment of the present disclosure.

In an example, the wireless device may miss-detect the second DCI. The gNB may not select a best one beam (or a SRS) among the SRSs transmitted from the wireless device. The gNB may not transmit the second DCI in response to not selecting the best one beam. When the wireless device miss-detects the second DCI, an uplink beam failure event occurs. In response to the uplink beam failure event, the wireless device may not continue uplink transmission due to uplink beam being not indicated. FIG. 23 shows an example of the uplink beam failure event. A base station 2302 (or a gNB) may transmit to a wireless device 2301, a first DCI indicating an uplink beam management. The first DCI may comprise fields indicating one or more SRSs. In response to receiving the first DCI, the wireless device 2301 may transmit the one or more SRSs based on configuration parameters of the one or more SRSs. The wireless device 2301 may transmit the one or more SRSs on different transmission beams. In an example, the base station 2302 may receive the one or more SRSs. The base station 2302 may select a best SRS from the one or more SRSs based on one or more criterion. The base station 2302 may transmit a second DCI to the wireless device 2301 in response to selecting the best SRS. The second DCI may comprise a SRS index indicating the best SRS. In an example, the wireless device 2301 may miss-detect the second DCI, e.g., due to downlink beam failure, or downlink control channel being not detectable. When the wireless device 2301 miss-detects the second DCI, an uplink beam failure occurs. When the uplink beam failure occurs, the communication between the wireless device 2301 and the base station 2302 may be broken.

Existing technologies may not provide solutions for the uplink beam failure. Existing technologies may result in long delay for uplink beam management, since the gNB may take long time to identify the wireless device does not receive the second DCI and may repeat the uplink beam management. Example embodiments may provide methods of an uplink beam failure recovery when uplink beam failure occurs. The uplink beam failure recovery may comprise transmitting a second signal in response to not receiving the second DCI and/or a timer expiry. The uplink beam failure recovery may improve latency of uplink beam management.

In an example, a gNB may transmit one or more messages comprising configuration parameters of an uplink beam management procedure. The parameters may comprise at least one of: RS type (e.g., SRS, or DMRS, PRACH); RS configuration (e.g., one or multiple SRS resources, each associated with a SRI); QCL parameters (e.g., an indicator indicating whether a SRS resource is QCLed with DMRS of PUCCH/PUSCH or not); and/or a timer value of a timer (or time window). The one or more messages may be one or more RRC messages, and/or one or more MAC layer messages.

In an example, a gNB 2302 may transmit a first control information (e.g., DCI) indicating a wireless device 2301 to perform an uplink beam management procedure. When performing the uplink beam management procedure, the wireless device may transmit one or more SRS on different transmit beams (e.g., uplink beam sweeping), based on the SRS parameters, configured in the one or more messages, and/or the first DCI. The gNB may keep the receiving beam unchanged during the uplink beam management procedure.

In an example, when a gNB determines one or more uplink transmit beams by some selection criteria, the gNB may transmit a second control information (e.g., DCI) indicating the one or more uplink transmit beams. The selection criteria may be based on measurements of RSRP, RSRQ, and/or CSI over the one or more SRS. In response to receiving the second DCI, the wireless device may adjust transmission parameters (or beams) according to the second DCI. The wireless device may transmit PUCCH/PUSCH by using the adjusted transmission parameters (or beams).

In an example, the first DCI may comprise at least configuration parameters of the second DCI. The configuration parameters of the second DCI may comprise at least one of: an indicator whether the second DCI is present or not, a time value of a time window (e.g., when the second DCI will be present after transmitting the first DCI), format of the second DCI if present, aggregation level, and/or resource configuration of a PDCCH for transmitting the second DCI if present.

In an example, when the indicator in the first DCI indicates the second DCI will not be present, the wireless device may not be required to monitor the PDCCH for detecting the second DCI. When the indicator in the first DCI indicates the second DCI will be present within the time window, the wireless device may monitor the PDCCH to detect the second DCI within the time window. If the wireless device detects the second DCI, the wireless device may transmit data packet using an uplink transmit beam (associated with a SRS) indicated by the second DCI.

In an example, the first DCI may indicate whether the second DCI is present or not when uplink beam management is triggered. Based on the first DCI, a wireless device may determine whether to blind decode the second DCI. The two-DCI structure may reduce power consumption of blind decoding for uplink beam management.

Figure 24:
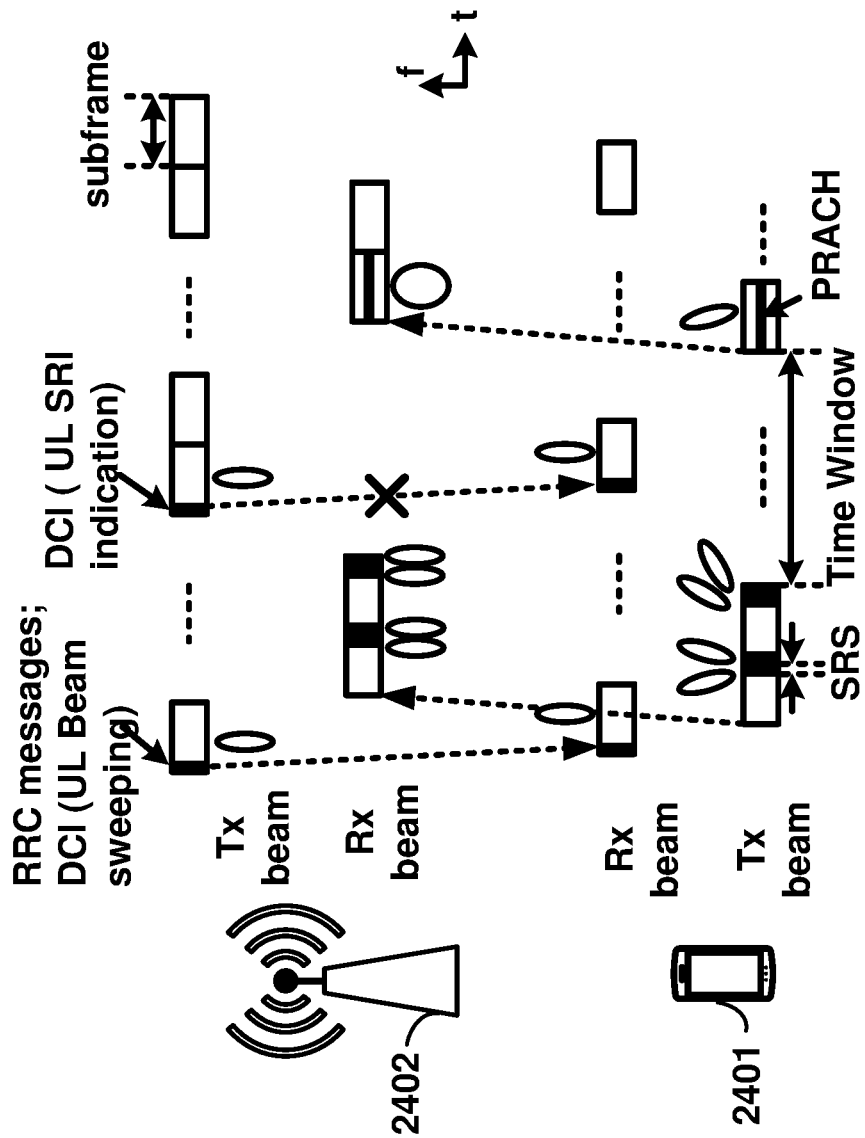
FIG. 24 is an example diagram of uplink beam failure recovery procedure as per an aspect of an embodiment of the present disclosure.

In an example, a wireless device may transmit a second signal (e.g., preamble) in response to not detecting the second DCI. FIG. 24 shows an example of the embodiment. A base station 2402 (or a gNB) may transmit to a wireless device 2401, one or more messages (e.g., RRC messages) comprising configuration parameters of an uplink beam management procedure. The parameters may comprise at least one of: RS type (e.g., SRS, DMRS, and/or PRACH); RS configuration (e.g., one or multiple SRS resources, each associated with a SRI); QCL parameters (e.g., an indicator indicating whether a SRS resource is QCLed with DMRS of PUCCH/PUSCH or not); one or more PRACH resource for uplink beam management reporting (e.g., uplink beam failure recovery) and/or a timer value of a timer. The one or more messages may be one or more RRC messages and/or one or more MAC CEs.

In an example, the gNB 2402 may transmit a first control information (e.g., DCI) with one or more configuration parameters of an uplink beam management procedure. The one or more configuration parameters may comprise at least one of: one or more SRIs; one or more PRACH resource (e.g., preamble, time/frequency resource configuration for uplink beam management reporting); power control command for the one or more PRACH transmission and/or a timer or time window.

In an example, the wireless device 2401 may transmit one or more SRS on different transmit beams (e.g., uplink beam sweeping) in response to receiving the first DCI indicating performing an uplink beam management. The wireless device 2401 may start the timer based on the timer value in response to transmitting the one or more SRS.

In an example, when the gNB 2402 determines one or more uplink transmit beams by some selection criteria, the gNB 2402 may transmit a second control information (e.g., DCI) indicating the one or more uplink transmit beams. The selection criteria may be based on measurements of RSRP, RSRQ, and/or CSI over the SRS. The wireless device 2401 may stop the timer in response to detecting the second DCI.

In an example, an uplink beam failure may occur when the wireless device 2401 doesn't detect the second DCI indicating one or more uplink transmit beams when the timer is running. The UE may perform an uplink beam failure recovery procedure by transmitting a preamble based on one of the one or more PRACH resources. The one or more PRACH resources (e.g., preamble, time/frequency resource configuration) may be dedicated for the uplink beam failure recovery procedure, e.g., different from the PRACH resource for random access or downlink beam failure recovery procedure. In an example, the PRACH resource for the uplink beam failure recovery may be shared with the PRACH resource for reporting a downlink beam failure.

In an example, when the gNB receives the preamble transmitted by the UE, the gNB may transmit one or more third DCI to the UE indicating a second round of uplink beam management. The one or more third DCI may comprise configuration parameters of the second round of uplink beam management. The configuration parameters may be different from that in the one or more first DCI.

In an example, a wireless device may transmit a second signal/channel (e.g., a PUCCH) in response to not detecting the second DCI. In an example, a gNB may transmit one or more messages comprising configuration parameters of an uplink beam management procedure, to a wireless device. The parameters may comprise at least one of: RS type (e.g., SRS, DMRS, and/or PRACH); RS configuration (e.g., one or multiple SRS resources, each associated with a SRI; QCL parameters (e.g., SRS QCLed or not QCLed with DMRS of PUCCH/PUSCH); one or more PUCCH resource for uplink beam management reporting (e.g., uplink beam failure recovery) and/or a timer value of a timer. The one or more messages may be one or more RRC messages, and/or one or more MAC layer messages (e.g., MAC CE).

In an example, the gNB may transmit a first control information (e.g., DCI) with one or more configuration parameters of an uplink beam management procedure, to a wireless device. The one or more configuration parameters may comprise at least one of: one or more SRIs; one or more PUCCH resource for uplink beam management reporting (e.g., uplink beam failure recovery); power control command for the one or more PUCCH transmission and/or a timer or time window.

In an example, a wireless device may transmit one or more SRS on different transmit beams (e.g., uplink beam sweeping) when receiving the first DCI indicating performing an uplink beam management. The wireless device may start the timer in response to transmitting the one or more SRS.

In an example, a gNB may transmit to a wireless device, a second control information (e.g., DCI) indicating the one or more uplink transmit beams, e.g., when the gNB determines one or more uplink transmit beams by some selection criteria. The selection criteria may be based on measurements of RSRP, RSRQ, and/or CSI over the one or more SRSs. The wireless device may stop the timer in response to detecting the second DCI.

In an example, an uplink beam failure may occur when the wireless device doesn't detect the second DCI when the timer is running. The wireless device may perform an uplink beam failure recovery procedure by transmitting a signal via one of the one or more PUCCH resource. The one or more PUCCH resource may be dedicated for the uplink beam failure recovery, e.g., different from the PUCCH resource for SR, ACK/NACK and/or CQI feedback. In an example, the PUCCH resource for the uplink beam failure recovery may be shared with the PUCCH resource for SR, ACK/NACK and/or CQI feedback.

In an example, in response to receiving the PUCCH transmitted by a wireless device, for an uplink beam failure recovery, the gNB may transmit a third DCI to the wireless device indicating a second round of uplink beam management. The third DCI may comprise configuration parameters of the second round of uplink beam management. The configuration parameters may be different from that in the first DCI.

In an example, a wireless device may receive from a base station, at least one radio resource control message comprising one or more parameters for an uplink beam management procedure, wherein the one or more parameters indicate at least one of the following: at least one SRS configuration, wherein the at least one SRS configuration comprises an identifier of the at least one SRS configuration; and a first timer value of a first timer. The wireless device may receive at least one first DCI indicating activation of the uplink beam management procedure, wherein the at least one first DCI comprises at least one of: one identifier corresponding to one of the at least SRS configuration; one preamble identifier; and/or one field indicating at least one radio resource associated with the at least one preamble. A wireless device may transmit to the base station, one or more SRSs associated with the at least one identifier. In an example, the wireless device may start the first timer in response to transmitting the one or more SRSs. The wireless device may monitor a downlink control channel during the first timer running. The wireless device may stop the first timer in response to receiving a DCI confirming that the uplink beam management is completed successfully. In response to the first timer expiring, the wireless device may transmit to the base station, the at least one preamble via the at least one radio resource.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet may further embodiments.

Figure 25:
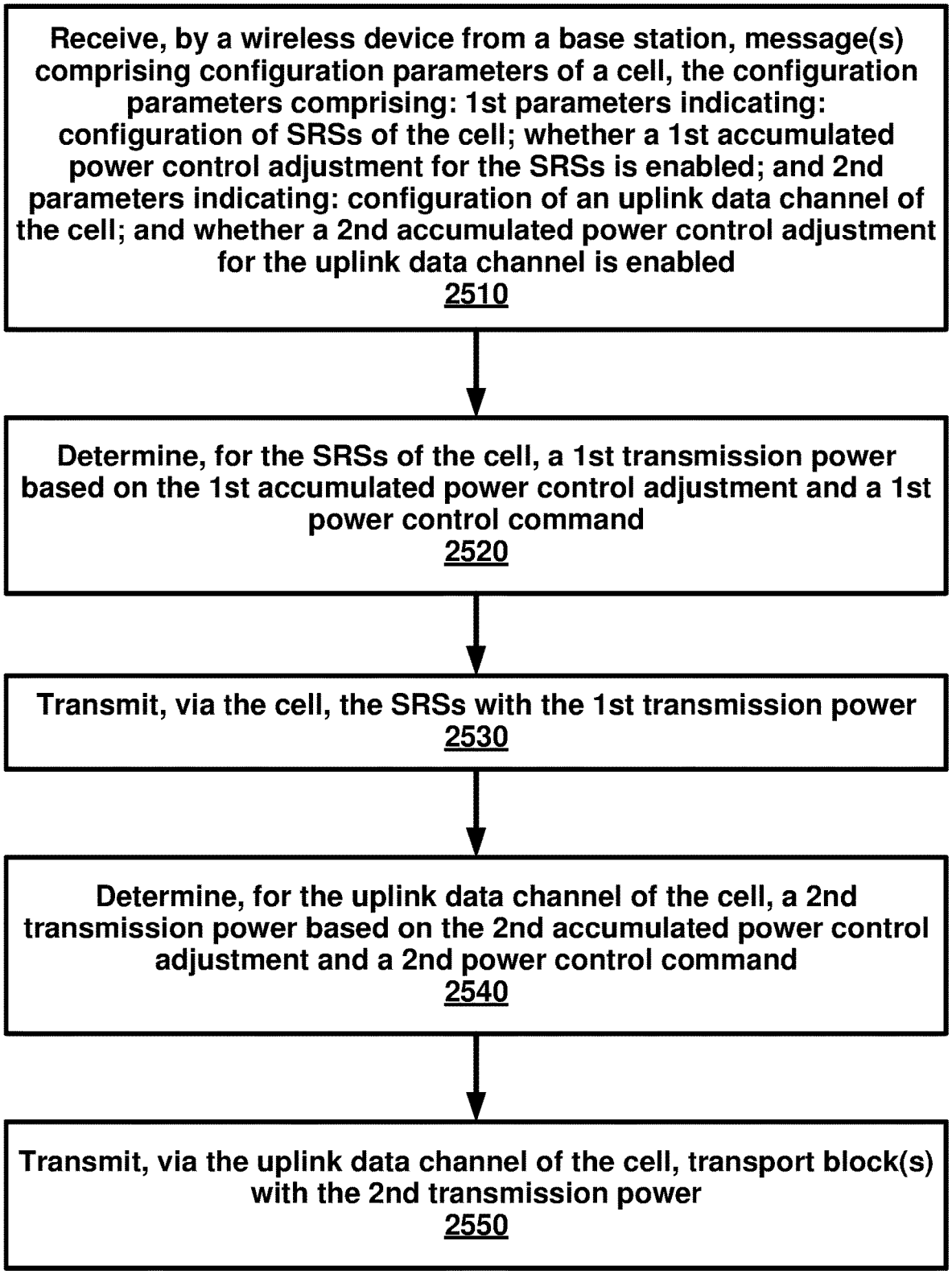
FIG. 25 is a flow diagram of an aspect of an embodiment of the present disclosure.

FIG. 25 is an example flow diagram as per an aspect of an embodiment of the present disclosure. At 2510, a wireless device may receive one or more messages from a base station. The one or more messages may comprise configuration parameters of a cell. The configuration parameters may comprise: first parameters indicating: configuration of sounding reference signals (SRSs) of the cell; whether a first accumulated power control adjustment for the SRSs is enabled; and second parameters. The second parameters may indicate: configuration of an uplink data channel of the cell; and whether a second accumulated power control adjustment for the uplink data channel is enabled. At 2520, a first transmission power may be determined for the SRSs of the cell based on the first accumulated power control adjustment and a first power control command. At 2530, the SRSs may be transmitted, via the cell, with the first transmission power. At 2540, a second transmission power may be determined for the uplink data channel of the cell based on the second accumulated power control adjustment and a second power control command. At 2550, one or more transport blocks may be transmitted with the second transmission power, via the uplink data channel of the cell.

According to an example embodiment, the transmission of the SRSs may be triggered by at least one of: receiving a first downlink control information (DCI) indicating transmission of the SRSs triggered for an uplink beam management; and receiving a second DCI indicating transmission of the SRSs triggered for a channel state information (CSI) acquisition. According to an example embodiment, the transmission of the SRSs may comprise one of a periodic transmission, an aperiodic transmission, or a semi-persistent transmission. According to an example embodiment, the wireless device, in response to the first configuration parameters indicating accumulated power control adjustment for the transmission of the SRSs is enabled, may determine the first transmission power based on a combination of a first power value of an SRS transmission power adjustment state and a second power value. The SRS transmission power adjustment state may comprise an SRS transmission power adjustment state before the wireless device receives the first power control command. The second power value may be indicated by the first power control command. According to an example embodiment, the wireless device, in response to the first configuration parameters indicating accumulated power control adjustment for the transmission of the SRSs being disabled, may determine the first transmission power based on a second power value indicated by the first power control command. According to an example embodiment, the wireless device, in response to the second configuration parameters indicating accumulated power control adjustment for the transmission of the uplink data channel being enabled, may determine the second transmission power based on a combination of a first power value of an uplink data channel transmission power adjustment state and a second power value. The uplink data channel transmission power adjustment state may be an uplink data channel transmission power adjustment state before the wireless device receives the second power control command. The second power value may be indicated by the second power control command. According to an example embodiment, the wireless device, in response to the second configuration parameters indicating accumulated power control adjustment for the transmission of the uplink data channel being disabled, may determine the second transmission power based on a second power value indicated by the second power control command. According to an example embodiment, the first parameters may further indicate a first power control adjustment timing value associated with the transmission of the SRSs. According to an example embodiment, the second parameters may further indicate a second power control adjustment timing value associated with the uplink data channel transmission. According to an example embodiment, the configuration parameters may further indicate an allowed transmission power. According to an example embodiment, the first parameters may may further indicate at least one of: one or more SRS resource sets comprising one or more SRS resources; a first target received power; a first power compensation factor; and one or more first power offset for the transmission of the SRSs. According to an example embodiment, the second parameters may further indicate at least one of: a second target received power; a second power compensation factor; and one or more second power offset for the uplink data channel transmission. According to an example embodiment, the first DCI or the second DCI may comprise at least one of: resource indication of the SRSs; and the first power control command. According to an example embodiment, the uplink beam management may comprise at least one of: receiving the first DCI on the cell at a first slot; transmitting, via the cell, one or more SRS comprising the SRSs at a second slot; and receiving a command from the base station at a third slot. According to an example embodiment, the CSI acquisition may comprise at least one of: receiving the second DCI on the cell at a first slot; and transmitting, via the cell, one or more SRS comprising the SRSs at a second slot. According to an example embodiment, the semi-persistent transmission of the SRSs may be activated/deactivated by a medium access control control element (MAC CE). The MAC CE may be identified by a MAC subheader with a logic channel identifier (LCID). According to an example embodiment, the wireless device may determine the first transmission power of the SRS transmission at a first slot based on: the first accumulated power control adjustment; and the first power control command received at a second slot. The first slot may occur at the first power control adjust timing value after the second slot. According to an example embodiment, the wireless device may determine the second transmission power of the uplink data channel transmission at a first slot based on: the second accumulated power control adjustment; and the second power control command received at a second slot. The first slot may occur at the second power control adjustment timing value after the second slot. According to an example embodiment, the wireless device may determine the first transmission power for the SRSs may further based on: the first target received power; the first power compensation factor; at least one of the one or more first power offset; and a path loss value. According to an example embodiment, the wireless device may determine the second transmission power for the uplink data channel may further based on: the second target received power; the second power compensation factor; at least one of the one or more second power offset; and a path loss value. According to an example embodiment, the wireless device may transmit the one or more SRS via one or more transmission beams with the first transmission power. According to an example embodiment, the command may comprise one or more parameters indicating one of the one or more SRSs as a transmission beam of the wireless device.

Figure 26:
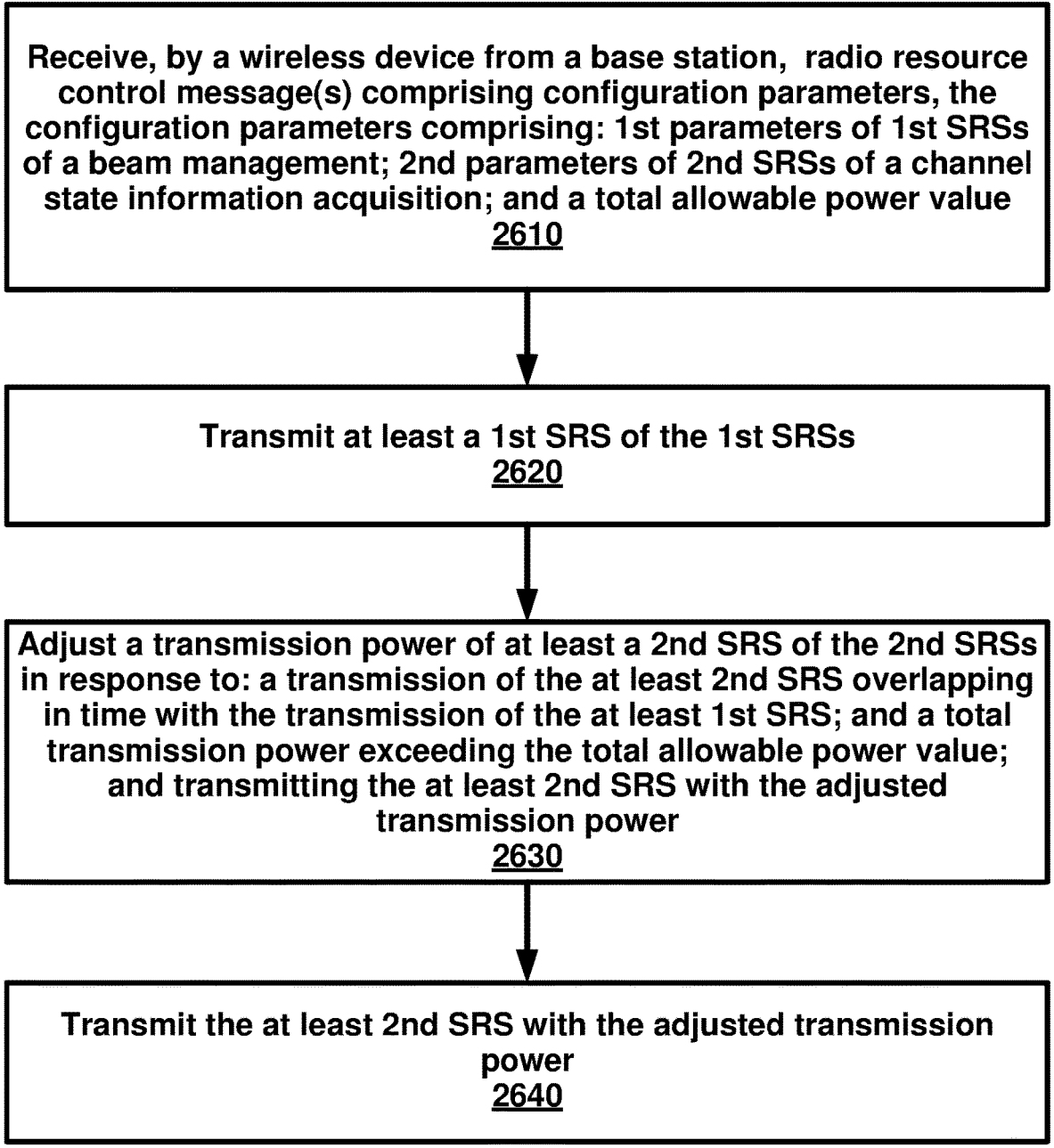
FIG. 26 is a flow diagram of an aspect of an embodiment of the present disclosure.

FIG. 26 is an example flow diagram as per an aspect of an embodiment of the present disclosure. At 2610, a wireless device may receive one or more radio resource control messages from a base station. The one or more radio resource control messages may comprise first parameters of first sounding reference signals (SRSs) of a beam management; second parameters of second SRSs of a channel state information acquisition; and a total allowable power value. At 2620, at least a first SRS of the first SRSs may be transmitted. At 2630, a transmission power of at least a second SRS of the second SRSs may be adjusted in response to: a transmission of the at least second SRS overlapping in time with the transmission of the at least first SRS; and a total transmission power exceeding the total allowable power value. At 2640, the at least second SRS may be transmitted with the adjusted transmission power.

According to an example embodiment, the configuration parameters may further comprise parameters of a plurality of cells comprising a first cell and a second cell. According to an example embodiment, the configuration parameters may further indicate a plurality of cells grouped into one or more cell groups. A first cell group of the one or more cell groups may comprise a first cell. A second cell group of the one or more cell groups may comprise a second cell. According to an example embodiment, the first parameters may comprise SRS resource configuration parameters. The first parameters may comprise Quasi-Co-Location (QCL) indication parameters. The first parameters may comprise beam sweeping parameters. The first parameters may comprise SRS power setting parameters.

According to an example embodiment, the uplink beam management may be triggered by a first downlink control information (DCI) transmitted via a downlink control channel. According to an example embodiment, the uplink beam management may be triggered by a medium access control control element (MAC CE).

According to an example embodiment, the at least first SRS may be a periodic SRS or a semi-persistent SRS. According to an example embodiment, the total transmission power may comprise a first transmission power of a first transmission of the at least first SRS and a second transmission power of a second transmission of the at least second SRS. According to an example embodiment, the wireless device may adjust the transmission power of the at least second SRS such that the total transmission power does not exceed the total allowable power value. According to an example embodiment, the first cell may be a primary cell. According to an example embodiment, the first cell may be a secondary cell. According to an example embodiment, the first cell may be a physical uplink control channel (PUCCH) secondary cell.

According to an example embodiment, the second cell may be a primary cell. According to an example embodiment, the second cell may be a secondary cell. According to an example embodiment, the second cell may be a PUCCH secondary cell.

According to an example embodiment, the wireless device may transmit the at least first SRS and the at least second SRS via the first cell. According to an example embodiment, the wireless device may transmit the at least first SRS via the first cell. According to an example embodiment, the wireless device may transmit the at least second SRS via the second cell.

According to an example embodiment, the first cell may be a primary cell of the first cell group and/or the second cell may be a primary secondary cell of the second cell group. According to an example embodiment, the first cell may be a primary cell of the first cell group and/or the second cell may be a PUCCH secondary cell of the second cell group. According to an example embodiment, the first cell may be a primary cell of the first cell group and/or the second cell may be a secondary cell of the second cell group. According to an example embodiment, the wireless device may transmit the at least first SRS and the at least second SRS via the first cell.

According to an example embodiment, the wireless device may transmit the at least first SRS via the first cell. According to an example embodiment, the wireless device may transmit the at least second SRS via the second cell.

According to an example embodiment, the wireless device may transmit the at least first SRS with a first transmission power. The first transmission power may be determined based on the SRS power setting parameters the SRS power setting parameters. The first transmission power may be determined based on an SRS power control command indicated by a DCI. The first transmission power may be determined based on the SRS power setting parameters the SRS power setting parameters and an SRS power control command indicated by a DCI.

According to an example embodiment, the MAC CE may indicate an SRS resource indicator associated with the at least first SRS. According to an example embodiment, the first DCI may indicate an SRS resource indicator associated with the at least one first SRS. According to an example embodiment, the first DCI may indicate a first SRS power control command.

FIG. 27 is an example flow diagram as per an aspect of an embodiment of the present disclosure. At 2710, a wireless device may receive one or more radio resource control messages from a base station. The one or more radio resource control messages may comprise first configuration parameters of a plurality of cells comprising a first cell and a second cell; and second configuration parameters of first sounding reference signals (SRSs) of a beam management for the first cell. At 2720 at least a first SRS of the first SRSs may be transmitted via the first cell. At 2730, a configured/scheduled transmission of a second signal may be dropped in response to: the configured/scheduled transmission of the second signal via the second cell overlapping in time with the transmission of the at least first SRS; and a total transmission power exceeding a first total allowable power value.

According to an example embodiment, the first configuration parameters may comprise SRS resource configuration parameters. According to an example embodiment, the first configuration parameters may comprise QCL indication parameters. According to an example embodiment, the first configuration parameters may comprise beam sweeping parameters. According to an example embodiment, the first configuration parameters may comprise SRS power setting parameters.

According to an example embodiment, the uplink beam management may be triggered by a first downlink control information (DCI) transmitted via a downlink control channel. According to an example embodiment, the uplink beam management may be triggered by a medium access control control element (MAC CE).

According to an example embodiment, the at least first SRS may be a periodic SRS According to an example embodiment, the at least first SRS may be a semi-persistent SRS. According to an example embodiment, the total transmission power may comprise a first transmission power of a first transmission of the at least first SRS and a second transmission power of a second transmission of the second signal. According to an example embodiment, the second signal may comprise at least one of: a second SRS for CSI acquisition; or a PRACH preamble. According to an example embodiment, the wireless device may transmit the at least first SRS with a first transmission power. The first transmission power may be determined based on the SRS power setting parameters. The first transmission power may be determined based on an SRS power control command indicated by a DCI. According to an example embodiment, the configured/scheduled transmission of the second signal may be triggered by a DCI. According to an example embodiment, the configured/scheduled transmission of the second signal may be triggered by a MAC CE. According to an example embodiment, the configured/scheduled transmission of the second signal may be triggered by an RRC message.

FIG. 28 is an example flow diagram as per an aspect of an embodiment of the present disclosure. At 2810, a wireless device may receive one or more radio resource control messages from a base station. The one or more radio resource control messages may comprise first configuration parameters of a plurality of cells comprising a first cell and a second cell; and second configuration parameters of first sounding reference signals (SRSs) of a beam management for the first cell. At 2820 at least a first SRS of the first SRSs may be transmitted via the first cell. At 2830, a transmission power of a configured/scheduled transmission of a second signal may be adjusting, in response to: the configured/scheduled transmission of the second signal via the second cell overlapping in time with the transmission of the at least one SRS; and a total transmission power exceeding a first total allowable power value. At 2840, the second signal may be transmitted via the second cell with the adjusted transmission power.

According to an example embodiment, the first configuration parameters may comprise SRS resource configuration parameters. According to an example embodiment, the first configuration parameters may comprise QCL indication parameters. According to an example embodiment, the first configuration parameters may comprise beam sweeping parameters. According to an example embodiment, the first configuration parameters may comprise SRS power setting parameters. According to an example embodiment, the uplink beam management may be triggered by a first downlink control information (DCI) transmitted via a downlink control channel. According to an example embodiment, the uplink beam management may be triggered by a medium access control control element (MAC CE). According to an example embodiment, the at least first SRS may be a periodic SRS. According to an example embodiment, the at least first SRS may be a semi-persistent SRS. According to an example embodiment, the total transmission power may comprise a first transmission power of a first transmission of the at least first SRS and a second transmission power of a second transmission of the second signal.

According to an example embodiment, the second signal may comprise a second SRS for CSI acquisition. According to an example embodiment, the second signal may comprise a PRACH preamble. According to an example embodiment, the wireless device may transmit the at least first SRS with a first transmission power. The first transmission power may be determined based on the SRS power setting parameters. The first transmission power may be determined based on an SRS power control command indicated by a DCI. According to an example embodiment, the configured/scheduled transmission of the second signal may be triggered by a DCI. According to an example embodiment, the configured/ scheduled transmission of the second signal may be triggered by a MAC CE. According to an example embodiment, the configured/scheduled transmission of the second signal may be triggered by an RRC message. According to an example embodiment, the wireless device may adjust the transmission power of the second signal such that the total transmission power does not exceed the total allowable power value. According to an example embodiment, the adjusting the transmission power of the second signal may comprise reducing the transmission power of the second signal such that the total transmission power does not exceed the total allowable power value.

Figure 29:
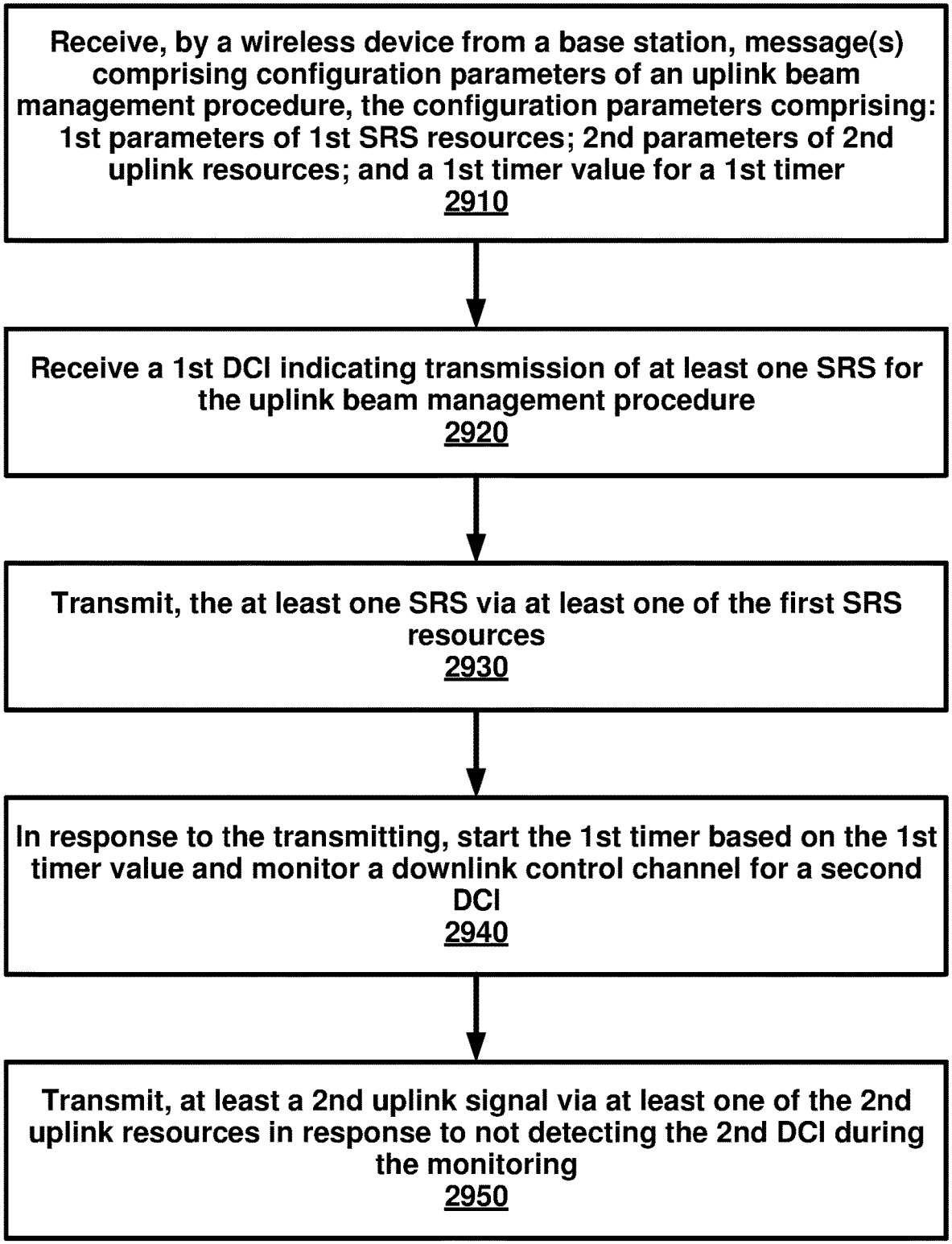
FIG. 29 is a flow diagram of an aspect of an embodiment of the present disclosure.

FIG. 29 is an example flow diagram as per an aspect of an embodiment of the present disclosure. At 2910, a wireless device may receive one or more messages from a base station. The one or more messages may comprise first parameters of first sounding reference signal (SRS) resources; second parameters of second uplink resources; and a first timer value for a first timer. At 2920, a first downlink control information (DCI) may be received. The first DCI may indicate transmission of at least one SRS for the uplink beam management procedure. At 2930, the at least one SRS may be transmitted via at least one of the first SRS resources. At 2940, in response to the transmitting: the first timer may be started based on the first timer value; and a downlink control channel may be monitored for a second DCI. At 2950, at least a second uplink signal may be transmitted via at least one of the second uplink resources in response to not detecting the second DCI during the monitoring.

According to an example embodiment, the wireless device may further, in response to detecting the second DCI during the monitoring: stop the first timer. The wireless device may further, in response to detecting the second DCI during the monitoring, complete the uplink beam management procedure successfully. According to an example embodiment, the second uplink resources may comprise second SRSs. According to an example embodiment, the second uplink resources may comprise one or more demodulation RSs (DM-RSs). According to an example embodiment, the second uplink resources may comprise one or more preambles associated with one or more RACH resources. According to an example embodiment, the second parameters may indicate one or more RACH resources. Each of the one or more RACH resources may be associated with a preamble index. Each of the one or more RACH resources may be associated with a PRACH numerology. Each of the one or more RACH resources may be associated with a time and/or frequency radio resource allocation. Each of the one or more RACH resources may be associated with power setting of the preamble transmission. According to an example embodiment, the first DCI may comprise an RS resource identifier indicating one of the first SRS resources. According to an example embodiment, the first DCI may comprise a preamble index.

According to an example embodiment, the first DCI may comprise configuration parameters of the second DCI. The configuration parameters of the second DCI may comprise a time window with a time value indicating when the second DCI will be present. The configuration parameters of the second DCI may comprise a DCI format indication of the second DCI. The configuration parameters of the second DCI may comprise an aggregation level of the second DCI. The configuration parameters of the second DCI may comprise a control resource set associated with the second DCI. The configuration parameters of the second DCI may comprise a search space associated with the second DCI. The configuration parameters of the second DCI may comprise a quasi-co-location (QCL) indication for receiving the second DCI. According to an example embodiment, the at least second uplink signal may comprise a preamble. According to an example embodiment, the at least second uplink signal may comprise a signal via a physical uplink shared control channel (PUCCH). According to an example embodiment, the wireless device may monitor the downlink control channel for the second DCI during at least a portion of when the first timer may be running. According to an example embodiment, the first parameters comprise one or more radio resource configuration parameters of the first SRS resources. According to an example embodiment, the first parameters comprise power setting parameters of the first SRS resources. According to an example embodiment, the completing the uplink beam management procedure successfully may comprise adjusting transmission beams according to one or more fields of the second DCI. According to an example embodiment, the at least one uplink signal may be a preamble selected from the one or more preambles. According to an example embodiment, the at least one uplink signal may be a preamble of the one or more preambles indicated in the first DCI. According to an example embodiment, the at least one uplink signal may be a SRS of the second SRSs indicated in the first DCI. According to an example embodiment, the at least one uplink signal may be a DM-RS of the DR-RSs indicated in the first DCI. According to an example embodiment, the wireless device may transmit the at least one uplink signal comprising a preamble associated with one of the one or more RACH resources. According to an example embodiment, the wireless device may transmit the preamble according to: the PRACH numerology associated with the preamble; the time and/or frequency radio resource allocation associated with the preamble; and the power setting of the preamble transmission associated with the preamble. According to an example embodiment, the wireless device may monitor the PDCCH for the second DCI, according to the time window. According to an example embodiment, the wireless device may monitor the PDCCH for the second DCI, according to the DCI format indication. According to an example embodiment, the wireless device may monitor the PDCCH for the second DCI, according to the aggregation level. According to an example embodiment, the wireless device may monitor the PDCCH for the second DCI, according to the control resource set. According to an example embodiment, the wireless device may monitor the PDCCH for the second DCI, according to the search space. According to an example embodiment, the wireless device may monitor the PDCCH for the second DCI, according to the QCL indication. According to an example embodiment, the wireless device may further transmit the at least second uplink signal on a PUCCH or a physical uplink shared channel (PUSCH) in response to receiving the second DCI. According to an example embodiment, a PUCCH resource for transmission of the at least second signal may be indicated in the first DCI. According to an example embodiment, a PUCCH resource for transmission of the at least second signal may be indicated in the one or more RRC messages.

FIG. 30 is an example flow diagram as per an aspect of an embodiment of the present disclosure. At 3010, a wireless device may receive one or more radio resource control messages from a base station. The one or more radio resource control messages may comprise configuration parameters of an uplink beam management procedure. The configuration parameters may indicate: reference signal (RS) resources; and a first timer value for a first timer. At 3020, a first downlink control information (DCI) may be received. The first DCI may comprise: a RS index identifying a first RS of the RS resources; and an indicator indicating whether a second DCI is present or not. At 3030, the first RS may be transmitted in response to receiving the first DCI. At 3040, in response to the indicator of the first DCI indicating that the second DCI is present: the first timer based may be started on the first timer value; and the PDCCH may be monitored for the second DCI. At 3050, the uplink beam management procedure may be completed in response to the second DCI.

According to an example embodiment, the wireless device may not monitor the PDCCH for the second DCI and not start the first timer in response to the indicator indicating that the second DCI is absent. According to an example embodiment, completing the uplink beam management procedure may comprise adjusting transmission beams according to one or more fields of the second DCI. According to an example embodiment, the RS resources may comprise at least one of: sounding reference signals (SRSs); one or more demodulation RSs (DM-RSs); and one or more preambles associated with one or more RACH resources. According to an example embodiment, in response to detecting the second DCI during the monitoring: the first timer may be stopped; and the uplink beam management procedure may be completed successfully. According to an example embodiment, in response to not detecting the second DCI during the monitoring: the first timer may be stopped; and at least a second signal may be transmitted. According to an example embodiment, the at least second signal may comprise at least one of: second SRSs; one or more second DM-RSs; and one or more second preambles.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to".

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
   receiving, by a wireless device, a first downlink control information (DCI) indicating transmission of at least one sounding reference signal (SRS) for an uplink beam management procedure;
   transmitting the at least one SRS via at least one first SRS resource;
   monitoring, during a time window starting based on the transmitting the at least one SRS, a downlink control channel for a second DCI indicating one of the at least one SRS; and
   transmitting, based on not detecting the second DCI during the time window, a second uplink signal via at least one second uplink resource.

2. The method of claim 1, further comprising:
   receiving, by the wireless device from a base station, one or more messages comprising configuration parameters of the uplink beam management procedure, the configuration parameters comprising:
      first parameters of the at least one first SRS resource; and
      second parameters of the at least one second uplink resource.

3. The method of claim 2, wherein the second parameters indicate one or more random access channel (RACH) resources, each of the one or more RACH resources associated with at least one of:
   a preamble index;
   a physical random access channel (PRACH) numerology;
   a time radio resource allocation;
   a frequency radio resource allocation; or
   a power setting of a preamble transmission.

4. The method of claim 3, wherein the wireless device transmits the second uplink signal comprising a preamble associated with one of the one or more RACH resources.

5. The method of claim 2, wherein the first parameters comprise at least one of:
   one or more radio resource configuration parameters of the at least one first SRS resource; and
   power setting parameters of the at least one first SRS resource.

6. The method of claim 1, wherein the first DCI comprises at least one of:
   an RS resource identifier indicating one of the at least one first SRS resource; and
   a preamble index.

7. The method of claim 1, wherein the first DCI comprises configuration parameters of the second DCI, wherein the configuration parameters of the second DCI comprise at least one of:
   a time value for the time window;
   a DCI format indication of the second DCI;
   an aggregation level of the second DCI;
   a control resource set associated with the second DCI;
   a search space associated with the second DCI; or
   a quasi-co-location (QCL) indication for receiving the second DCI.

8. The method of claim 1, wherein the second uplink signal comprises at least one of:
   a preamble; or
   a signal via a physical uplink shared control channel (PUCCH).

9. The method of claim 8, wherein the wireless device transmits the preamble according to at least one of:
   a PRACH numerology associated with the preamble;
   a time radio resource allocation associated with the preamble;
   a frequency radio resource allocation associated with the preamble; or
   a power setting of a preamble transmission associated with the preamble.

10. The method of claim 1, further comprising adjusting transmission beams according to one or more fields of the second DCI.

11. The method of claim 1, wherein the wireless device monitors a physical downlink control channel (PDCCH) for the second DCI, according to at least one of:
    the time window;
    a DCI format indication;
    an aggregation level;
    a control resource set;
    a search space; or
    a QCL indication.

12. The method of claim 1, further comprising transmitting the at least one second uplink signal on a physical uplink control channel (PUCCH) or a physical uplink shared channel (PUSCH) in response to receiving the second DCI.

13. The method of claim 12, wherein a PUCCH resource for transmission of the second uplink signal is indicated in the first DCI.

14. The method of claim 1, wherein the at least one second uplink resource comprise at least one of:
    second SRSs;
    one or more demodulation reference signals (DM-RSs); and
    one or more preambles associated with one or more random access channel (RACH) resources.

15. The method of claim 14, wherein the second uplink signal is a preamble selected from the one or more preambles.

16. The method of claim 14, wherein the second uplink signal is a preamble of the one or more preambles indicated in the first DCI.

17. The method of claim 14, wherein the second uplink signal is an SRS of the second SRSs indicated in the first DCI.

18. The method of claim 14, wherein the second uplink signal is a DM-RS of the DM-RSs indicated in the first DCI.

19. A method comprising:
    transmitting, by a base station, a first downlink control information (DCI) indicating transmission of at least one sounding reference signal (SRS) for an uplink beam management procedure;

receiving, by a wireless device, a first downlink control information (DCI) indicating transmission of the at least one SRS for an uplink beam management procedure;

transmitting the at least one SRS via at least one first SRS resource;

monitoring, during a time window starting based on the transmitting the at least one SRS, a downlink control channel for a second DCI indicating one of the at least one SRS; and transmitting, based on not detecting the second DCI during the time window, a second uplink signal via at least one second uplink resource.

20. A system comprising:

a base station comprising:
   one or more processors; and
   memory storing instructions that, when executed by the one or more processors of the base station, cause the base station to transmit a first downlink control information (DCI) indicating transmission of at least one sounding reference signal (SRS) for an uplink beam management procedure; and a wireless device comprising:
   one or more processors; and
   memory storing instructions that, when executed by the one or more processors of the wireless device, cause the wireless device to:
   receive the first DCI;
   transmit the at least one SRS via at least one first SRS resource;
   monitor, during a time window starting based on the transmitting the at least one SRS, a downlink control channel for a second DCI indicating one of the at least one SRS; and
   transmit, based on not detecting the second DCI during the time window, a second uplink signal via at least one second uplink resource.

* * * * *